US012745027B2

(12) United States Patent
Kim et al.

(10) Patent No.: US 12,745,027 B2
(45) Date of Patent: Sep. 22, 2026

(54) SOUND APPARATUS AND VEHICULAR APPARATUS INCLUDING THE SAME

(71) Applicant: LG Display Co., Ltd., Seoul (KR)

(72) Inventors: Daewon Kim, Paju-si (KR); Daeho Kim, Paju-si (KR); DoHyeong Kim, Paju-si (KR); YeongRak Choi, Paju-si (KR); Kwangho Kim, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 174 days.

(21) Appl. No.: 18/942,066

(22) Filed: Nov. 8, 2024

(65) Prior Publication Data

US 2025/0159392 A1 May 15, 2025

(30) Foreign Application Priority Data

Nov. 10, 2023 (KR) ........................ 10-2023-0155669

(51) Int. Cl.
*H04R 1/02* (2006.01)
*H04R 9/06* (2006.01)

(52) U.S. Cl.
CPC ............... *H04R 1/025* (2013.01); *H04R 1/02* (2013.01); *H04R 9/06* (2013.01); *H04R 2499/13* (2013.01)

(58) Field of Classification Search
None
See application file for complete search history.

(56) References Cited

U.S. PATENT DOCUMENTS

2020/0379508 A1* 12/2020 Lee ........................... G06F 3/16
2021/0352390 A1* 11/2021 Lee ..................... B60R 11/0223
2023/0034922 A1* 2/2023 Tong ........................ H04R 7/10

* cited by examiner

*Primary Examiner* — Antim G Shah
(74) *Attorney, Agent, or Firm* — Birch, Stewart, Kolasch & Birch, LLP

(57) ABSTRACT

A sound apparatus and a vehicular apparatus including the same are discussed. The sound apparatus can include an enclosure having an internal space and a protrusion part having an opening hole connected to the internal space, a sound generating module at the internal space of the enclosure, and a coupling part including a hollow part connected to the internal space. The coupling part can be accommodated into the opening hole of the protrusion part. The coupling part can be detachably fastened to the protrusion part.

17 Claims, 29 Drawing Sheets

130: 130C, 130I, 130L 130L: 130L1, 130L2 30-1: 31C 30-2: 31I, 31L

130: 130C, 130E, 130N    130E: 130E2, 130E3    30-1: 31C, 31E

SOUND APPARATUS AND VEHICULAR APPARATUS INCLUDING THE SAME

CROSS-REFERENCE TO RELATED APPLICATIONS

This application claims priority to Korean Patent Application No. 10-2023-0155669, filed in the Republic of Korea on Nov. 10, 2023, the entirety of which is hereby expressly incorporated by reference into the present application.

BACKGROUND

Technical Field

The present disclosure relates to a sound apparatus and a vehicular apparatus including the same.

Discussion of the Related Art

Vehicles include a sound apparatus which outputs a sound based on an audio signal output from a multimedia device such as a car audio device. For example, the sound apparatus applied to vehicles can include a front speaker and a rear speaker, which are configured as a coil type.

However, the sound apparatus in the vehicles can be limited when outputting a realistic sound or stereo sound of a multichannel through the front speaker and the rear speaker to limitations of the coil type device. Further, in the sound apparatus in the vehicle, in a case where the number of speakers are increased, a stereo sound can be output. But due to a size of the speakers based on the coil type device and a limitation of a space in the vehicle, there can be a limitation in increasing the number of speakers so that a realistic sound or stereo sound may not be provided using the coil type device.

SUMMARY OF THE DISCLOSURE

The inventors of the present disclosure have recognized the problems and disadvantages of the related art and have performed extensive research and experiments for enhancing a sound characteristic and/or a sound pressure level characteristic of a sound apparatus for vehicles. Based on the extensive research and experiments, the inventors have invented a sound apparatus and a vehicular apparatus including the same, which can enhance a sound characteristic and/or a sound pressure level characteristic.

An aspect of the present disclosure is directed to providing a sound apparatus and a vehicular apparatus including the same, which can enhance a sound characteristic and/or a sound pressure level characteristic.

An aspect of the present disclosure is directed to providing a sound apparatus and a vehicular apparatus including the same, which can be easily separated or detached (or a rework) from a mount object.

An aspect of the present disclosure is directed to providing a sound apparatus and a vehicular apparatus including the same, which can enhance a sound characteristic and/or a sound pressure level characteristic in a pitched sound band including a sound of a low-pitched sound band.

Additional features, advantages, and aspects will be set forth in the description that follows, and in part will be apparent from the description, or can be learned by practice of the inventive concepts provided herein. Other features, advantages, and aspects of the present disclosure can be realized and attained by the structure particularly pointed out in the written description, or derivable therefrom, and the claims hereof as well as the appended drawings.

To achieve these and other advantages and aspects of the present disclosure, as embodied and broadly described herein, in one or more aspects, a sound apparatus comprises an enclosure including an internal space and a protrusion part including an opening hole connected to the internal space, a sound generating module at the internal space of the enclosure, and a coupling part including a hollow part connected to the internal space, the coupling part being accommodated into the opening hole of the protrusion part. The coupling part is detachably fastened to the protrusion part.

In one or more aspects of the present disclosure, a vehicular apparatus can comprise an interior material exposed at an interior space, and one or more sound generating apparatuses disposed at the interior material to output a sound to the interior space. The one or more sound generating apparatuses comprises a sound apparatus, and the sound apparatus comprises an enclosure including an internal space and a protrusion part including an opening hole connected to the internal space, a sound generating module at the internal space of the enclosure, and a coupling part including a hollow part connected to the internal space, the coupling part being accommodated into the opening hole of the protrusion part. The coupling part is detachably fastened to the protrusion part.

In one or more aspects of the present disclosure, a vehicular apparatus can comprise an interior material exposed at an interior space, and one or more sound apparatuses as described above, disposed at the interior material to output a sound to the interior space.

Details of other exemplary embodiments will be included in the detailed description of the disclosure and the accompanying drawings.

According to a sound apparatus and a vehicular apparatus including the same according to one or more embodiments of the present disclosure, a sound characteristic and/or a sound pressure level characteristic can be enhanced.

According to a sound apparatus and a vehicular apparatus including the same according to one or more embodiments of the present disclosure, a coupling part can be detachably fastened to a protrusion part of an enclosure, and thus, the separation or detachment (or rework) of a sound apparatus or a sound generating apparatus mounted on a mount object can be easily performed.

According to a sound apparatus and a vehicular apparatus including the same according to one or more embodiments of the present disclosure, a sound characteristic and/or a sound pressure level characteristic can be enhanced in a sound band including a sound of a low-pitched sound band.

According to a sound apparatus and a vehicular apparatus including the same according to one or more embodiments of the present disclosure, a heat dissipation part can be configured at a vibration member, thereby preventing a reduction in performance of a vibration apparatus caused by heat.

According to a sound apparatus and a vehicular apparatus including the same according to one or more embodiments of the present disclosure, one or more holes can be configured at a vibration member, and thus, a sound characteristic and/or a sound pressure level characteristic can be enhanced in a sound band including a sound of a low-pitched sound band.

According to a sound apparatus and a vehicular apparatus including the same according to one or more embodiments of the present disclosure, a signal supply member and a vibration generating part can be configured as one part (or one component), thereby realizing an effect of uni-materialization.

According to a sound apparatus and a vehicular apparatus including the same according to one or more embodiments of the present disclosure, because a protection member is configured at the sound apparatus, a sound characteristic and/or a sound pressure level characteristic can be more enhanced, a sound reproduction band can expand, and the sound apparatus can be protected.

According to a sound apparatus and a vehicular apparatus including the same according to one or more embodiments of the present disclosure, a connection member is configured between a vehicle interior material and an enclosure, and thus, a sound characteristic and/or a sound pressure level characteristic can be enhanced in a sound band including a sound of a low-pitched sound band.

According to a sound apparatus and a vehicular apparatus including the same according to one or more embodiments of the present disclosure, a sound can be output through a hollow part including a chamfer portion having a non-rectangular shape, and thus, a sound characteristic and/or a sound pressure level characteristic can be enhanced in a sound band including a sound of a low-pitched sound band, and peak and/or dip in a high-pitched sound band can be improved, thereby enhancing a balance characteristic of a sound pressure level or a flatness characteristic of a sound pressure level.

According to a sound apparatus and a vehicular apparatus including the same according to one or more embodiments of the present disclosure, a coupling portion coupled to an opening part of an enclosure can have an optimized width and/or length, and thus, a sound characteristic and/or a sound pressure level characteristic can be enhanced in a sound band including a sound of a low-pitched sound band, and peak and/or dip in a high-pitched sound band can be improved, thereby enhancing a balance characteristic of a sound pressure level or a flatness characteristic of a sound pressure level.

According to a sound apparatus and a vehicular apparatus including the same according to one or more embodiments of the present disclosure, a connection member having different thicknesses can be configured between an enclosure and a vehicle interior material, and thus, a sound characteristic and/or a sound pressure level characteristic of a low-pitched sound band can be enhanced.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with aspects of the disclosure.

It is to be understood that both the foregoing description and the following description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure, and incorporated in and constitute a part of this disclosure, illustrate aspects and embodiments of the disclosure and together with the description serve to explain principles of the disclosure.

Figure 1:
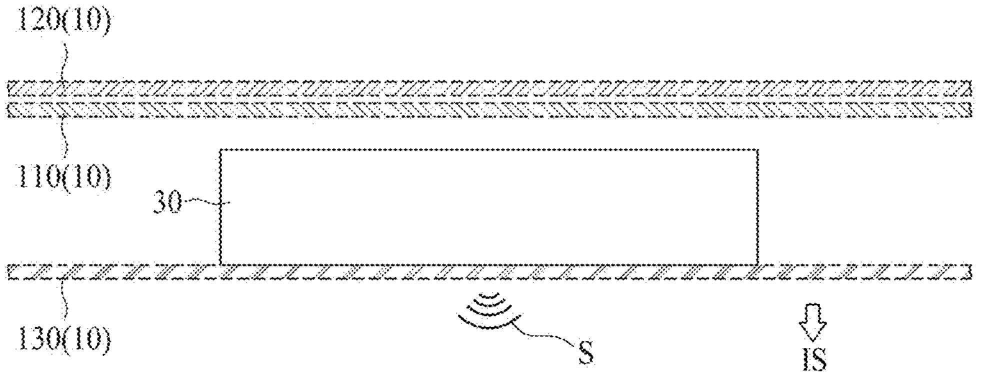
FIG. 1 illustrates a sound apparatus for vehicles according to an embodiment of the present disclosure.

Throughout the drawings and the detailed description, unless otherwise described, the same drawing reference numerals should be understood to refer to the same elements, features, and structures. The sizes, lengths, and thicknesses of layers, regions and elements, and depiction of thereof can be exaggerated for clarity, illustration, and/or convenience.

DETAILED DESCRIPTION OF THE EMBODIMENTS

Advantages and features of the present disclosure, and implementation methods thereof, are clarified through the aspects described with reference to the accompanying drawings. The present disclosure may, however, be embodied in different forms and should not be construed as limited to the example aspects set forth herein. Rather, these example aspects are examples and are provided so that this disclosure can be thorough and complete to assist those skilled in the art to understand the inventive concepts without limiting the protected scope of the present disclosure. Further, the term "can" fully encompasses all the meanings and coverages of the term "may."

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted.

In a situation where "comprise," "have," and "include" described in the present disclosure are used, another part can be added unless "only" is used. The terms of a singular form can include plural forms unless referred to the contrary.

In construing an element, the element is construed as including an error range although there is no explicit description.

In describing a position relationship, for example, when a position relation between two parts is described as "on," "over," "under," and "next," one or more other parts can be disposed between the two parts unless 'just' or 'direct' is used.

In describing a temporal relationship, for example, when the temporal order is described as "after," "subsequent," "next," and "before," a situation which is not continuous can be included, unless "just" or "direct" is used.

It will be understood that, although the terms "first," "second," etc. can be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing elements of the present disclosure, the terms "first," "second," "A," "B," "(a)," "(b)," or the like can be used. These terms are intended to identify the corresponding element(s) from the other element(s), and these are not used to define the essence, basis, order, or number of the elements.

For the expression that an element is "connected," "coupled," or "contact," to another element, the element may not only be directly connected, coupled, or contacted to another element, but also be indirectly connected, coupled, or contacted to another element with one or more intervening elements interposed between the elements, unless otherwise specified.

For the expression that an element is "contacts" or "overlaps" with another element, the element can not only directly contact, overlap, or the like with another element, but also indirectly contact or overlap with another element with one or more intervening elements disposed or interposed between the elements, unless otherwise specified.

The term "at least one" should be understood as including any and all combinations of one or more of the associated listed items. For example, the meaning of "at least one of a first item, a second item and a third item" denotes the combination of all items proposed from two or more of the first item, the second item and the third item as well as the first item, the second item or the third item.

Features of various embodiments of the present disclosure can be partially or overall coupled to or combined with each other and can be variously inter-operated with each other and driven technically as those skilled in the art can sufficiently understand. The embodiments of the present disclosure can be carried out independently from each other or can be carried out together in co-dependent relationship.

Hereinafter, example embodiments of a sound apparatus according to the present disclosure will be described in detail with reference to the accompanying drawings. All the components of each apparatus/device according to all embodiments of the present disclosure are operatively coupled and configured. For convenience of description, a scale of each of elements illustrated in the accompanying drawings differs from a real scale, and thus, is not limited to a scale illustrated in the drawings.

FIG. 1 illustrates a sound apparatus for vehicles according to an embodiment of the present disclosure.

With reference to FIG. 1, a sound apparatus 30 according to an embodiment of the present disclosure can be disposed or equipped at an inner portion of a vehicle 10 to output a sound S toward an interior space (or an indoor space) IS of the vehicle (or a vehicular apparatus) 10.

The vehicle 10 can be a vehicular apparatus which includes one or more seats and one or more windows. For example, the vehicle 10 can include a vehicle, a train, a ship, or an aircraft, or the like, but embodiments of the present disclosure are not limited thereto.

The vehicle 10 according to an embodiment of the present disclosure can include a main structure 110.

The main structure 110 of the vehicle 10 can include a main frame, a sub-frame, a side frame, a door frame, an under-frame, and a seat frame, or the like, but embodiments of the present disclosure are not limited thereto. For example, the main structure 110 can be a vehicle body, a vehicle structure, or a frame structure, or the like, but embodiments of the present disclosure are not limited thereto.

The vehicle 10 according to an embodiment of the present disclosure can further include an exterior material 120.

The exterior material 120 of the vehicle 10 can be configured to cover the main structure 110. For example, the exterior material 120 of the vehicle 10 can be configured to cover an outer portion of the main structure 110. In the following description, the exterior material 120 can be a vehicle exterior material 120, and can be used interchangeably.

The exterior material (or vehicle exterior material) 120 of the vehicle 10 can include a hood panel, a front fender panel, a dash panel, a pillar panel, a trunk panel, a roof panel (or ceiling), a floor panel, a door inner panel, and a door outer panel, or the like, but embodiments of the present disclosure are not limited thereto.

The exterior material 120 according to an embodiment of the present disclosure can include at least one or more of a planar portion (or a flat portion) and a curved portion (or a flexural portion or an uneven portion). For example, the exterior material 120 can have a structure corresponding to a structure of a corresponding main structure 110, or can have a structure which differs from a structure of a corresponding main structure 110.

The vehicle 10 according to an embodiment of the present disclosure can further include a vehicle interior material 130. In the following description, the vehicle interior material 130 can be an interior material 130, and can be used interchangeably.

The vehicle interior material 130 can include all elements (or components) configuring an inner portion of the vehicle 10, or can include all elements disposed at the interior space IS of the vehicle 10. For example, the vehicle interior material 130 can be an interior member or an interior finish material of the vehicle 10, but embodiments of the present disclosure are not limited thereto.

The vehicle interior material 130 according to an embodiment of the present disclosure can be configured to cover one or more of main structure 110 and the exterior material 120 in the interior space (or an inner portion) IS of the vehicle 10. For example, the vehicle interior material 130 can cover one or more of main structure 110 and the exterior material 120 in the interior space IS of the vehicle 10 and can be configured to be exposed at the interior space IS of the vehicle 10.

The vehicle interior material 130 according to an embodiment of the present disclosure can be configured to be exposed at the inner portion and/or the interior space IS of the vehicle 10 in the inner portion and/or the interior space IS of the vehicle 10. For example, the vehicle interior material 130 can be configured to cover one or more surfaces (or an interior surfaces) of at least one or more of a main frame (or a vehicle body), a side frame (or a side body), a door frame (or a door body), a handle frame (or a steering hub), and a seat frame, which are exposed at the interior space IS of the vehicle 10.

The vehicle interior material 130 according to an embodiment of the present disclosure can include a dashboard, a pillar interior material (or a pillar trim), a floor interior material (or a floor carpet), a roof interior material (or a headliner), a door interior material (or a door trim), a handle interior material (or a steering cover), a seat interior material, a rear package interior material (or a back seat shelf), an overhead console (or an illumination interior material), a rear view mirror, a glove box, and a sun visor, or the like, but embodiments of the present disclosure are not limited thereto.

The vehicle interior material 130 according to an embodiment of the present disclosure can include one or more materials of metal, wood, rubber, plastic, glass, fiber, cloth, paper, a mirror, leather, and carbon, but embodiments of the present disclosure are not limited thereto. The vehicle interior material 130 including a plastic material can be an injection material which is implemented by an injection process using a thermoplastic resin or a thermosetting resin, but embodiments of the present disclosure are not limited thereto. The vehicle interior material 130 including a fiber material can include at least one or more of a plastic composite fiber, a carbon fiber (or an aramid fiber), and a natural fiber, but embodiments of the present disclosure are not limited thereto. The vehicle interior material 130 including the fiber material can include a textile sheet, a knit sheet, or a nonwoven fabric, or the like, but embodiments of the present disclosure are not limited thereto. For example, the paper can be cone paper for speakers. For example, the cone paper can be pulp or foamed plastic, or the like, but embodiments of the present disclosure are not limited thereto. The vehicle interior material 130 including a leather material can include natural leather or artificial leather, but embodiments of the present disclosure are not limited thereto.

The vehicle interior material 130 according to an embodiment of the present disclosure can include at least one or more of a planar portion (or a flat portion) and a curved portion (or a flexural portion or an uneven portion). For example, the vehicle interior material 130 can have a structure corresponding to a structure (or an inner surface structure) of a corresponding main structure 110, or can have a structure which differs from a structure of a corresponding main structure 110.

According to an embodiment of the present disclosure, the sound apparatus 30 can be disposed at the vehicle interior material 130. The sound apparatus 30 can vibrate the vehicle interior material 130 to generate a sound S based on a vibration of the vehicle interior material 130. For example, the sound apparatus 30 can directly vibrate the vehicle interior material 130 to generate the sound S based on a vibration of the vehicle interior material 130. For example, the sound apparatus 30 can be configured to vibrate the vehicle interior material 130 to output the sound S toward the inner portion or the interior space IS of the vehicle 10. Thus, the sound apparatus 30 can use the vehicle interior material 130 as a sound vibration plate, a sound diaphragm, or an acoustic diaphragm. The vehicle interior material 130 can be a vibration plate, a sound vibration plate, or a sound generating plate for outputting the sound S. For example, the vehicle interior material 130 can have a size which is greater than the sound apparatus 30, but embodiments of the present disclosure are not limited thereto.

According to an embodiment of the present disclosure, the sound apparatus 30 can be disposed at at least one or more of a dashboard, a pillar interior material, a floor interior material, a roof interior material, a door interior material, a handle interior material, and a seat interior material, or can be connected (or coupled) to at least one or more of a rear package interior material, an overhead console, a rear view mirror, a glove box, and a sun visor.

The vehicle 10 according to an embodiment of the present disclosure can include one or more sound apparatuses 30 disposed at or connected to at least one or more regions (or portions) of the vehicle interior material 130. The one or more sound apparatuses 30 can vibrate the at least one or more regions (or portions) of the vehicle interior material 130 to output a realistic sound S and/or stereo sound including a multichannel toward the interior space IS of the vehicle 10.

According to an embodiment of the present disclosure, the sound apparatus 30 can be configured at a region between the vehicle interior material 130 and the main structure 110, or a region between the vehicle interior material 130 and the exterior material 120. The sound apparatus 30 can be disposed at a region between the vehicle interior material 130 and the main structure 110, or a region between the vehicle interior material 130 and the exterior material 120, and can indirectly or directly vibrate one or more of the region between the vehicle interior material 130 and the main structure 110 and the region between the vehicle interior material 130 and the exterior material 120 to output sound S.

According to an embodiment of the present disclosure, the sound apparatus 30 can be disposed at one or more of a region (or a first space) between the main structure 110 and the exterior material 120, a region (or a second space) between the main structure 110 and the vehicle interior material 130, the exterior material 120, and the vehicle interior material 130. For example, the sound apparatus 30 can be disposed at one or more of the region (or first space) between the main structure 110 and the exterior material 120, the region (or second space) between the main structure 110 and the vehicle interior material 130, the exterior material 120, and the vehicle interior material 130, and can be configured to output a sound. For example, the sound apparatus 30 can be disposed at one or more of the region (or first space) between the main structure 110 and the exterior material 120, the region (or second space) between the main structure 110 and the vehicle interior material 130, the exterior material 120, and the vehicle interior material 130, and can indirectly or directly vibrate one or more of the main structure 110, the exterior material 120, and the vehicle interior material 130 to output sound.

According to an embodiment of the present disclosure, the sound apparatuses 30 can output a sound in a region between the exterior material 120 and the vehicle interior material 130 of the vehicle 10. For example, the sound apparatus 30 can be disposed at at least one or more of a region (or a third space) between the exterior material 120 and the vehicle interior material 130, the exterior material 120 and the vehicle interior material 130. For example, the sound apparatus 30 can be disposed at the region between the exterior material 120 and the vehicle interior material 130, and can indirectly or directly vibrate one or more of the exterior material 120 and the vehicle interior material 130 to output sound. For example, the sound apparatuses 30 can be connected or coupled to one or more of the exterior material 120 and the vehicle interior material 130 in a region between the exterior material 120 and the vehicle interior material 130, and can indirectly or directly vibrate one or more of the exterior material 120 and the vehicle interior material 130 to output sound. For example, the at least one or more of the exterior material 120 and the vehicle interior material 130 can output a sound S based on driving (or vibration) of the sound apparatus 30.

According to an embodiment of the present disclosure, one or more of the exterior material 120 and the vehicle interior material 130 of the vehicle 10 can be a vibration plate, a sound vibration plate, or a sound generating plate, or the like to output a sound S. For example, each of the exterior material 120 and the vehicle interior material 130 to output the sound can have a size (or an area) which is greater than that of the sound apparatus 30, and thus, can perform a function of a large-area vibration plate, a large-area sound vibration plate, or a large-area sound generating plate, thereby enhancing a sound characteristic and/or a sound pressure level characteristic of a sound band including a low-pitched sound band generated by the sound apparatus 30. For example, a frequency of a sound of the low-pitched sound band can be 300 Hz or less, 400 Hz or less, or 500 Hz or less, but embodiments of the present disclosure are not limited thereto.

Figure 2:
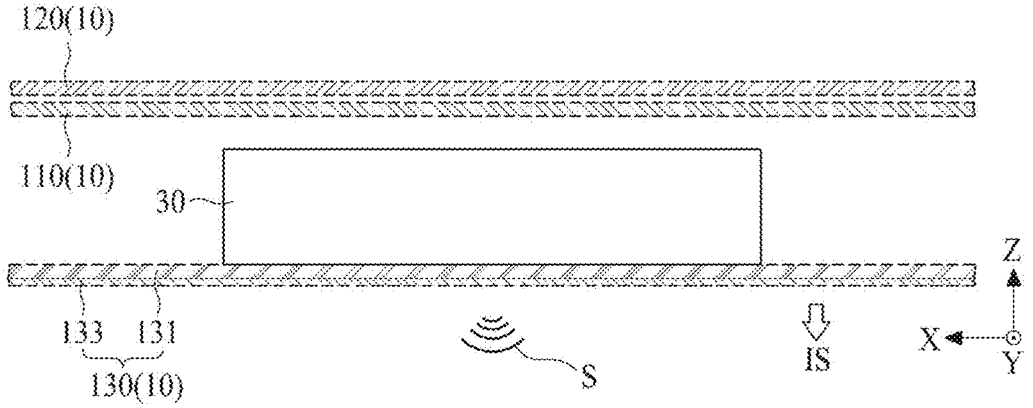
FIG. 2 illustrates a sound apparatus for vehicles according to another embodiment of the present disclosure.

FIG. 2 illustrates a sound apparatus for vehicles according to another embodiment of the present disclosure. Particularly, FIG. 2 illustrates an embodiment implemented by modifying the vehicle interior material 130 on which the sound apparatus described above with reference to FIG. 1 is disposed. Therefore, in the following description, repetitive descriptions of other elements other than a vehicle interior material 130 can be omitted or will be briefly given.

With reference to FIG. 2, a sound apparatus 30 according to another embodiment of the present disclosure can vibrate a vehicle interior material 130 to output a sound S.

The vehicle interior material 130 according to an embodiment of the present disclosure can include one or more materials of metal, wood, rubber, plastic, carbon, glass, fiber, cloth, paper, a mirror, and leather, but embodiments of the present disclosure are not limited thereto.

The vehicle interior material 130 according to another embodiment of the present disclosure can include a base member 131 and a surface member 133. For example, the base member 131 can be an injection material, a first interior material, an inner interior material, or a rear interior material, but embodiments of the present disclosure are not limited thereto. The surface member 133 can be a second interior material, an outer interior material, a front interior material, an outer surface member, a reinforcement member, or a decoration member, but embodiments of the present disclosure are not limited thereto.

The base member 131 can include a plastic material. The base member 131 according to an embodiment of the present disclosure can include an injection material. For example, the base member 131 can be an injection material which is implemented by an injection process using a thermoplastic resin or a thermosetting resin, but embodiments of the present disclosure are not limited thereto. The vehicle interior material 130 or the base member 131 can be configured to cover an inner portion of a vehicle 10. For example, the vehicle interior material 130 or the base member 131 can be configured to cover one or more of the main structure 110 and the exterior material 120 in an interior space IS of the vehicle 10. For example, the vehicle interior material 130 or the base member 131 can be configured to cover one surface (or an inner surface) of at least one or more of a main frame, a side frame, a door frame, and a handle frame, which are exposed at the interior space IS of the vehicle 10.

The base member 131 can include at least one or more of a planar portion and a curved portion. For example, the base member 131 can have a structure corresponding to a structure (or a rear structure) of a corresponding main structure 110, or can have a structure which differs from a structure of a corresponding main structure 110.

The surface member 133 can be disposed on the base member 131. For example, the surface member 133 can be disposed to cover the base member 131. The surface member 133 can cover the base member 131 at the inner portion or the interior space IS of the vehicle 10 and can be configured to be exposed at the inner portion or the interior space IS of the vehicle 10. For example, the surface member 133 can be disposed at or coupled to a front surface (or an interior surface) of the base member 131 exposed at the interior space IS of the vehicle 10.

The vehicle interior material 130 or the surface member 133 according to an embodiment of the present disclosure can include one or more materials of plastic, glass, fiber, leather, cloth, rubber, a mirror, wood, paper, carbon, and metal, but embodiments of the present disclosure are not limited thereto. For example, the surface member 133 can be a fiber material. For example, the surface member 133 including the fiber material can include at least one or more of a synthetic fiber, a carbon fiber (or an aramid fiber), and a natural fiber, but embodiments of the present disclosure are not limited thereto. For example, the surface member 133 including the fiber material can be a textile sheet, a knit sheet, or a nonwoven fabric, but embodiments of the present disclosure are not limited thereto. For example, the surface member 133 including the fiber material can be a fabric member, but embodiments of the present disclosure are not limited thereto.

The synthetic fiber can be a thermoplastic resin and can include a polyolefin-based fiber which is an eco-friendly material which does not relatively release a harmful substance. For example, the polyolefin-based fiber can include a polyethylene fiber, a polypropylene fiber, or a polyethylene terephthalate fiber, but embodiments of the present disclosure are not limited thereto. The polyolefin-based fiber can be a fiber of a single resin or a fiber of a core-shell structure, but embodiments of the present disclosure are not limited thereto. The natural fiber can be a composite fiber of one or two or more of a jute fiber, a kenaf fiber, an abaca fiber, a coconut fiber, and a wood fiber, but embodiments of the present disclosure are not limited thereto.

The sound apparatus 30 can be covered by the vehicle interior material 130. The sound apparatus 30 can be configured to vibrate the vehicle interior material 130 including the base member 131 and the surface member 133 to output a sound S toward the inner portion and/or the interior space IS of the vehicle 10.

The sound apparatus 30 according to another embodiment of the present disclosure can output the sound S toward the interior space IS of the vehicle 10 using the vehicle interior material 130 as a vibration plate or a sound vibration plate and can output a realistic sound S or stereo sound including a multichannel toward the interior space IS of the vehicle 10.

According to another embodiment of the present disclosure, the sound apparatus 30 can be configured to be surrounded by an enclosure. A space can be provided between the sound apparatus 30 and the enclosure, and a sound (or a sound pressure level) can be output based on a vibration of the vehicle interior material 130 based on air between the sound apparatus 30 and the enclosure. However, there can be a problem where a sound of the low-pitched sound band is not output, and there can be a problem where the flatness of a sound pressure level is reduced because the number of peaks and dips occurring in a reproduction frequency band of a sound (or a sound pressure level) generated based on a vibration of the vehicle interior material 130 increases and each of a highest sound pressure level and a lowest sound pressure level occurring in a reproduction frequency band of a sound (or a sound pressure level) generated based on a vibration of the vehicle interior material 130 increases. The peak can be a phenomenon where a sound pressure level bounces in a specific frequency, and the dip can be a phenomenon where a low sound pressure level is generated as the occurrence of a sound having a specific frequency is reduced. The flatness of a sound characteristic can be a level of a deviation between a highest sound pressure and a lowest sound pressure in a specific frequency.

The inventors of the present disclosure have performed extensive research and experiments for implementing a sound apparatus and a vehicular apparatus including the same, in which a sound characteristic of the low-pitched sound band can be improved and a flatness characteristic of a sound pressure level can be enhanced. Based on the extensive research and experiments, the inventors of the present disclosure have invented a sound apparatus and a vehicular apparatus including the same, which can output a sound including a high-pitched sound band to the low-pitched sound band and can enhance a balance characteristic of a sound pressure level or the flatness characteristic of a sound pressure level. This will be described below in detail.

Figure 3:
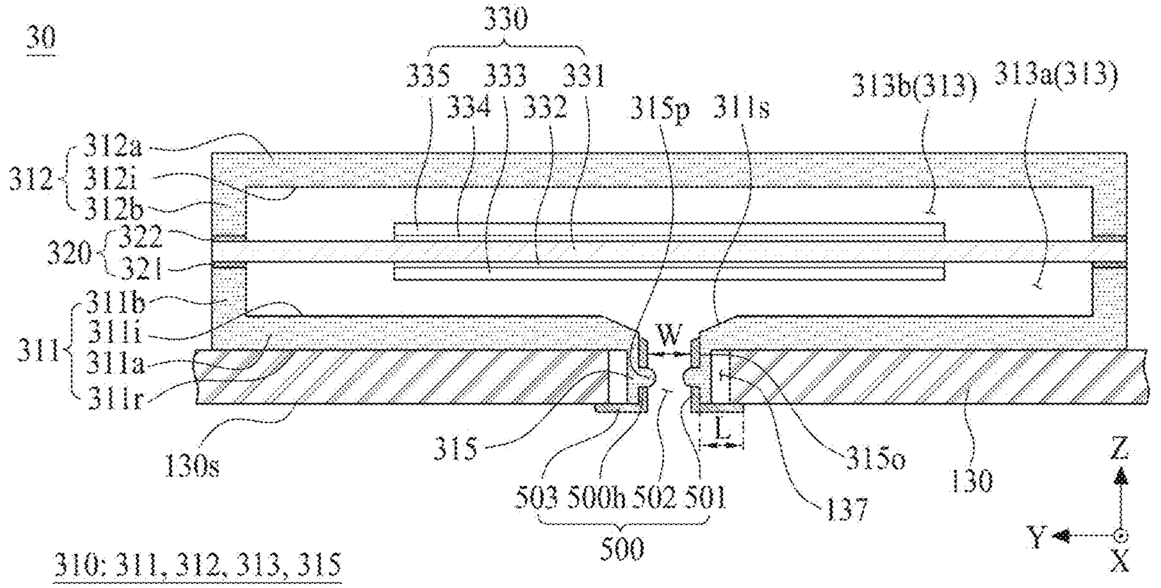
FIG. 3 illustrates a sound apparatus according to an embodiment of the present disclosure.

FIG. 3 illustrates a sound apparatus according to an embodiment of the present disclosure.

With reference to FIG. 3, a sound apparatus 30 (or a sound apparatus for vehicles) according to an embodiment of the present disclosure can be configured to vibrate a vibration object or a vehicle structure. For example, the sound apparatus 30 can be a sound generating apparatus, a sound output apparatus, a speaker apparatus, a car audio device, or an audio apparatus, but embodiments of the present disclosure are not limited thereto.

The sound apparatus 30 can be configured to be connected (or coupled) to the vibration object or the vehicle structure. For example, the sound apparatus 30 can be disposed at (or connected to) a portion of any one of the main structure 110, the exterior material 120, and the interior material 130 illustrated in FIG. 1 or 2 to generate (or output) a sound. For example, the sound apparatus 30 can vibrate any one of the main structure 110, the exterior material 120, and the interior material 130 illustrated in FIG. 1 or 2 to generate (or output) a sound.

The sound apparatus 30 according to an embodiment of the present disclosure can include an enclosure 310 and a sound generating module 330.

The enclosure 310 can be configured to support the sound generating module 330 and can be configured to output a sound generated based on driving (or vibration) of the sound generating module 330. For example, the enclosure 310 can be configured to surround or cover the sound generating module 330. For example, the enclosure 310 can be configured to support the sound generating module 330 and surround the sound generating module 330. For example, the enclosure 310 can be configured to accommodate (or receive) the sound generating module 330. For example, the enclosure 310 can be a housing, a case, an outer case, a case member, a housing member, a cabinet, a sealing member, a sealing cap, a sealing box, a sound box, or the like, but embodiments of the present disclosure are not limited thereto.

The enclosure 310 according to an embodiment of the present disclosure can include one or more materials of a metal material and a nonmetal material (or a composite nonmetal material), but embodiments of the present disclosure are not limited thereto. For example, the enclosure 310 can include one or more materials of a metal material, plastic, fiber, carbon, and wood, but embodiments of the present disclosure are not limited thereto. For example, the enclosure 310 can be configured in a metal material such as aluminum (Al) material, or configured in a plastic material such as plastic or styrene material, but embodiments of the present disclosure are not limited thereto. For example, the styrene material can be an ABS material. The ABS material can be acrylonitrile, butadiene, and styrene.

The enclosure 310 according to an embodiment of the present disclosure can include an internal space 313.

The internal space 313 can be configured to accommodate (or receive) the sound generating module 330. For example, the internal space 313 can be an accommodation space, a receiving space, a gap space, an air space, a vibration space, a sound space, a sound box, or a sealing space, or the like, but embodiments of the present disclosure are not limited thereto.

The enclosure 310 according to an embodiment of the present disclosure can include one or more enclosures (or enclosure members) 311 and 312. For example, the enclosure 310 can include a first enclosure 311 and a second enclosure 312.

The first enclosure (or a first enclosure member) 311 can be configured at a first surface (or a rear surface or a lower surface) of the sound generating module 330. The first enclosure 311 can be configured to support the first surface of the sound generating module 330. For example, the first enclosure 311 can be configured to cover the first surface of the sound generating module 330. For example, the first enclosure 311 can be configured to support a portion of the sound generating module 330. For example, the first enclosure 311 can be configured to cover at least a portion of the first surface of the sound generating module 330. For example, the first enclosure 311 can be configured to be connected or coupled to a portion of the sound generating module 330.

The first enclosure 311 according to an embodiment of the present disclosure can include a first plate 311*a* and a first sidewall 311*b*.

The first plate 311*a* can be configured at the first surface of the sound generating module 330. The first plate 311*a* can be configured to cover the first surface of the sound generating module 330. The first plate 311*a* can be disposed or configured spaced apart from the first surface of the sound generating module 330.

The first sidewall 311*b* can be connected to an edge portion (or a periphery portion) of the first plate 311*a*. The first sidewall 311*b* can be vertically connected to the edge portion of the first plate 311*a*. For example, the first sidewall 311*b* can be vertically connected to a first edge portion (or an inner edge portion or a first periphery portion) of the first plate 311*a* facing the first surface of the sound generating module 330. The first sidewall 311*b* can be configured to support a portion of the sound generating module 330. For example, the first sidewall 311*b* can be configured to be connected or coupled to a portion of the sound generating module 330.

The first sidewall 311*b* can be disposed between the first surface of the sound generating module 330 and the first plate 311*a*. The first sidewall 311*b* can provide a space 313*b* on an inner lateral surface 311*i* of the first enclosure 311 or an inner lateral surface 311*i* of the first plate 311*a*. Accordingly, the first surface of the sound generating module 330 can be spaced apart from the inner lateral surface 311*i* of the first plate 311*a* by the first sidewall 311*b*.

The second enclosure (or a second enclosure member) 312 can be configured at a second surface, which is opposite to the first surface, of the sound generating module 330. The second enclosure 312 can be configured to support the second surface of the sound generating module 330. The second enclosure 312 can be configured to cover the second surface of the sound generating module 330. For example, the second enclosure 312 can be configured to support a portion of the sound generating module 330. For example, the second enclosure 312 can be configured to cover an entire second surface of the sound generating module 330. For example, the second enclosure 312 can be configured to surround the entire second surface of the sound generating module 330. For example, the second enclosure 312 can be connected or coupled to a portion of the sound generating module 330.

The second enclosure 312 according to an embodiment of the present disclosure can include a second plate 312*a* and a second sidewall 312*b*.

The second plate 312*a* can be configured to cover the sound generating module 330. The second plate 312*a* can be configured to cover the second surface of the sound generating module 330. The second plate 312*a* can be spaced apart from the second surface of the sound generating module 330.

The second sidewall 312*b* can be connected to an edge portion (or a periphery portion) of the second plate 312*a*. The second sidewall 312*b* can be vertically connected to the edge portion of the second plate 312*a*. For example, the second sidewall 312*b* can be vertically connected to a second edge portion (or an inner edge portion or a second periphery portion) of the second plate 312*a* facing the second surface of the sound generating module 330. The second sidewall 312*b* can be configured to support a portion of the sound generating module 330. For example, the second sidewall 312*b* can be configured to be connected or coupled to a portion of the sound generating module 330.

According to an embodiment of the present disclosure, the internal space 313 of the enclosure 310 can be between the first enclosure 311 and the second enclosure 312. For example, the internal space 313 of the enclosure 310 can be provided at a region between the first enclosure 311 and the sound generating module 330, and can be provided at a region between the second enclosure 312 and the sound generating module 330.

According to an embodiment of the present disclosure, the internal space 313 of the enclosure 310 can include a first space 313*a* and a second space 313*b*.

The first space 313*a* and the second space 313*b* can be spatially separated from each other by the sound generating module 330, but embodiments of the present disclosure are not limited thereto.

The first space 313*a* can include a space which is provided between the first enclosure 311 and the sound generating module 330. For example, the first space 313*a* can include a space which is provided between the first enclosure 311 and the first surface of the sound generating module 330. For example, the first space 313*a* can include a space which is provided between the inner lateral surface 311*i* of the first plate 311*a* and the first surface of the sound generating module 330 by the first sidewall 311*b* of the first enclosure 311.

The second space 313*b* can include a space which is provided between the second enclosure 312 and the sound generating module 330. For example, the second space 313*b* can include a space which is provided between the second enclosure 312 and the second surface of the sound generating module 330. For example, the second space 313*b* can include a space which is provided between an inner surface 312*i* of the second plate 312*a* and the second surface of the sound generating module 330 by the second sidewall 312*b* of the second enclosure 312.

The enclosure 310 according to an embodiment of the present disclosure can further include a protrusion part 315.

The protrusion part 315 can be configured to output a sound or a vibration generated in the internal space 313 of the enclosure 310 to an outer space of the enclosure 310. The protrusion part 315 can be configured to include an opening hole 315*o* connected to (or communicated with) the internal space 313. The protrusion part 315 can protrude by a certain length from a rear surface 311*r* of the enclosure 310 to have the opening hole 315*o*. For example, the protrusion part 315 can protrude from the rear surface 311*r* of the enclosure 310 along a thickness direction Z of the enclosure 310.

The protrusion part 315 according to an embodiment of the present disclosure can protrude from the first enclosure 311 of the enclosure 310. For example, the protrusion part 315 can protrude from a rear surface 311*r* of the first enclosure 311 to have the opening hole 315*o*. For example, the protrusion part 315 can protrude in a direction perpendicular to the rear surface 311*r* of the first enclosure 311.

The protrusion part 315 and the opening hole 315*o* can have the same a cross-sectional shape, but embodiments of the present disclosure are not limited thereto. The protrusion part 315 and the opening hole 315*o* can be implemented in a shape suitable for outputting a sound, generated in the internal space 313 of the enclosure 310, to an external space of the enclosure 310. For example, the protrusion part 315 can include a line shape, but embodiments of the present disclosure are not limited thereto. The protrusion part 315 can have a tetragonal shape having a short side and a long side. For example, a corner portion of the protrusion part 315 having the tetragonal shape can have a curved shape. For example, the protrusion part 315 can include a circular shape or an oval shape, but embodiments of the present disclosure are not limited thereto.

According to an embodiment of the present disclosure, the protrusion part 315 and the opening hole 315*o* can have a "–"-shape (or a straight line shape) or a line shape, but embodiments of the present disclosure are not limited thereto. The protrusion part 315 and the opening hole 315*o* can have the "–"-shape (or straight line shape) parallel to a first direction X or a long side direction of the enclosure 310. For example, the protrusion part 315 and the opening hole 315*o* can have a slit shape having a long axis and a short axis. For example, the long axis of the protrusion part 315 and the opening hole 315*o* can be parallel to the first direction X or the long side direction of the enclosure 310. For example, the short axis of the protrusion part 315 and the opening hole 315*o* can be parallel to a second direction Y or a short side direction of the enclosure 310.

According to another embodiment of the present disclosure, the protrusion part 315 and the opening hole 315*o* can be configured to include a "+"-shape (or a cross shape) or a "*"-shape (or an asterisk shape) including two or more opening holes (or line holes) crossing each other.

The opening hole 315*o* can be formed to pass through a center portion of the protrusion part 315 along a protrusion direction (or a length direction) of the protrusion part 315. For example, a length (or a longest length or a long-axis length) of the opening hole 315*o* can be greater than a protrusion length (or a protrusion height) of the protrusion part 315. For example, the protrusion length of the protrusion part 315 can be a length (or a shortest length) between the rear surface 311*r* of the enclosure 310 (or the first enclosure 311) and an end of the protrusion part 315.

According to an embodiment of the present disclosure, a sound or a vibration generated in the internal space 313 of the enclosure 310 by the sound generation module 330 can be output to the outer space of the enclosure 310 through the opening hole 315*o* of the protrusion part 315. For example, the protrusion part 315 can be a port member, a cylinder member, a bushing member, a sound emission member, a duct member, or a vent member, but embodiments of the present disclosure are not limited thereto. For example, the opening hole 315*o* of the protrusion part 315 can be a hole, a slot, a slit, a hollow hole, a port hole, a first through hole, a sound emission hole, a sound emission part, a sound output hole, a sound emission port, a duct hole, or a vent hole, but embodiments of the present disclosure are not limited thereto.

According to another embodiment of the present disclosure, the enclosure 310 or the first enclosure 311 can include an opening part. In this case, the protrusion part 315 can have an opening hole 315*o* connected to the opening part and can protrude from the enclosure 310 or the rear surface 311*r* of the first enclosure 311 to surround the opening part.

The first enclosure 311 of the enclosure 310 can include a slope surface (or an inclined surface) 311*s*. The slope surface 311*s* can be configured to be inclined between the opening part 310*o* and the inner lateral surface 311*i* of the first enclosure 311. The slope surface 311*s* can be configured to guide a sound, generated based on a vibration of the sound generating module 330, to the interior space of the vehicle 10. Accordingly, the sound generated based on the vibration of the sound generating module 330 can be output to the interior space of the vehicle 10, and a sound characteristic and/or a sound pressure level characteristic of a sound including the low-pitched sound band can be more enhanced. For example, the slope surface 311*s* can be a guide surface or a sound guide surface, but embodiments of the present disclosure are not limited thereto.

The sound generating module 330 can be at the internal space 313 of the enclosure 310. The sound generating module 330 can be configured to accommodate (or receive) into the internal space 313 of the enclosure 310. The sound generating module 330 can be configured to generate a sound (or a sound pressure level or a sound wave) in the internal space 313 of the enclosure 310. For example, the sound generating module 330 can be configured to be accommodated (or received) into one or more of the first space 313*a* and the second space 313*b* of the internal space 313 of the enclosure 310. For example, the sound generating module 330 can be a sound generating unit, a sound generating member, a sound reproduction module, a sound reproduction unit, a car audio module, a car audio unit, a speaker module, or a speaker unit, but embodiments of the present disclosure are not limited thereto.

The sound generating module 330 according to an embodiment of the present disclosure can be configured to generate or output a sound or a vibration. For example, the sound generating module 330 can be configured to output a sound or a vibration toward an interior space of a vehicle, based on driving (or vibration). For example, a sound or a vibration generated based on driving (or vibration) of the sound generating module 330 can be output to the interior space of the vehicle through the opening hole 315*o* of the protrusion part 315.

The sound generating module 330 according to another embodiment of the present disclosure can generate a sound, based on a vibration of a vibration object or a vehicle structure. For example, the sound generating module 330 can be configured to vibration a vehicle interior material. For example, the sound generating module 330 can generate or output a sound or a vibration, based on a vibration (or displacement) of the vehicle interior material. For example, a sound (or a sound wave) generated based on driving (or vibration) of the sound generating module 330 can vibrate the vehicle interior material, and a sound or a vibration generated based on a vibration of the vehicle interior material can be directly output to the interior space of the vehicle.

The sound generating module 330 according to another embodiment of the present disclosure can generate a sound, based on a vibration of the enclosure 310 and the vibration object (or the vehicle structure). For example, the sound generating module 330 can be configured to vibrate or directly vibrate the enclosure 310 and the vibration object (or the vehicle structure). For example, the sound generating module 330 can generate or output a sound or a vibration, based on a vibration (or displacement) of the enclosure 310 and the vehicle interior material. For example, a sound (or a sound wave) generated in the internal space 313 of the enclosure 310 based on driving (or vibration) of the sound generating module 330 can vibrate the enclosure 310, a vibration of the enclosure 310 can vibrate the vehicle interior material, and a sound or a vibration generated based on a vibration of the vehicle interior material can be output to the interior space of the vehicle.

According to another embodiment of the present disclosure, a portion of a sound (or a sound wave or a vibration) generated in the internal space 313 of the enclosure 310 based on driving (or vibration) of the sound generating module 330 can be output to the interior space of the vehicle through the opening hole 315*o* of the protrusion part 315, and the other of the sound (or the sound wave or the vibration) generated based on driving (or vibration) of the sound generating module 330 can vibrate one or more of the enclosure 310 and the vehicle interior material. A sound or a vibration generated based on the vibration of one or more of the enclosure 310 and the vehicle interior material can be output to the interior space of the vehicle.

The sound generating module 330 according to an embodiment of the present disclosure can include a vibration member 331 and a vibration apparatus 333 and 335.

The vibration member 331 can generate a vibration or can output a sound (or a sound wave or a sound pressure level) based on the driving (or vibration) of the vibration apparatus 333 and 335. For example, the vibration member 331 can generate the vibration or output the sound (or sound wave) in the internal space 313 of the enclosure 310 based on a vibration (or displacement) of the vibration apparatus 333 and 335. For example, the vibration member 331 can be a plate, a vibration plate, a diaphragm, a vibration substrate, a vibration object, a vibration panel, a sound plate, a sound panel, a passive vibration plate, a passive vibration member, a passive vibration panel, a sound output plate, or a sound vibration plate, but embodiments of the present disclosure are not limited thereto.

According to an embodiment of the present disclosure, the vibration member 331 can include a metal material, or can include a single nonmetal material or a composite nonmetal material of one or more of wood, rubber, plastic, carbon, glass, fiber, cloth, paper, mirror, and leather, but embodiments of the present disclosure are not limited thereto. For example, the paper can be cone paper for speakers. For example, the cone paper can be pulp or foamed plastic, or the like, but embodiments of the present disclosure are not limited thereto.

The metal material of the vibration member 331 can include one or more materials of stainless steel, aluminum (Al), an Al alloy, a magnesium (Mg), a Mg alloy, and a magnesium-lithium (Mg—Li) alloy, but embodiments of the present disclosure are not limited thereto. For example, the vibration member 331 can be configured in a metal material such as aluminum (Al) material, or configured in a plastic material such as plastic or styrene material, but embodiments of the present disclosure are not limited thereto.

The plastic material of the vibration member 331 can be configured in polyethylene terephthalate, polycarbonate, polyimide, polypropylene, polyarylate, polyethersulfone, polyethylene naphthalate, polysulfone, cyclo-olefin copolymer, or carbon fiber reinforced plastic (CFRP), or the like, but embodiments of the present disclosure are not limited thereto.

The styrene material of the vibration member 331 can be an ABS material. The ABS material can be acrylonitrile, butadiene, and styrene.

The vibration member 331 can include a porous material. For example, the vibration member 331 can include a micro cellular plastic material. For example, the vibration member 331 can be configured in a polyethylene terephthalate material or a polycarbonate material. For example, the vibration member 331 can be configured in a Micro Cellular polyethylene terephthalate (MCPET) material. The vibration member 331 configured in the MCPET can have capability to reproduce a high original sound because having a low density and an excellent elastic force, thereby enhancing the quality of a sound.

According to an embodiment of the present disclosure, the vibration member 331 can include a tetragonal shape, but embodiments of the present disclosure are not limited thereto. For example, the vibration member 331 can have a rectangular shape including a long side and a short side. For example, the vibration member 331 can include a first surface and a second surface different from (or opposite to) the first surface. For example, in the vibration member 331, the first surface can be a rear surface, a backside surface, or a lower surface, and the second surface can be a front surface or an upper surface, but embodiments of the present disclosure are not limited thereto.

The vibration apparatus 333 and 335 can be configured to vibrate the vibration member 331. The vibration apparatus 333 and 335 can be configured to vibrate (or displace or drive) based on a driving signal (or a vibration driving signal or a voice signal) applied thereto to vibrate (or displace or drive) the vibration member 331.

The vibration apparatus 333 and 335 can correspond to the vibration member 331, or have a same shape as that of the vibration member 331, but embodiments of the present disclosure are not limited thereto. For example, the vibration apparatus 333 and 335 can have a different shape from the vibration member 331. For example, the vibration apparatus

333 and 335 can include a rectangular shape or a square shape. For example, the vibration apparatus 333 and 335 can have a rectangular shape or a square shape which is smaller than the vibration member 331.

The vibration apparatus 333 and 335 can be disposed or configured at the vibration member 331. For example, the vibration apparatus 333 and 335 can be disposed or configured at one or more of the first surface and the second surface of the vibration member 331. For example, the sound generating module 330 can include a plurality of vibration apparatuses 333 and 335. For example, the plurality of vibration apparatuses 333 and 335 can be disposed or configured at one or more of the first surface and the second surface of the vibration member 331. For example, the plurality of vibration apparatuses 333 and 335 can be disposed or configured at each of the first surface and the second surface of the vibration member 331 with the vibration member 331 therebetween.

The sound generating module 330 or the vibration apparatus 333 and 335 according to an embodiment of the present disclosure can include a first vibration apparatus 333 and a second vibration apparatus 335.

The first vibration apparatus 333 and the second vibration apparatus 335 can be configured at the vibration member 331. For example, the first vibration apparatus 333 and the second vibration apparatus 335 can be disposed with the vibration member 331 therebetween. For example, the first vibration apparatus 333 can be disposed or configured at the first surface (or a rear surface) of the vibration member 331, and the second vibration apparatus 335 can be disposed or configured at the second surface (or a front surface) of the vibration member 331.

According to an embodiment of the present disclosure, a long side of each of the first vibration apparatus 333 and the second vibration apparatus 335 can be parallel to the long side of the vibration member 331 and can be spaced apart from the long side of the vibration member 331 to have a first distance (or a first shortest distance). For example, each of the first vibration apparatus 333 and the second vibration apparatus 335 can have a size which is smaller than the vibration member 331.

The first vibration apparatus 333 and the second vibration apparatus 335 can vibrate (or displace or drive) based on a driving signal (or a vibration driving signal or a voice signal) applied thereto to vibrate (or displace or drive) the vibration member 331. The vibration member 331 can generate a vibration or can output a sound (or a sound wave), based on the displacements (or driving) of the first vibration apparatus 333 and the second vibration apparatus 335.

According to another embodiment of the present disclosure, the driving signals (or the vibration driving signal or the voice signal) applied to the first vibration apparatus 333 and the second vibration apparatus 335 can be a same or different. For example, the driving signals applied to the first vibration apparatus 333 and the second vibration apparatus 335 can have a same phase or different phases. For example, the first vibration apparatus 333 and the second vibration apparatus 335 can have a bimorph structure where the first and second vibration apparatuses 333 and 335 are disposed with the vibration member 331 therebetween. Each of the first vibration apparatus 333 and the second vibration apparatus 335 can independently vibrate the vibration member 331, and thus, an influence thereof on a sound characteristic based on a material and a characteristic of the vibration member 331 can be reduced. Accordingly, a sound characteristic and/or a sound pressure level characteristic of the sound apparatus 30 can be enhanced.

According to another embodiment of the present disclosure, the first vibration apparatus 333 and the second vibration apparatus 335 can be configured at any one of the first surface and the second surface of the vibration member 331. For example, the first vibration apparatus 333 can be configured at any one of the first surface and the second surface of the vibration member 331. For example, the first vibration apparatus 333 can be connected to or configured at the first surface of the vibration member 331. For example, the second vibration apparatus 335 can be connected to or configured at the first vibration apparatus 333. For example, the second vibration apparatus 335 can be stacked on the first vibration apparatus 333.

The sound apparatus 30 or the sound generating module 330 according to an embodiment of the present disclosure can further include an adhesive member 332 and 334. For example, the adhesive member can include a first adhesive member 332 and a second adhesive member 334.

The first adhesive member 332 can be disposed (or interposed) between the vibration member 331 and the first vibration apparatus 333. The first vibration apparatus 333 can be connected or coupled to the vibration member 331 by the first adhesive member 332. For example, the first vibration apparatus 333 can be connected or coupled to the first surface of the vibration member 331 by the first adhesive member 332.

The second adhesive member 334 can be disposed (or interposed) between the vibration member 331 and the second vibration apparatus 335. The second vibration apparatus 335 can be connected or coupled to the vibration member 331 by the second adhesive member 334. For example, the second vibration apparatus 335 can be connected or coupled to the second surface of the vibration member 331 by the second adhesive member 334.

The first adhesive member 332 and the second adhesive member 334 can include an adhesive layer (or a tacky layer) which is good in adhesive force or attaching force. For example, the first adhesive member 332 and the second adhesive member 334 can include a same or different adhesive layers (or tacky layers). For example, the first adhesive member 332 and the second adhesive member 334 can include an adhesive, a double-sided adhesive, a double-sided tape, a double-sided adhesive tape, a double-sided adhesive foam tape, a double-sided pad, a double-sided foam pad, a double-sided adhesive foam pad, a double-sided cushion tape, or a tacky sheet, but embodiments of the present disclosure are not limited thereto.

The sound apparatus 30 according to an embodiment of the present disclosure can further include a coupling member 320.

The coupling member 320 can be configured to connect or couple the vibration member 331 and the enclosure 310 to each other. For example, the coupling member 320 can be between an edge portion (or a periphery portion) of the vibration member 331 and the enclosure 310. The coupling member 320 can include a first coupling member 321 and a second coupling member 322.

The first coupling member 321 can be between the vibration member 331 and the first enclosure 311. The first coupling member 321 can be connected or coupled between the edge portion of the vibration member 331 and the first enclosure 311. For example, the first sidewall 311*b* of the first enclosure 311 can be connected or coupled to the first surface of the vibration member 331 by the first coupling member 321. For example, the first sidewall 311*b* of the first enclosure 311 can be connected or coupled to an edge portion of the first surface of the vibration member 331 by the first coupling member 321.

The second coupling member 322 can be between the vibration member 331 and the second enclosure 312. The second coupling member 322 can be connected or coupled between the edge portion of the vibration member 331 and the second enclosure 312. For example, the second sidewall 312*b* of the second enclosure 312 can be connected or coupled to the second surface of the vibration member 331 by the second coupling member 322. For example, the second sidewall 312*b* of the second enclosure 312 can be connected or coupled to an edge portion of the second surface of the vibration member 331 by the second coupling member 322.

According to an embodiment of the present disclosure, the coupling member 320 can be configured to minimize the transfer of a vibration of the vibration member 331 to the first sidewall 311*b* of the first enclosure 311. The coupling member 320 can include a material characteristic suitable for blocking the vibration. For example, the coupling member 320 can include a material having elasticity. For example, the coupling member 320 can include a material having elasticity for vibration absorption (or impact absorption). The coupling member 320 according to an embodiment of the present disclosure can be configured in polyurethane materials, or polyolefin materials, but embodiments of the present disclosure are not limited thereto. For example, the coupling member 320 can include one or more of an adhesive, a double-sided adhesive, a double-sided tape, a double-sided adhesive tape, a double-sided foam tape, a double-sided adhesive foam tape, a double-sided pad, a double-sided foam pad, a double-sided adhesive foam pad, and a double-sided cushion tape, but embodiments of the present disclosure are not limited thereto.

The sound apparatus 30 according to an embodiment of the present disclosure can further include a coupling part 500.

The coupling part 500 can be configured to couple the enclosure 310 to the vehicle interior material 130 (or the mount object) with the enclosure 310 mounted thereon. The coupling part 500 can be configured to connect or couple the enclosure 310 to the vehicle interior material 130. The coupling part 500 can be configured to fix the enclosure 310 mounted on the vehicle interior material 130. For example, the sound apparatus 30 or the enclosure 310 can be connected or coupled to the vehicle interior material 130 by the coupling part 500. A sound based on a vibration of the sound generating module 330 can be output to an interior space of a vehicle through the coupling part 500. For example, the coupling part 500 can be a coupling means, a coupling structure, a cover structure, a sound cover member, a sound guide member, a waveguide, or a sound emission member, or the like, but embodiments of the present disclosure are not limited thereto. For example, the mount object can be a structure with the sound apparatus 30 or the enclosure 310 mounted thereon.

The coupling part 500 according to an embodiment of the present disclosure can include a hollow part 501 connected to the internal space 313 of the enclosure 310 and can be configured to be accommodated (or inserted) into the opening hole 315*o* of the protrusion part 315 at the enclosure 310. The coupling part 500 can be detachably fastened (or coupled) to the protrusion part 315 at the enclosure 310. For example, the coupling part 500 and the protrusion part 315 can be fastened (or coupled) to each other by a hook fastening scheme using a projection 315*p* and a hole 500*h*. For example, the protrusion part 315 can include the projection 315*p* at the opening hole 315*o*, and the coupling part 500 can include the hole 500*h* which accommodates the projection 315*p* of the protrusion part 315, but embodiments of the present disclosure are not limited thereto.

According to an embodiment of the present disclosure, the protrusion part 315 of the enclosure 310 can pass through (or penetrate) the vehicle interior material 130 (or the mount object). For example, in a case where the sound apparatus 30 is equipped (or mounted) at the vehicular interior material 130, the protrusion part 315 can pass through a portion of the vehicular interior material 130. The vehicle interior material 130 can include a hole 137 which accommodates the protrusion part 315. For example, the coupling part 500 can pass through the hole 137 of the vehicular interior material 130 and can be detachably fastened (or coupled) to the protrusion part 315. For example, the hole 137 can be a through hole, a first through hole, an opening part, an opening hole, a slit, a slot, a sound hole, a sound emission hole, or a sound output hole, but embodiments of the present disclosure are not limited thereto.

The hollow part 501 of the coupling part 500 can be connected to (or communicated with) the opening hole 315*o* at the protrusion part 315 of the enclosure 310. The hollow part 501 can be connected to the internal space 313 of the enclosure 310. For example, the hollow part 501 can be connected to the internal space 313 of the enclosure 310 through the opening hole 315*o* of the protrusion part 315. For example, the hollow part 501 can be connected to the first space 313*a* in the internal space 313 of the enclosure 310 through the opening hole 315*o* of the protrusion part 315. Sound (or sound waves) based on the vibration of the sound generating module 330 can be output to the interior space of the vehicle through the opening hole 315*o* of the protrusion part 315 and the hollow part 501 of the coupling part 500. The sound (or sound waves) generated in the internal space 313 of the enclosure 310 based on the vibration of the sound generating module 330 can be output to the interior space of a vehicle through the hollow part 501 of the coupling part 500 and the opening hole 315*o* of the protrusion part 315.

The coupling part 500 according to an embodiment of the present disclosure can further include a hollow member 502 and a latch member 503.

The hollow member 502 can be accommodated (or inserted) into the opening hole 315*o* in the opening part 310*o* of the enclosure 310. The hollow member 502 can be connected to or coupled to the protrusion part 315 of the enclosure 310 through the hole 137 of vehicle interior material 130. The hollow member 502 can be detachably fastened to the protrusion part 315 of the enclosure 310. The hollow member 502 can be accommodated (or inserted) into the opening hole 315*o* of the protrusion part 315 and can be fastened to the protrusion part 315 by a hook fastening scheme. For example, the hollow member 502 can be fastened to the protrusion part 315 in a process of being accommodated (or inserted) into the opening hole 315*o* of the protrusion part 315. For example, the hollow member 502 can be elastically deformed (or strained) and fastened to the protrusion part 315 in a process of being accommodated (or inserted) into the opening hole 315*o* of the protrusion part 315. For example, the hollow member 502 can be fastened to the protrusion part 315 by an elastic restoration force of the protrusion part 315 in a process of being accommodated (or inserted) into the opening hole 315*o* of the protrusion part 315.

The hollow member 502 can include the hollow part 501. The hollow part 501 can be connected to the opening hole 315*o* of the protrusion part 315. The hollow part 501 can be connected to the internal space 313 of the enclosure 310. The hollow part 501 can be connected to the internal space 313 of the enclosure 310 through the opening hole 315*o* of the protrusion part 315. For example, the hollow part 501 can be a sound emission port or a sound output port, but embodiments of the present disclosure are not limited thereto.

The latch member 503 can be configured to be connected or coupled to the vehicle interior material 130 (or a mount object). For example, the latch member 503 can be configured to be in contact with or in close contact with the vehicle interior material 130 (or the mount object) in which the enclosure 310 is mounted. The latch member 503 can be in contact with or in close contact with the vehicle interior material 130 at the periphery of the hole 137 of the vehicle interior material 130. For example, the latch member 503 can be connected or in contact with or in close contact with an inner surface 130*s* of the vehicle interior material 130 at the periphery of the hole 137 of the vehicle interior material 130. For example, the inner surface 130*s* of the vehicle interior material 130 can be a first surface, an interior surface, a rear surface, or a lower surface. For example, the latch member 503 can be a latch or the like, but embodiments of the present disclosure are not limited thereto.

The latch member 503 can be connected to or configured at the hollow member 502. The latch member 503 can be connected to the hollow member 502 to have a certain length L. For example, an outer surface of the hollow member 502 can be adjacent to the inner surface 130*s* of the vehicle interior material 130. For example, the hollow member 502 can cover the inner surface 130*s* of the vehicle interior material 130 at the periphery of the hole 137 of the vehicle interior material 130. For example, the latch member 503 can be in contact with or in close contact with the inner surface 130*s* of the vehicle interior material 130 at the periphery of the hole 137 of the vehicle interior material 130. Accordingly, a periphery of the hole 137 of the vehicular interior material 130 can be disposed or interposed between the latch member 503 and the enclosure 310, and the enclosure 310 can be equipped in (or mounted on) the vehicular interior material 130.

Figure 4:
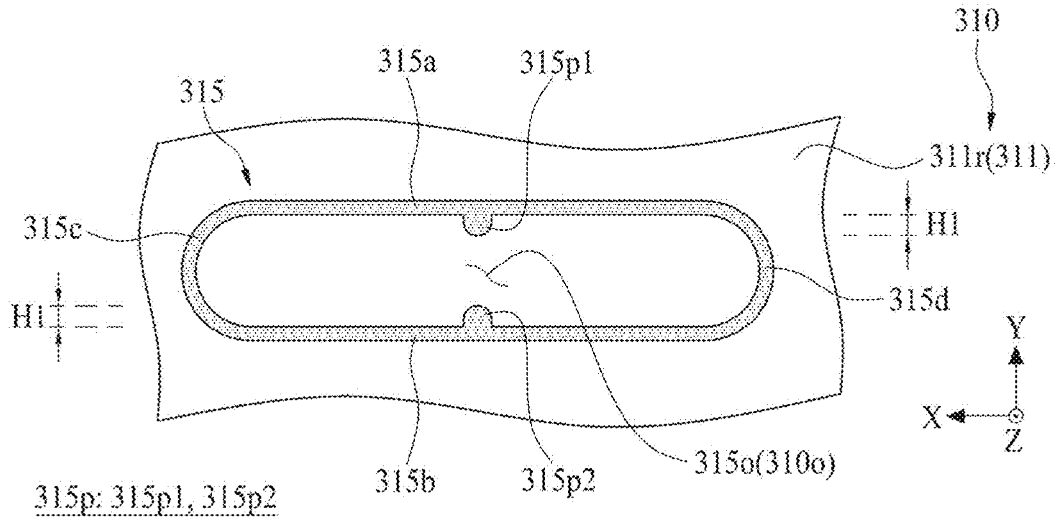
FIG. 4 illustrates a protrusion part illustrated in FIG. 3 according to an embodiment of the present disclosure.

FIG. 4 illustrates a protrusion part illustrated in FIG. 3 according to an embodiment of the present disclosure.

With reference to FIGS. 3 and 4, the protrusion part 315 according to an embodiment of the present disclosure can include a first protrusion wall 315*a*, a second protrusion wall 315*b*, and one or more projections 315*p*.

Each of the first protrusion wall 315*a* and the second protrusion wall 315*b* can be protrude or vertical protrude from the rear surface 311*r* of the enclosure 310 or the first enclosure 311. The first protrusion wall 315*a* and the second protrusion wall 315*b* can protrude to face each other. For example, when the enclosure 310 or the first enclosure 311 includes the opening portion 310*o* corresponding to the opening hole 315*o* of the protrusion part 315, each of the first protrusion wall 315*a* and the second protrusion wall 315*b* can be configured to face a first side and a second side of the opening portion 310*o*.

Each of the first protrusion wall 315*a* and the second protrusion wall 315*b* can vertically protrude to have a certain height from the rear surface 311*r* of the first enclosure 311 or the enclosure 310, and thus have (or gain) elasticity. For example, each of the first protrusion wall 315*a* and the second protrusion wall 315*b* can be elastically deformed away (or distancing) from a center portion of the opening hole 315*o* or in a direction closer to the center portion of the opening hole 315*o*.

The first protrusion wall 315*a* can be configured to be parallel to a first direction X or a long side direction of an enclosure 310. The first protrusion wall 315*a* can have a "–"-shape (or a straight line shape) or a line shape having a certain length. For example, the first protrusion wall 315*a* can configure a first long side or a first sidewall of the protrusion part 315.

The second protrusion wall 315*b* can be configured to be parallel to the first protrusion wall 315*a*. For example, the second protrusion wall 315*b* can be configured in parallel with the first protrusion wall 315*a* with the opening hole 315*o* therebetween. The second protrusion wall 315*b* can have a "–"-shape (or a straight line shape) or a line shape having a same length as the first protrusion wall 315*a*. For example, the second protrusion wall 315*b* can configure a second long side or a second sidewall of the protrusion part 315. For example, the first protrusion wall 315*a* and the second protrusion wall 315*b* can be configured to directly face each other with the opening hole 315*o* therebetween.

The one or more projections 315*p* can be one or more first fastening members (or a first fastening means) for fastening (or coupling) between the coupling part 500 and the protrusion part 315, but embodiments of the present disclosure are not limited thereto.

The protrusion part 315 or the one or more projections 315*p* can include a first projection 315*p*1 and a second projection 315*p*2.

The first projection 315*p*1 and the second projection 315*p*2 can be one or more first fastening members (or a first fastening means) for fastening (or coupling) between the coupling part 500 and the protrusion part 315, but embodiments of the present disclosure are not limited thereto.

The first projection 315*p*1 can protrude from an inner surface of the first protrusion wall 315*a* so as to be disposed in the opening hole 315*o*. For example, the first projection 315*p*1 can protrude in a direction toward the center portion of the opening hole 315*o* from the inner surface of the first protrusion wall 315*a* facing the second protrusion wall 315*b*.

The first projection 315*p*1 according to an embodiment of the present disclosure can protrude from the inner surface of the first protrusion wall 315*a* to include a semispherical shape.

The first projection 315*p*1 according to another embodiment of the present disclosure can include a catching (or latching) projection (or a latching portion) and a sliding projection (or a sliding portion).

The catching projection can protrude from the inner surface of the first protrusion wall 315*a* to have a disk shape. A lateral surface of the catching projection can be configured with a vertical surface. The lateral surface of the catching projection can be perpendicular to the inner surface of the first protrusion wall 315*a*. The catching projection can be configured to prevent the coupling part 500 fastened to the protrusion part 315 from being separated or detached from the protrusion part 315 by a relatively weak force. For example, a protrusion height (or a protrusion length) of the catching projection can be smaller than a thickness of the hollow member 502 of the coupling part 500.

The sliding projection can protrude from the catching projection. The sliding projection can include a curved surface. For example, the sliding projection can include a semispherical shape. Because the sliding projection has a curved shape, the coupling part 500 can be easily fastened to the protrusion part 315.

The second projection 315*p*2 can protrude from an inner surface of the second protrusion wall 315*b* so as to be disposed in the opening hole 315*o*. For example, the second projection 315*p*2 can protrude in a direction toward the center portion of the opening hole 315*o* from the inner surface of the second protrusion wall 315*b* facing the first protrusion wall 315*a*. For example, the second projection 315*p*2 can protrude from the inner surface of the second protrusion wall 315*b* facing the first projection 315*p*1.

The second projection 315*p*2 according to an embodiment of the present disclosure can protrude from the inner surface of the second protrusion wall 315*b* to include a semispherical shape.

The second projection 315*p*2 according to another embodiment of the present disclosure can include a catching (or latching) projection (or a hanging portion a latching portion) and a sliding projection (or a sliding portion). Except for that the catching projection and the sliding projection of the second projection 315*p*2 protrude from the inner surface of the second protrusion wall 315*b*, the catching projection and the sliding projection of the second projection 315*p*2 can be substantially a same as the catching projection and the sliding projection of the first projection 315*p*1, and thus, their descriptions are omitted.

The protrusion part 315 according to an embodiment of the present disclosure can further include third and fourth protrusion walls 315*c* and 315*d*.

The third protrusion wall 315*c* can be configured to be connected to one lateral surface of each of the first and second protrusion walls 315*a* and 315*b*. The third protrusion wall 315*c* can have a "–"-shape (or a straight line shape), a curved shape, or a semispherical shape. The third protrusion wall 315*c* can configure a first short side or a third sidewall of the protrusion part 315.

The fourth protrusion wall 315*d* can be configured to be connected to the other lateral surface of each of the first and second protrusion walls 315*a* and 315*b*. The fourth protrusion wall 315*d* can have a "–"-shape (or a straight line shape), a curved shape, or a semispherical shape. The fourth protrusion wall 315*d* can configure a second short side or a fourth sidewall of the protrusion part 315.

The protrusion part 315 including the first to fourth protrusion walls 315*a*, 315*b*, 315*c*, and 315*d* can include a rectangular shape or a rectangular shape with rounded corners. Accordingly, the opening hole 315*o* of the protrusion part 315 can be surrounded by the first to fourth protrusion walls 315*a*, 315*b*, 315*c*, and 315*d*.

Figure 5:
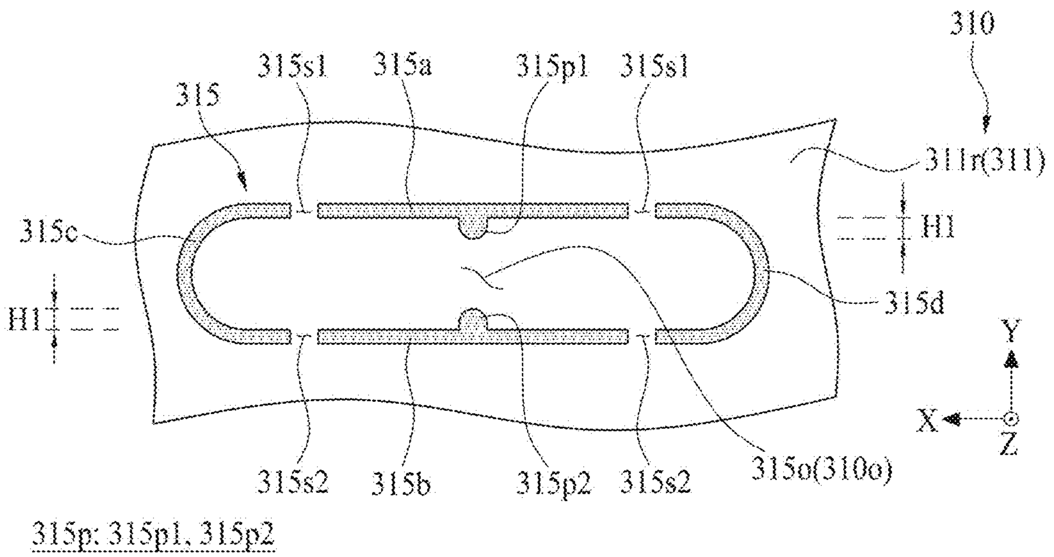
FIG. 5 illustrates a protrusion part illustrated in FIG. 3 according to another embodiment of the present disclosure.

FIG. 5 illustrates a protrusion part illustrated in FIG. 3 according to another embodiment of the present disclosure. Particularly, FIG. 5 illustrates an embodiment where one or more slits are additionally configured at the protrusion part described above with reference to FIG. 4. In the following description, therefore, the one or more slits will be described in detail, the other elements can be substantially a same as that of descriptions described above with reference to FIG. 4, and thus, like reference numerals refer to like elements and repeated descriptions can be omitted or will be briefly given below. Therefore, descriptions above with reference to FIG. 4 can be included in the descriptions of FIG. 5.

With reference to FIGS. 3 to 5, a protrusion part 315 according to another embodiment of the present disclosure can further include one or more slits 315*s*1 and 315*s*2. The one or more slits 315*s*1 and 315*s*2 can configured at each of the first and second protrusion walls 315*a* and 315*b*. For example, the protrusion part 315 can further include one or more slits 315*s*1 and 315*s*2 which are configured at each of the first and second protrusion walls 315*a* and 315*b*.

The protrusion part 315 according to another embodiment of the present disclosure can further include one or more first slits 315*s*1 and one or more second slits 315*s*2.

The one or more first slits 315*s*1 can be configured at the first protrusion wall 315*a*. For example, the one or more first slits 315*s*1 can be configured to separate the first protrusion wall 315*a* from the third protrusion wall 315*c* or separate the first protrusion wall 315*a* from the fourth protrusion wall 315*d*. For example, the protrusion part 315 can include a plurality of first slits 315*s*1. The plurality of first slits 315*s*1 can be configured at the first protrusion wall 315*a* with a first projection 315*p*1 therebetween. The plurality of first slits 315*s*1 can be configured to separate each of the third protrusion wall 315*c* and the fourth protrusion wall 315*d* from the first protrusion wall 315*a*. Accordingly, the first protrusion wall 315*a* can be separated from one or more of the third protrusion wall 315*c* and the fourth protrusion wall 315*d* by the one or more first slits 315*s*1, and thus, can be easily elastic-strained (or elastic-deformed).

The one or more second slits 315*s*2 can be configured at the second protrusion wall 315*b*. For example, the one or more second slits 315*s*2 can be configured to separate the second protrusion wall 315*b* from the third protrusion wall 315*c* or separate the second protrusion wall 315*b* from the fourth protrusion wall 315*d*. For example, the protrusion part 315 can include a plurality of second slits 315*s*2. The plurality of second slits 315*s*2 can be configured at the second protrusion wall 315*b* with the second projection 315*p*2 therebetween. The plurality of second slits 315*s*2 can be configured to separate each of the third protrusion wall 315*c* and the fourth protrusion wall 315*d* from the second protrusion wall 315*b*. Accordingly, the second protrusion wall 315*b* can be separated from one or more of the third protrusion wall 315*c* and the fourth protrusion wall 315*d* by the one or more second slits 315*s*2, and thus, can be easily elastic-strained (or elastic-deformed).

Figure 6:
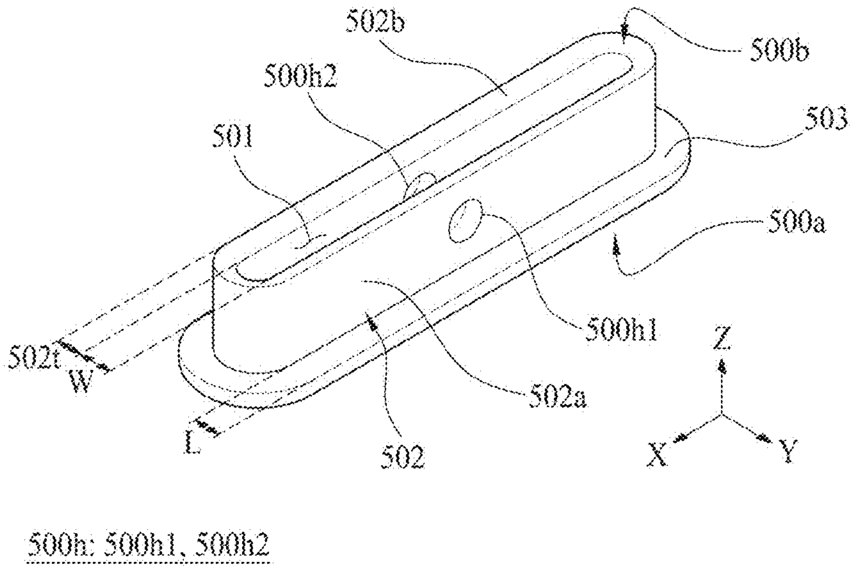
FIG. 6 illustrates a coupling part illustrated in FIG. 3 according to an embodiment of the present disclosure.

FIG. 6 illustrates a coupling part illustrated in FIG. 3 according to an embodiment of the present disclosure.

With reference to FIGS. 3 to 6, a coupling part 500 according to an embodiment of the present disclosure can include a hollow member 502 and one or more holes 500*h*.

The hollow member 502 can be configured to be accommodated into the protrusion part 315 of the enclosure 310. The hollow member 502 can be accommodated into the opening hole 315*o* of the protrusion part 315. The hollow member 502 can be configured to have a shape corresponding to the opening hole 315*o* of the protrusion part 315. For example, the hollow member 502 can be configured to have a size and a shape, which enables the hollow member 502 to be accommodated (or inserted) into the opening hole 315*o* of the protrusion part 315. For example, the hollow member 502 can include a rectangular shape or a rectangular shape with rounded corners.

The hollow member 502 can be configured to have a length which does not protrude to the internal space 313 of the enclosure 310, in a state where the protrusion part 315 is fastened to the coupling part 500. For example, the hollow member 502 can include a first end (or a lower surface) 500*a* and a second end (or an upper surface) 500*b* opposite to the first end 500*a*. For example, in a state where the protrusion part 315 is fastened to the coupling part 500, the first end 500*a* of the hollow member 502 can protrude to the inner surface 130*s* of the vehicular interior material 130, and the second end 500*b* of the hollow member 502 can be disposed (or located) in (or within) the opening hole 315*o* of the protrusion part 315 so as to be adjacent to the internal space 313 of the enclosure 310. For example, the hollow member

502 can be a port member, a cylinder member, a bushing member, a sound emission member, a duct member, or a vent member, but embodiments of the present disclosure are not limited thereto.

The hollow member 502 can include the hollow part 501. The hollow part 501 can be configured to pass through the first end 500*a* and the second end 500*b* of the hollow member 502 along a length direction (or a longitudinal direction) of the hollow member 502. The hollow part 501 can be configured to have a shape corresponding to the opening hole 315*o* of the protrusion part 315.

According to an embodiment of the present disclosure, a thickness 502*t* of the hollow member 502 can be smaller than a total protrusion height (or protrusion length) H1 of the projection 315*p* configured at the protrusion part 315, so as to prevent the coupling part 500 from being separated or detached from the protrusion part 315 by a relatively weak force and separate or detach the coupling part 500 from the protrusion part 315 by using a pressing (or pushing) jig inserted into the hollow part 501. For example, the thickness 502*t* of the hollow member 502 can be greater than a protrusion height (or a protrusion length) of the catching projection of the projection 315*p* configured in the protrusion part 315 and can be smaller than the total protrusion height (or protrusion length) H1 of the projection 315*p*. For example, when the thickness 502*t* of the hollow member 502 is greater than the total protrusion height (or protrusion length) H1 of the projection 315*p* configured at the protrusion part 315, the coupling part 500 fastened to the protrusion part 315 can be separated or detached from the protrusion part 315 by a relatively weak force.

According to an embodiment of the present disclosure, the hollow part 501 of the coupling part 500 can be configured to have a certain width W. For example, the width W of the hollow part 501 can be a short-axis length of the hollow part 501. The width W of the hollow part 501 or the short-axis length of the hollow part 501 can be 1 mm or more, but embodiments of the present disclosure are not limited thereto. For example, the width W of the hollow part 501 or the short-axis length of the hollow part 501 can be 1 mm to 5 mm or less, but embodiments of the present disclosure are not limited thereto.

According to an embodiment of the present disclosure, as the width W of the hollow part 501 increases, a sound pressure level can be enhanced, but dust or particles from the outside can flow into the internal space of the enclosure 310. According to an embodiment of the present disclosure, the width W of the hollow part 501 can be 1 mm or more, but embodiments of the present disclosure are not limited thereto. For example, the width W of the hollow part 501 can be 1 mm to 5 mm to reduce or minimize the inflow of dust or particles from the outside, but embodiments of the present disclosure are not limited thereto.

According to an embodiment of the present disclosure, because the width W of the hollow part 501 is configured to 1 mm or more, a sound characteristic and/or a sound pressure level characteristic can be enhanced in a pitched sound band including a sound of a low-pitched sound band, and peak and/or dip in a high-pitched sound band can be improved, thereby enhancing a balance characteristic of a sound pressure level and/or a flatness characteristic of a sound pressure level. According to an embodiment of the present disclosure, because the width W of the hollow part 501 is configured to 1 mm or more, dust or particles flowing in from the outside can be reduced or minimized.

The one or more holes 500*h* can be one or more second fastening members (or a second fastening means) for fastening (or coupling) between the coupling part 500 and the protrusion part 315, but embodiments of the present disclosure are not limited thereto. For example, the one or more holes 500*h* can be an accommodation hole, a coupling hole, a hook hole, a connection hole, or a fastening hole, but embodiments of the present disclosure are not limited thereto.

The coupling part 500 or the one or more holes 500*h* can include a first hole 500*h*1 and a second hole 500*h*2.

The first hole 500*h*1 can be configured to accommodate the first projection 315*p*1 of the protrusion part 315. The first hole 500*h*1 can be configured at one side portion 502*a* of the hollow member 502 and can be configured to accommodate the first projection 315*p*1 of the protrusion part 315. For example, the one side portion 502*a* of the hollow member 502 can be a first long side or a first sidewall of the hollow member 502. For example, in a state where the coupling part 500 is fastened to the protrusion part 315, the one side portion 502*a* of the hollow member 502 can face the first protrusion wall 315*a*.

The first hole 500*h*1 can be configured to pass through the one side portion 502*a* of the hollow member 502 along a thickness direction of the hollow member 502. For example, a center direction of the first hole 500*h*1 can be perpendicular to a length direction of the hollow member 502, or can be perpendicular to a center direction of the hollow member 502. For example, the center direction of the first hole 500*h*1 can be parallel to a short-side direction of the enclosure 310.

The first hole 500*h*1 can be configured to pass through one side portion of the hollow member 502 to correspond to a position of the first projection 315*p*1. The first hole 500*h*1 can be configured to have a size (or a diameter) and a shape, which enables the first projection 315*p*1 to be inserted into the first hole 500*h*1. For example, in a case where the protrusion part 315 is fastened to the coupling part 500, the first projection 315*p*1 can be accommodated (or inserted) into the first hole 500*h*1. For example, a portion of the first projection 315*p*1 accommodated (or inserted) into the first hole 500*h*1 can protrude to the hollow part 501. For example, an end portion of the first projection 315*p*1 can pass through the first hole 500*h*1 and can protrude to the hollow part 501. For example, the end portion of the first projection 315*p*1 having a semispherical shape can pass through the first hole 500*h*1 and can protrude to the hollow part 501. Accordingly, when separating or detaching the coupling part 500 fastened to the protrusion part 315, the coupling part 500 can be easily separated or detached from the protrusion part 315.

The second hole 500*h*2 can be configured to accommodate the second projection 315*p*2 of the protrusion part 315. The second hole 500*h*2 can be configured at the other side portion 502*b* of the hollow member 502 and can be configured to accommodate the second projection 315*p*2 of the protrusion part 315. For example, the other side portion 502*b* of the hollow member 502 can be a second long side or a second sidewall of the hollow member 502. For example, in a state where the coupling part 500 is fastened to the protrusion part 315, the other side portion 502*b* of the hollow member 502 can face the second protrusion wall 315*b*.

Except for that the second hole 500*h*2 is configured at the other side portion 502*b* of the hollow member 502, the second hole 500*h*2 can be substantially a same as the first hole 500*h*1, and thus, its description is omitted.

The coupling part 500 according to an embodiment of the present disclosure can further include a latch member 503.

The latch member 503 can be configured to have a certain length L (or the second width). The latch member 503 can be connected to or configured at an outer surface (or an outer circumference surface) of one side of the hollow member 502 to have the certain length L. The latch member 503 can be connected to or configured to the outer surface of one side of the hollow member 502 to be parallel to or face the inner surface 130*s* of the vehicle interior material 130. The latch member 503 can be connected to or configured to the first end 500*a* of the hollow member 502 to have the certain length L. For example, the latch member 503 can be configured to have a plate shape corresponding to a shape of the hollow member 502 or the protrusion part 315.

The latch member 503 can extend or protrude from the outer surface of one side of the hollow member 502 to have the certain length L. The length L of the latch member 503 can be a length which extends from the outer surface (or outer circumference surface) of the hollow part 501 in a direction parallel to the vehicle interior material 130. For example, a first length L of the latch member 503 can be a length which extends from the first end 500*a* of the hollow member 502 in the direction parallel to the vehicle interior material 130. The latch member 503 having the length L can overlap at least one of the vehicle interior material 130, a connection member 350, and an enclosure 310. For example, the length L of the latch member 503 can be a same as a short-side length of the hollow part 501.

As the length L of the coupling part 500 or the latch member 503 decreases, a sound pressure level characteristic can be enhanced. According to an embodiment of the present disclosure, the length L of the latch member 503 can be 10 mm or more, but embodiments of the present disclosure are not limited thereto. For example, the length L of the latch member 503 can be 10 mm or more and less than 19 mm, but embodiments of the present disclosure are not limited thereto. For example, when the length L of the latch member 503 is smaller than 10 mm, the dip and/or peak of a sound can be improved, but there can be a problem where it is difficult to equip a sound apparatus in a roof trim of a vehicular apparatus. According to an embodiment of the present disclosure, because the length L of the latch member 503 is configured to 10 mm or more and less than 19 mm, a sound characteristic and/or a sound pressure level characteristic can be enhanced in a pitched sound band including a sound of a low-pitched sound band, and peak and/or dip in a high-pitched sound band can be improved, thereby enhancing a balance characteristic of a sound pressure level and/or a flatness characteristic of a sound pressure level.

According to another embodiment of the present disclosure, because the coupling part 500 is configured to include one or more of the width W of the hollow part 501 and the length L of the latch member 503, a sound characteristic and/or a sound pressure level characteristic of the sound apparatus 30 can be more enhanced.

Figure 7:
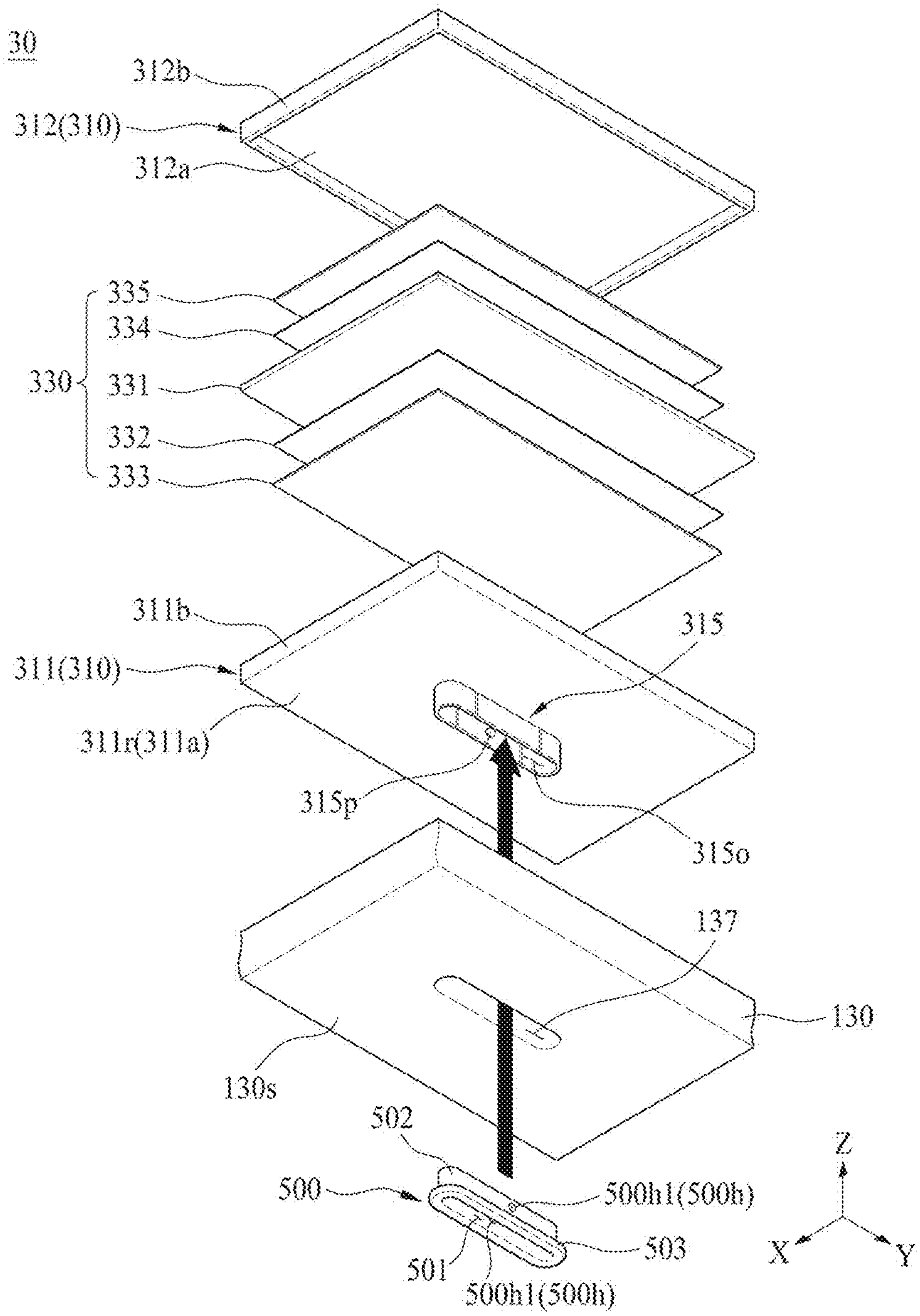
FIG. 7 is an exploded perspective view of a sound apparatus illustrated in FIG. 3 according to an embodiment of the present disclosure.
Figure 8:
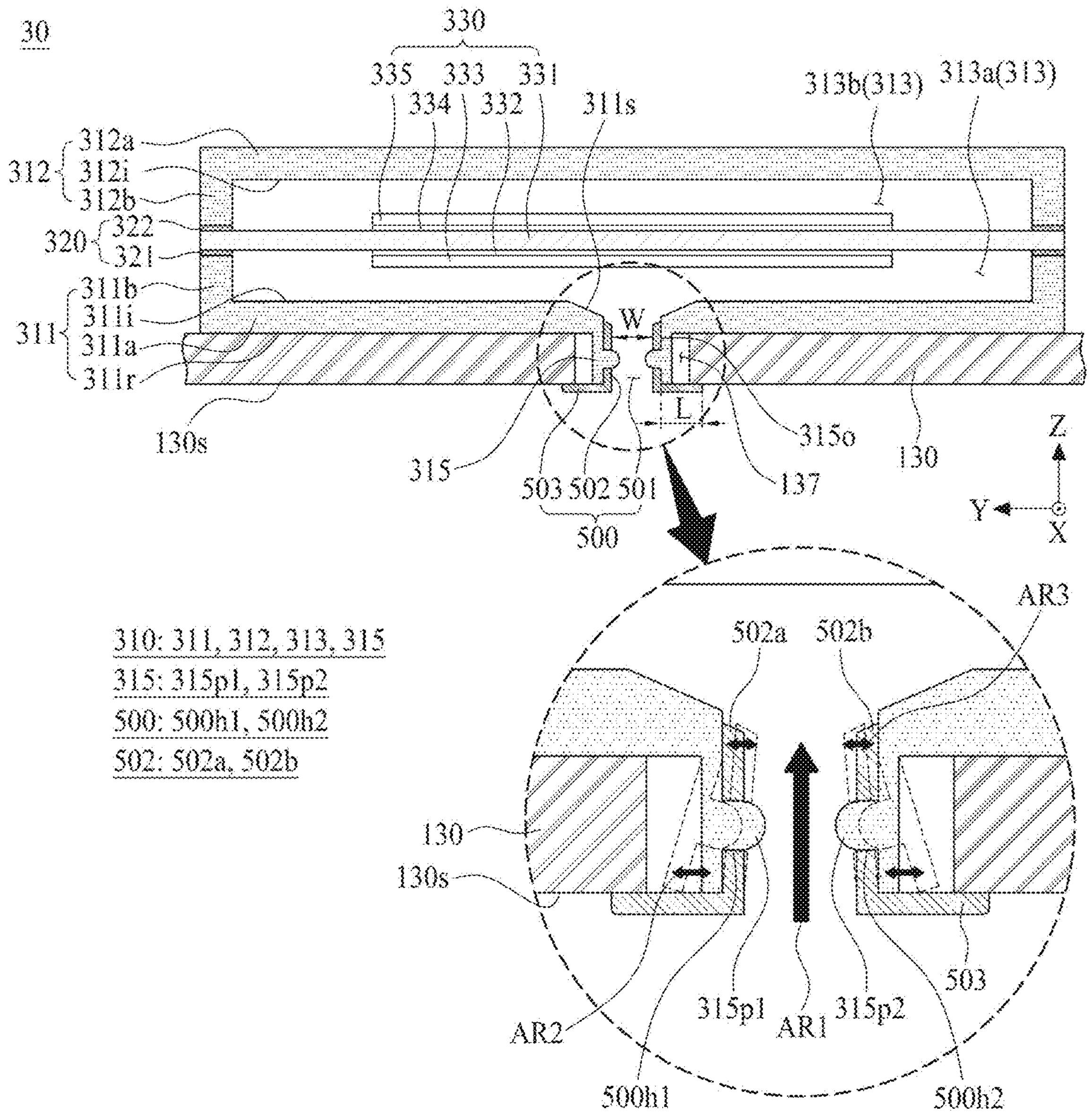
FIG. 8 illustrates a process of fastening a coupling part to a protrusion part of an enclosure according to another embodiment of the present disclosure.

FIG. 7 is an exploded perspective view of a sound apparatus illustrated in FIG. 3 according to an embodiment of the present disclosure. FIG. 8 illustrates a process of fastening a coupling part to a protrusion part of an enclosure according to another embodiment of the present disclosure.

With reference to FIGS. 7 and 8, the protrusion part 315 of an enclosure 310 can be accommodated (or inserted) into a hole 137 of a vehicular interior material 130. The opening hole 315*o* of the protrusion part 315 can be exposed to an inner surface 130*s* of the vehicle interior material 130. For example, the opening hole 315*o* of the protrusion part 315 can be exposed to the interior space of the vehicle.

The coupling part 500 can be accommodated (or inserted) into an opening hole 315*o* of the protrusion part 315 by pressing (or push) (a vertical arrow direction AR1) and can be coupled or fastened to the protrusion part 315. In a process of pressing (or pushing) the coupling part 500 into the opening hole 315*o* of the protrusion part 315, the first and second projections 315*p*1 and 315*p*2 at first and second protrusion walls 315*a* and 315*b* of the protrusion part 315 can be respectively accommodated (or inserted) into the first hole 500*h*1 and the second hole 500*h*2 of a hollow member 502, and thus, the coupling part 500 can be fastened to the protrusion part 315.

According to an embodiment of the present disclosure, in a process of pressing (or pushing) the coupling part 500 into the opening hole 315*o* of the protrusion part 315, the first and second projections 315*p*1 and 315*p*2 can contact the hollow member 502 of the coupling part 500 and can be pressed (or pushed) by pressing (or pushing) of the hollow member 502, and thus, the first and second protrusion walls 315*a* and 315*b* can be elastically strained (or deformed) in directions opposite to each other (or directions distancing from each other) (a horizontal arrow direction AR2) while the first and second projections 315*p*1 and 315*p*2 are contacting a lateral surface of the hollow member 502. The first and second projections 315*p*1 and 315*p*2 can be respectively accommodated (or inserted) into the first hole 500*h*1 and the second hole 500*h*2 of the hollow member 502 by an elastic restoration force of each of the elastically strained (or deformed) the first and second protrusion walls 315*a* and 315*b*, and thus, the coupling part 500 can be fastened to the protrusion part 315.

According to an embodiment of the present disclosure, in a process of pressing the coupling part 500 into the opening hole 315*o* of the protrusion part 315, one portion 502*a* and the other portion 502*b* of the hollow member 502 can be elastically strained (or deformed) in directions opposite to each other (or directions toward each other) (a horizontal arrow direction AR3) by pressing (or pushing) of the first and second projections 315*p*1 and 315*p*2, but embodiments of the present disclosure are not limited thereto.

According to a sound apparatus 30 according to an embodiment of the present disclosure, because the coupling part 500 is detachably coupled or fastened to the protrusion part 315, the enclosure 310 can be easily equipped at (mounted on) the vehicular interior material 130 (or a mount object), and the sound apparatus 30 can be easily separated or detached from the vehicular interior material 130 (or a mount object).

Figure 9:
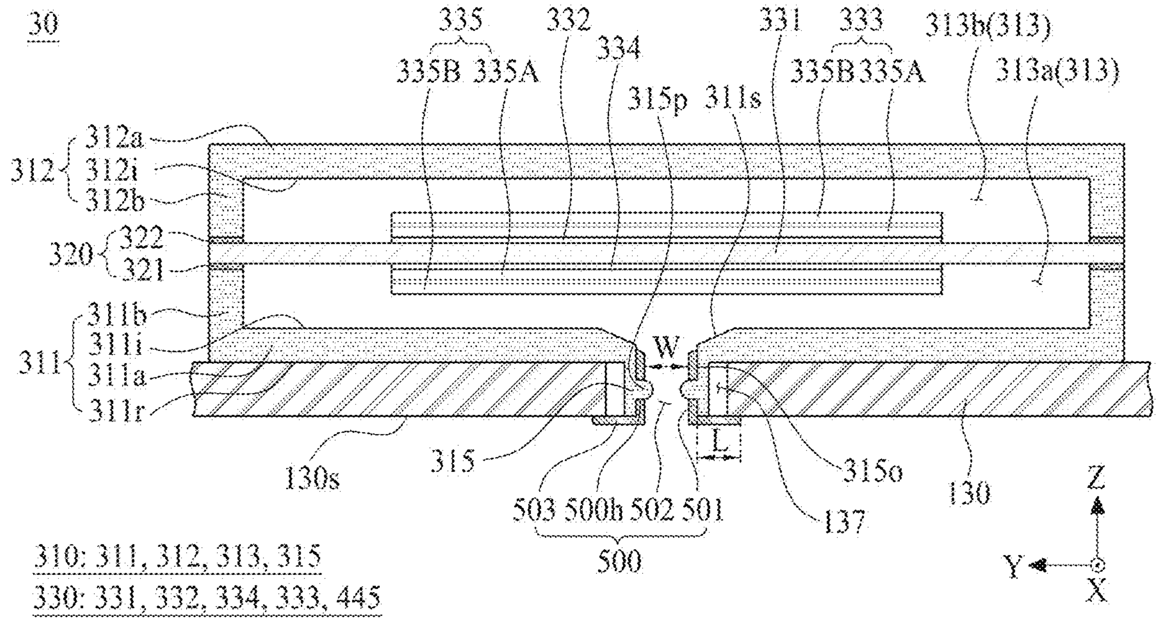
FIG. 9 illustrates a sound apparatus according to another embodiment of the present disclosure.

FIG. 9 illustrates a sound apparatus according to another embodiment of the present disclosure. Particularly, FIG. 9 illustrates an embodiment implemented by changing the vibration apparatus described above with reference to FIGS. 3 to 8. In the following description, therefore, the vibration apparatus will be described in detail, the other elements can be substantially a same as that of descriptions described above with reference to FIGS. 3 to 8, and thus, like reference numerals refer to like elements and repeated descriptions can be omitted or will be briefly given below. Therefore, in the descriptions of FIGS. 3 to 8, the descriptions of other elements except the descriptions of the vibration apparatus can be included in the descriptions of FIG. 9.

With reference to FIG. 9, a sound apparatus 30 according to another embodiment of the present disclosure can include a vibration apparatus 333 and 335 including one or more vibration generators. For example, the vibration apparatus 333 and 335 can include one or more vibration generators 333A, 333B, 335A and 335B. For example, the vibration apparatus 333 and 335 can include a first vibration apparatus 333 and a second vibration apparatus 335.

The first vibration apparatus 333 of the vibration apparatus 333 and 335 can include one or more vibration generators 333A and 333B. The first vibration apparatus 333 can include a first vibration generator 333A and a second vibration generator 333B. For example, the first vibration generator 333A can be stacked on the second vibration generator 333B.

The second vibration apparatus 335 of the vibration apparatuses 333 and 335 can include one or more vibration generators 335A and 335B. The second vibration apparatus 335 can include a first vibration generator 335A and a second vibration generator 335B. For example, the first vibration generator 335A can be stacked on the second vibration generator 335B. The vibration apparatuses 333 and 335 each including the one or more vibration generators will be described below with reference to FIG. 9.

According to another embodiment of the present disclosure, the vibration apparatuses 333 and 335 each including the one or more vibration generators can be configured at a first surface or a second surface of a vibration member 331. For example, one of the first and second vibration apparatuses 333 and 335 each including the one or more vibration generators can be configured at only the first surface of the vibration member 331. For example, one of the first and second vibration apparatuses 333 and 335 each including the one or more vibration generators can be configured at a first space 313*a*. For example, the first vibration apparatus 333 including the one or more vibration generators 333A and 333B can be configured at the first surface of the vibration member 331, and the second vibration apparatus 335 including the one or more vibration generators 335A and 335B can be omitted.

According to another embodiment of the present disclosure, one of the first and second vibration apparatuses 333 and 335 each including the one or more vibration generators can be configured at only the second surface of the vibration member 331. For example, one of the first and second vibration apparatuses 333 and 335 each including the one or more vibration generators can be configured at a second space 313*b*. For example, the second vibration apparatus 335 including the one or more vibration generators 335A and 335B can be configured at the second surface of the vibration member 331, and the first vibration apparatus 333 including the one or more vibration generators 333A and 333B can be omitted.

The vibration apparatuses 333 and 335 according to another embodiment of the present disclosure can each include the one or more vibration generators which are stacked (or piled or overlap) to vibrate in a same direction, and thus, the amount of displacement or an amplitude displacement can be maximized or increase, thereby maximizing or increasing the amount of displacement (or a bending force or a driving force) or an amplitude displacement of the vibration member 331.

Figure 10:
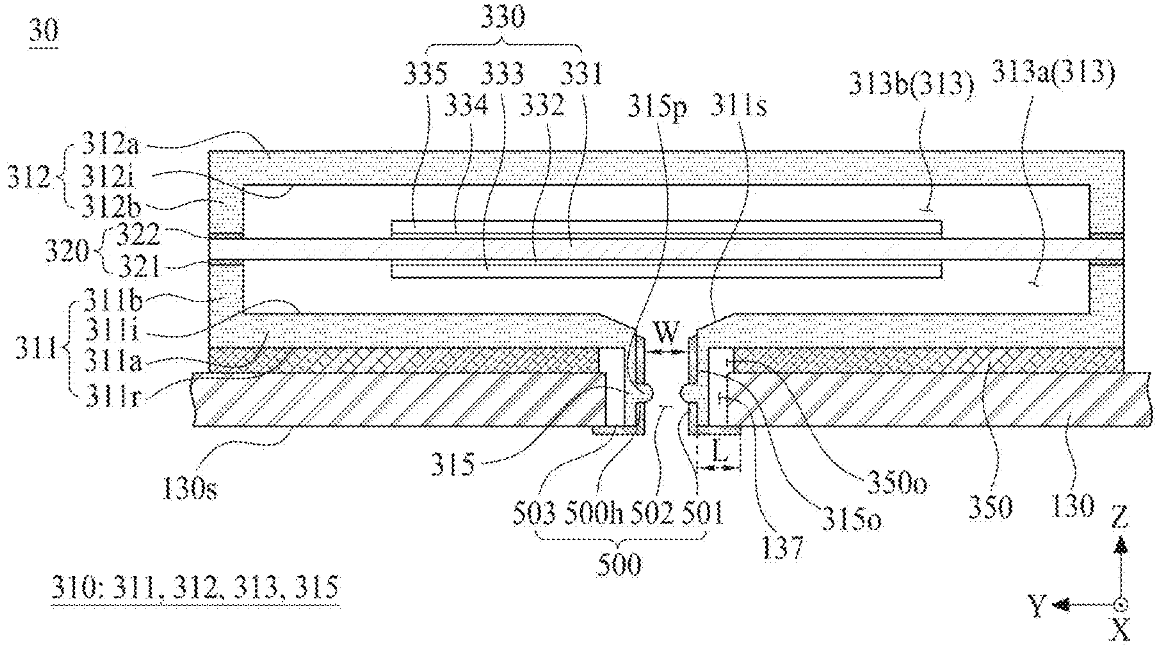
FIG. 10 illustrates a sound apparatus according to another embodiment of the present disclosure.
Figure 11:
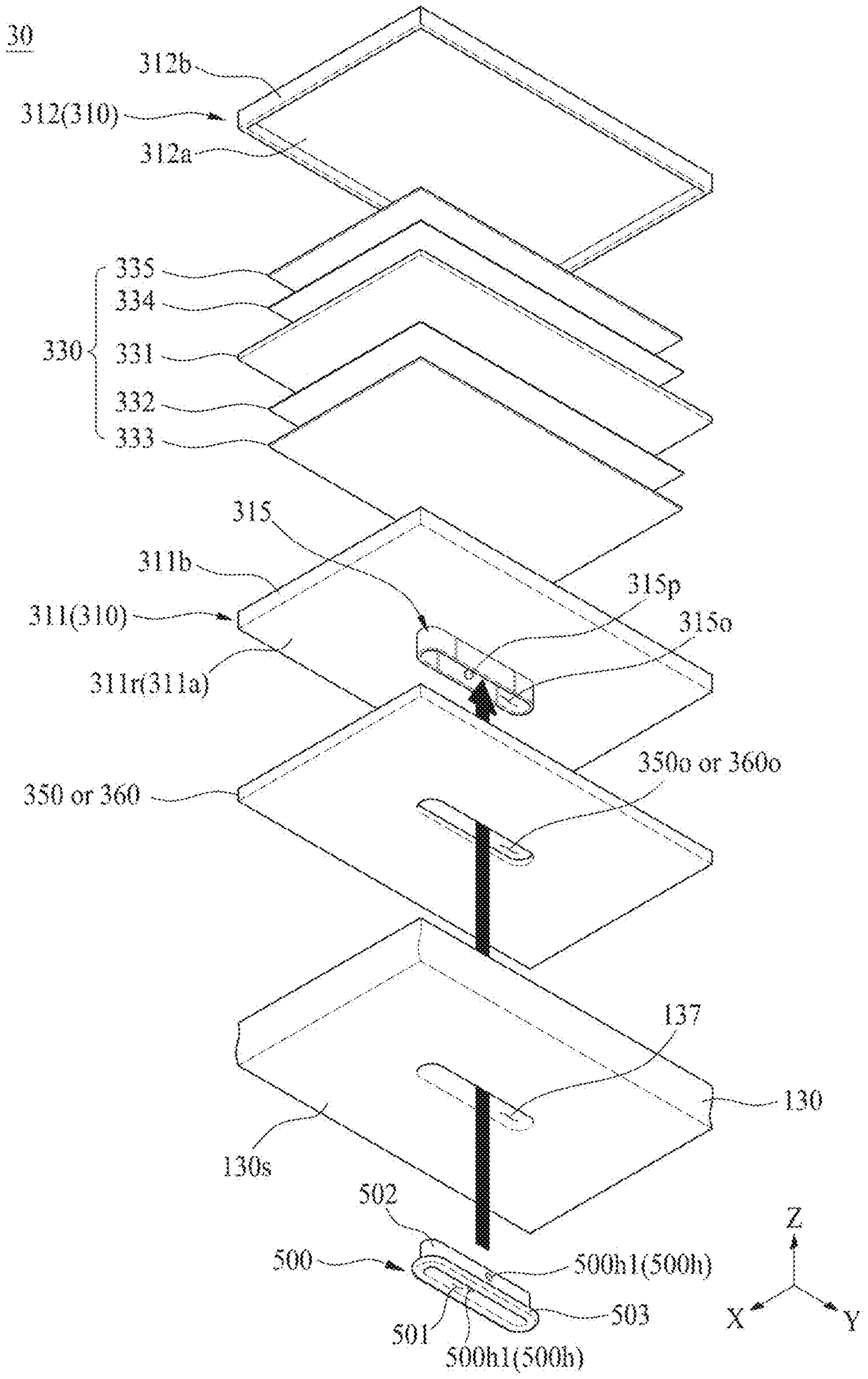
FIG. 11 is an exploded perspective view of a sound apparatus illustrated in FIG. 10 according to another embodiment of the present disclosure.

FIG. 10 illustrates a sound apparatus according to another embodiment of the present disclosure. FIG. 11 is an exploded perspective view of a sound apparatus illustrated in FIG. 10 according to another embodiment of the present disclosure. Particularly, FIGS. 10 and 11 illustrate an embodiment where a connection member is additionally configured at the sound apparatus described above with reference to FIGS. 3 to 8. In the following description, therefore, the connection member will be described in detail, the other elements can be substantially a same as that of descriptions described above with reference to FIGS. 3 to 8, and thus, like reference numerals refer to like elements and repeated descriptions can be omitted or will be briefly given below. Therefore, descriptions of the sound apparatus with reference to FIGS. 3 to 8 can be included in the descriptions of FIGS. 10 and 11.

With reference to FIGS. 10 and 11, a sound apparatus 30 according to another embodiment of the present disclosure can include a connection member 350.

The connection member 350 can be disposed at the rear surface 311*r* of the enclosure 310. The connection member 350 can be disposed between the enclosure 310 and the vehicle interior material 130. For example, the connection member 350 can be disposed between the first enclosure 311 and the vehicle interior material 130. For example, the vehicle interior material 130 can be connected to or coupled to the enclosure 310 by the connection member 350. For example, the vehicle interior material 130 can be connected to or coupled to the rear surface 311*r* of the first enclosure 311 by the connection member 350. Accordingly, the enclosure 310 can be connected to or coupled to the vehicle interior material 130 by the connection member 350. For example, the connection member 350 can be provided or configured between the vehicle interior material 130 and the sound apparatus 30 (or the enclosure 310) illustrated in FIG. 1 or 2. For example, the connection member 350 can be a first connection member, a first intermediate member, a first buffer member, or a first pad member, but embodiments of the present disclosure are not limited thereto.

The connection member 350 can be configured to transfer a vibration of the first enclosure 311 based on a vibration of the sound generating module 330 to the vehicle interior material 130. The connection member 350 can be configured to transmit the vibration of the first enclosure 311, caused by sound (or sound waves) generated in the internal space 313 of the enclosure 310 based on the vibration of the sound generating module 330, to the vehicle interior material 130. Accordingly, the vehicle interior material 130 can vibrate based on a vibration transferred through the connection member 350 to generate (or output) a sound.

The connection member 350 can be configured as a stiff material (or a hard material). The connection member 350 can have high elasticity (or a Young's modulus) and can include a material which is high in tensile strength. For example, the connection member 350 can include rubber, but embodiments of the present disclosure are not limited thereto. For example, the rubber can be ethylene propylene rubber or urethane rubber, but embodiments of the present disclosure are not limited thereto. For example, the ethylene propylene rubber can be ethylene propylene diene monomer (EPDM), but embodiments of the present disclosure are not limited thereto. For example, a hardness of the EPDM can be 40 to 90, but embodiments of the present disclosure are not limited thereto. For example, a tensile strength of the EPDM can be 50 $kg/cm^2$ to 200 $kg/cm^2$, but embodiments of the present disclosure are not limited thereto.

According to an embodiment of the present disclosure, the connection member 350 is configured as the relatively stiff material (or the hard material), and thus, can transfer the vibration of the first enclosure 311, based on the vibration of the vibration apparatus, to a vehicle interior material 130. Accordingly, the vehicle interior material 130 can vibrate based on the vibration transferred through the connection member 350 to generate a sound. For example, when the connection member 350 is configured as the relatively stiff material (or the hard material), the vehicle interior material 130 connected to the connection member 350 can be a vibration plate for generating (or outputting) a sound. For example, when the connection member 350 is configured as the relatively stiff material (or the hard material), the vibration of the first enclosure 311 can be transmitted to the vehicle interior material 130 more efficiently.

According to an embodiment of the present disclosure, the connection member 350 can transfer heat generated when the sound generation module 330 vibrates to the vehicle interior material 130, thereby dissipating heat generated when the sound generation module 330 vibrates.

According to an embodiment of the present disclosure, the connection member 350 can further include a hole 350*o*. For example, the connection member 350 can further include a hole 350*o* which is connected to the opening hole 315*o* of the protrusion part 315 in the enclosure 310 or the first enclosure 311. The hole 350*o* can be disposed to correspond to (or overlap) the opening hole 315*o*. The hole 350*o* can have a same shape as the protrusion part 315 of the first enclosure 311 and can have a size which is greater than the protrusion part 315 of the first enclosure 311, but embodiments of the present disclosure are not limited thereto. Accordingly, the sound (or the sound wave) generated in the internal space 313 based on the vibration of the sound generating module 330 can be output to an interior space of a vehicle by (or through) the opening hole 315*o* and the hole 350*o*. For example, the hole 350*o* can be a through hole, a second through hole, an opening part, an opening hole, a slit, a slot, a connection hole, or an intermediate hole, but embodiments of the present disclosure are not limited thereto.

According to another embodiment of the present disclosure, the vibration apparatus 300 can be replaced with the vibration apparatus described above with reference to FIG. 9, and thus, repeated descriptions thereof are omitted.

The protrusion part 315 of the enclosure 310 can pass through the hole 350*o* of the connection member 350 and can be accommodated (or inserted) into the hole 137 of the vehicle interior material 130. The opening hole 315*o* of the protrusion part 315 can be exposed to an inner surface 130*s* of the vehicle interior material 130.

The coupling part 500 can be inserted into the opening hole 315*o* of the protrusion part 315 exposed to the inner surface 130*s* of the vehicle interior material 130 and can be detachably fastened to the protrusion part 315. A method of fastening of the coupling part 500 and the protrusion part 315 is substantially a same as the hook fastening scheme described above with reference to FIGS. 7 and 8, and thus, repeated descriptions thereof are omitted.

The sound apparatus 30 according to another embodiment of the present disclosure can have a same effect as the sound apparatus described above with reference to FIGS. 3 to 8. According to the sound apparatus 30 according to another embodiment of the present disclosure, the connection member 350 is disposed (or interposed) between the enclosure 310 and the vehicle interior material 130, and thus, a shaking sound (or a trilling sound) may not occur between the enclosure 310 and the vehicle interior material 130, thereby improving a sound characteristic and/or a sound pressure level characteristic of the sound apparatus 30. In addition, according to the sound apparatus 30 according to another embodiment of the present disclosure, the heat occurring when the sound generation module 330 vibrating can be dissipated to the vehicle interior material 130 through the connection member 350, thereby preventing the performance of the vibration apparatus 337 from being reduced by the heat.

Figure 12:
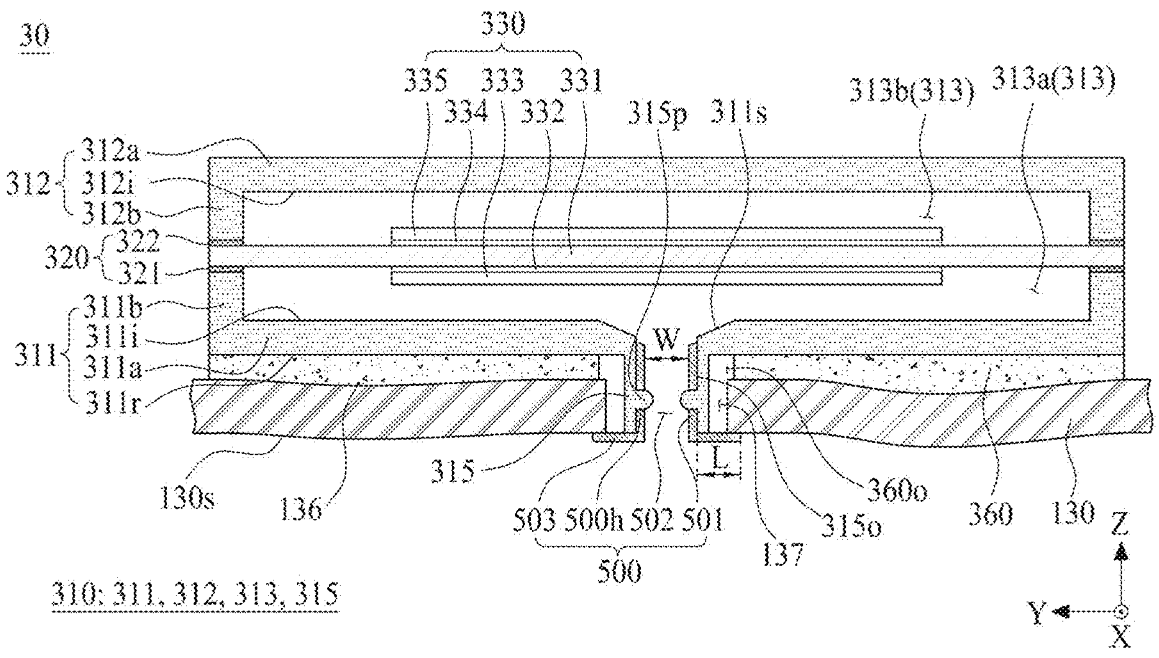
FIG. 12 illustrates a sound apparatus according to another embodiment of the present disclosure.

FIG. 12 illustrates a sound apparatus according to another embodiment of the present disclosure. Particularly, FIG. 12 illustrates an embodiment where a soft member is additionally configured at the sound apparatus described above with reference to FIGS. 3 to 8. In the following description, therefore, the soft member will be described in detail, the other elements can be substantially a same as that of descriptions described above with reference to FIGS. 3 to 8, and thus, like reference numerals refer to like elements and repeated descriptions can be omitted or will be briefly given below. Therefore, descriptions of the sound apparatus with reference to FIGS. 3 to 8 can be included in the descriptions of FIG. 12.

With reference to FIGS. 11 and 12, a sound apparatus 30 according to another embodiment of the present disclosure can include a soft member 360.

The soft member 360 can be disposed at the rear surface 311*r* of the enclosure 310. The soft member 360 can be disposed between the enclosure 310 and the vehicle interior material 130. For example, the soft member 360 can be disposed between the first enclosure 311 and the vehicle interior material 130. For example, the vehicle interior material 130 can be connected to or coupled to the enclosure 310 by the soft member 360. For example, the vehicle interior material 130 can be connected to or coupled to the rear surface 311*r* of the first enclosure 311 by the soft member 360. Accordingly, the enclosure 310 can be connected to or coupled to the vehicle interior material 130 by the soft member 360. For example, the soft member 360 can be a second intermediate member, a second buffer member, or a second pad member, but embodiments of the present disclosure are not limited thereto.

According to an embodiment of the present disclosure, the soft member 360 can be configured in a material which differs from the connection member 350 described above with reference to FIG. 10. An elasticity (or a Young's modulus) of the soft member 360 can be configured in a material which differs from an elasticity of the connection member 350. For example, the soft member 360 can be configured in a material having low elasticity. The soft member 360 can be configured as a relatively smooth material (or a soft material). Accordingly, the soft member 360 can absorb an external impact, and thus, can prevent the damage of the sound apparatus 30 and the durability and reliability of the sound apparatus 30 can be enhanced.

The vehicle interior material 130 according to another embodiment of the present disclosure can include one or more curved portions (or flexural portions or uneven portions) 136. The soft member 360 can be disposed between the enclosure 310 and the one or more curved portions 136 of the vehicle interior material 130. The soft member 360 can be disposed between the first enclosure 311 and the one or more curved portions 136 of the vehicle interior material 130. For example, the sound apparatus 30 or the first enclosure 311 can be connected or coupled to the one or more curved portions 136 of the vehicle interior material 130 by the soft member 360. Accordingly, the soft member 360 can be filled in the one or more curved portions 136 of the vehicle interior material 130 or can cover the one or more curved portions 136 of the vehicle interior material 130 and can absorb an external impact, thereby protecting the sound apparatus 30.

According to an embodiment of the present disclosure, the soft member 360 can contact or directly contact the vehicle interior material 130 including the one or more curved portions 136 without a separate adhesive member or a separate intermediate member (or medium). A vibration generated by the sound generating module 330 can be transferred, by the soft member 360, to the entire vibration region of the vehicle interior material 130 including the one or more curved portions 136 and a planar portion. Accordingly, a sound can be generated (or output) based on a vibration of the entire vibration region of the vehicle interior material 130, thereby enhancing a sound characteristic and/or a sound pressure level characteristic of a sound band including a low-pitched sound band generated by the sound generating module 330.

According to an embodiment of the present disclosure, the soft member 360 can include a relatively smooth material (or a soft material or a ductile material), for a connection (or coupling) with the vehicle interior material 130 including the one or more curved portions 136 and the planar portion. For example, when the one or more curved portions 136 are included in the vibration region of the vehicle interior material 130, the soft member 360 can include the relatively smooth material. For example, the soft member 360 which is configured in the relatively smooth material can be a ductile member, a porous member, a protection member, or a buffer member, or the like, but embodiments of the present disclosure are not limited thereto.

The soft member 360 according to an embodiment of the present disclosure can be ethylene propylene rubber or urethane rubber, but embodiments of the present disclosure are not limited thereto. For example, the ethylene propylene rubber can be ethylene propylene diene monomer (EPDM), and as a foaming rate is changed in EPDM, the ethylene propylene rubber can be configured as EPDM having low elasticity, but embodiments of the present disclosure are not limited thereto. For example, the soft member 360 according to another embodiment of the present disclosure can be configured as a single-sided tape, a single-sided sponge tape, a single-sided porous tape, a single-sided cushion tape, a double-sided tape, a double-sided sponge tape, a double-sided porous tape, or a double-sided cushion tape, or the like, which are configured in the relatively smooth material, but embodiments of the present disclosure are not limited thereto.

According to an embodiment of the present disclosure, the soft member 360 can further include a hole 360*o*. For example, the soft member 360 can further include a hole 360*o* which is connected to the opening hole 315*o* of the protrusion part 315 in the enclosure 310 or the first enclosure 311. The hole 360*o* can be disposed to correspond to (or overlap) the opening hole 315*o*. The hole 360*o* can have a same shape as the protrusion part 315 of the first enclosure 311 and can have a size which is greater than the protrusion part 315 of the first enclosure 311, but embodiments of the present disclosure are not limited thereto. For example, the hole 360*o* can be a through hole, a third through hole, an opening part, an opening hole, a slit, a slot, a connection hole, or an intermediate hole, but embodiments of the present disclosure are not limited thereto.

According to an embodiment of the present disclosure, a sound generated based on a vibration of the sound generating module 330 can be output to the interior space of the vehicle through the opening hole 315*o* of the protrusion part 315 and the hollow part 501 of the coupling part 500. In addition, the first enclosure 311 of the enclosure 310 can vibrate by a sound (or a sound wave) generated in the interior space 313 based on the vibration of the sound generating module 330, and the vibration of the first enclosure 311 vibrates the vehicle interior material 130 including the one or more curved portions 136 and the planar portion through the soft member 360, and a sound generated based on the vibration of the vehicle interior material 130 can be output to the interior space of the vehicle.

According to another embodiment of the present disclosure, the vibration apparatus 300 can be replaced with the vibration apparatus described above with reference to FIG. 9, and thus, repeated descriptions thereof are omitted.

The protrusion part 315 of the enclosure 310 can pass through the hole 360*o* of the soft member 360 and can be accommodated (or inserted) into the hole 137 of the vehicle interior material 130. The opening hole 315*o* of the protrusion part 315 can be exposed to an inner surface 130*s* of the vehicle interior material 130.

The coupling part 500 can be inserted into the opening hole 315*o* of the protrusion part 315 exposed to the inner surface 130*s* of the vehicle interior material 130 and can be detachably fastened to the protrusion part 315. A method of fastening of the coupling part 500 and the protrusion part 315 is substantially a same as the hook fastening scheme described above with reference to FIGS. 7 and 8, and thus, repeated descriptions thereof are omitted.

The sound apparatus 30 according to another embodiment of the present disclosure can have a same effect as the sound apparatus described above with reference to FIGS. 3 to 8. According to the sound apparatus 30 according to another embodiment of the present disclosure, the soft member 360 is disposed (or interposed) between the enclosure 310 and the vehicle interior material 130, and thus, a shaking sound (or a trilling sound) may not occur between the enclosure 310 and the vehicle interior material 130, thereby improving a sound characteristic and/or a sound pressure level characteristic of the sound apparatus 30. In the sound apparatus 30 according to another embodiment of the present disclosure, since an external impact applied to the enclosure 310 can be absorbed by the soft member 360, and thus, sound apparatus 30 can be protected from the external impact.

According to another embodiment of the present disclosure, the soft member 360 can be configured together with the connection member 350 described above with reference to FIG. 11. For example, the sound apparatus 30 according to another embodiment of the present disclosure can further include a connection member 350 and a soft member 360 illustrated in FIG. 13.

Figure 13:
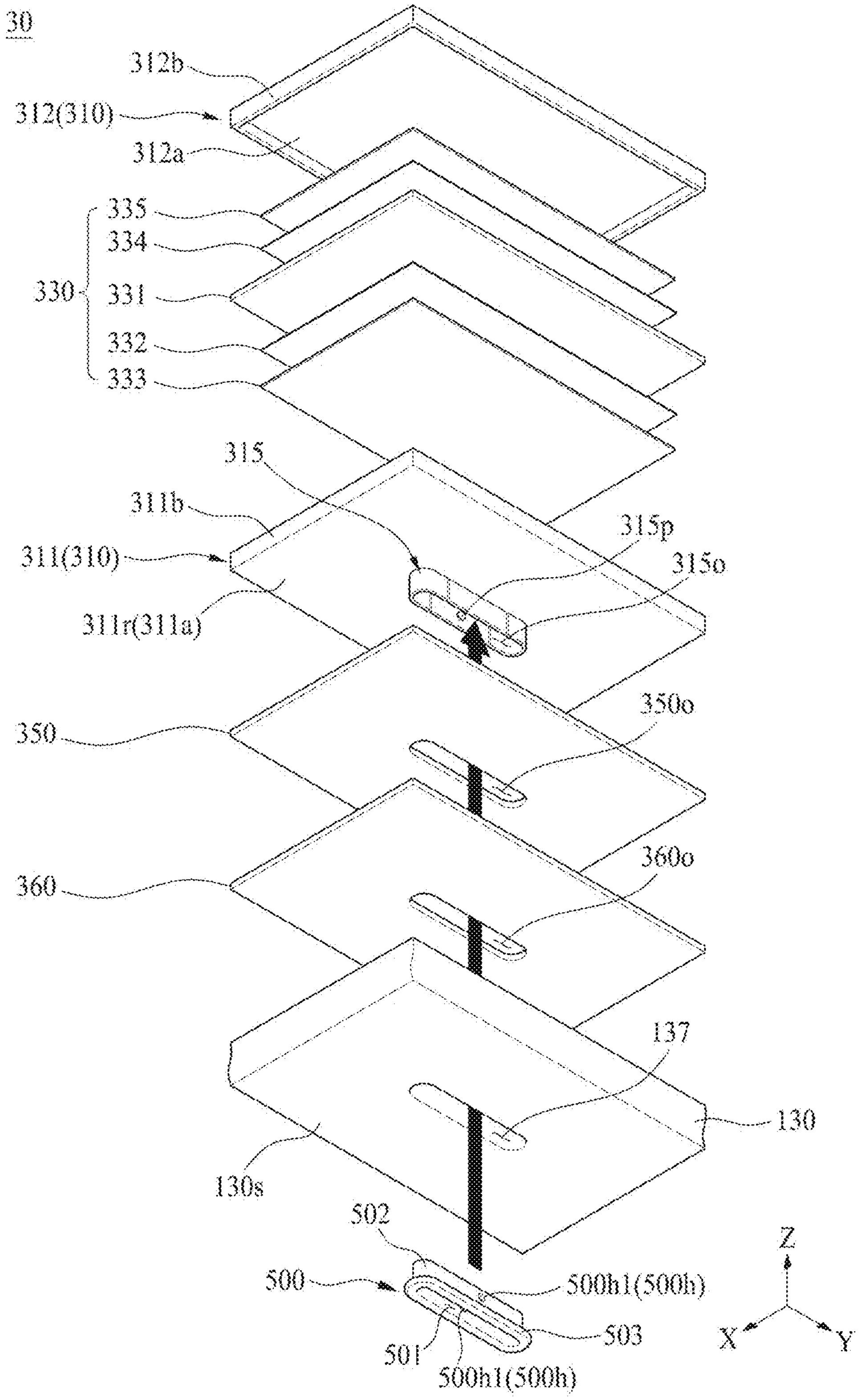
FIG. 13 is an exploded perspective view of a sound apparatus according to an embodiment of the present disclosure.

With reference to FIG. 13, in the sound apparatus 30 according to another embodiment of the present disclosure, the connection member 350 can be disposed or interposed between the enclosure 310 and the vehicle interior material 130. For example, the connection member 350 can be disposed or interposed between the first enclosure 311 and the vehicle interior material 130. The connection member 350 can be configured as a stiff material (or a hard material). The connection member 350 can be substantially a same as the connection member 350 described above with reference to FIG. 11, and thus, repeated descriptions thereof are omitted.

The soft member 360 can be disposed or interposed between the vehicle interior material 130 and the connection member 350. For example, the soft member 360 can be configured as a relatively smooth material (or a soft material). The soft member 360 can be substantially a same as the soft member 360 described above with reference to FIG. 12, and thus, repeated descriptions thereof are omitted.

According to another embodiment of the present disclosure, the vibration apparatus 300 illustrated in FIG. 13 can be replaced with the vibration apparatus described above with reference to FIG. 9, and thus, repeated descriptions thereof are omitted.

The protrusion part 315 of the enclosure 310 can pass through the hole 360*o* of the soft member 360 and the hole 350*o* of the connection member 350 and can be accommodated (or inserted) into the hole 137 of the vehicle interior material 130. The opening hole 315*o* of the protrusion part 315 can be exposed to an inner surface 130*s* of the vehicle interior material 130.

The coupling part 500 can be inserted into the opening hole 315*o* of the protrusion part 315 exposed to the inner surface 130*s* of the vehicle interior material 130 and can be detachably fastened to the protrusion part 315. A method of fastening of the coupling part 500 and the protrusion part 315 is substantially a same as the hook fastening scheme described above with reference to FIGS. 7 and 8, and thus, repeated descriptions thereof are omitted.

The sound apparatus 30 according to another embodiment of the present disclosure can have a same effect as the sound apparatus described above with reference to FIGS. 3 to 8, and can additionally have a same effect as the sound apparatus described above with reference to FIGS. 10 to 12.

Figure 14:
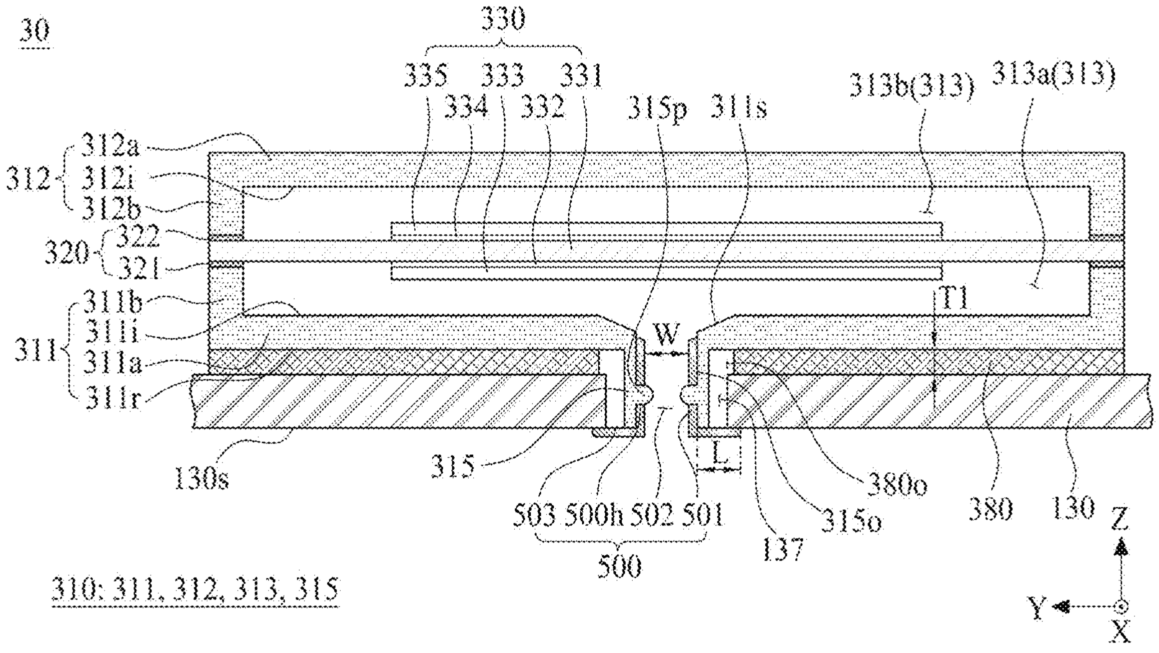
FIG. 14 illustrates a sound apparatus according to another embodiment of the present disclosure.
Figure 15:
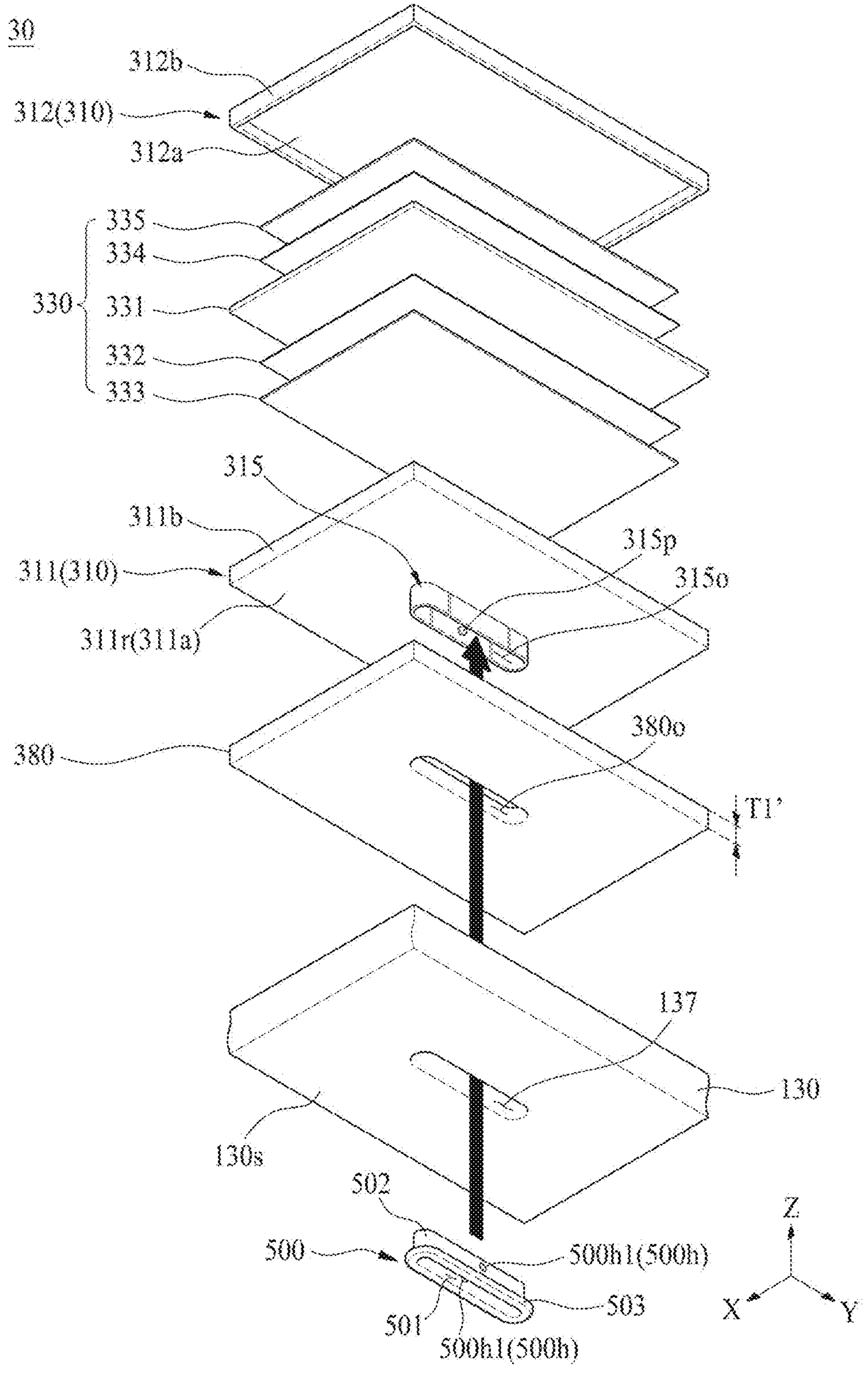
FIG. 15 is an exploded perspective view of a sound apparatus illustrated in FIG. 14 according to another embodiment of the present disclosure.

FIG. 14 illustrates a sound apparatus according to another embodiment of the present disclosure. FIG. 15 is an exploded perspective view of a sound apparatus illustrated in FIG. 14 according to another embodiment of the present disclosure. Particularly, FIGS. 14 and 15 illustrate an embodiment where a connection member is additionally configured at the sound apparatus described above with reference to FIGS. 3 to 8. In the following description, therefore, the connection member will be described in detail, the other elements can be substantially a same as that of descriptions described above with reference to FIGS. 3 to 8, and thus, like reference numerals refer to like elements and repeated descriptions can be omitted or will be briefly given below. Therefore, descriptions above with reference to FIGS. 3 to 8 can be included in the descriptions of FIGS. 14 and 15.

With reference to FIGS. 14 and 15, in a sound apparatus 30 according to another embodiment of the present disclosure, the connection member 380 can be disposed on the rear surface 311*r* of the enclosure 310. The connection member 380 can be disposed between the enclosure 310 and the vehicle interior material 130. For example, the connection member 380 can be disposed between the first enclosure 311 and the vehicle interior material 130. For example, the vehicle interior material 130 can be connected to or coupled to the enclosure 310 by the connection member 380. For example, the vehicle interior material 130 can be connected to or coupled to the rear surface 311*r* of the first enclosure 311 by the connection member 380. Accordingly, the enclosure 310 can be connected to or coupled to the vehicle interior material 130 by the connection member 380. For example, the connection member 380 can be a second connection member, a third intermediate member, a third buffer member, or a third pad member, but embodiments of the present disclosure are not limited thereto.

The connection member 380 can be configured in a material which differs from that of the coupling member 320 of the sound apparatus 30. For example, the connection member 380 can be configured in a material which differs from that of the first coupling member 321 of the coupling member 320. For example, the connection member 380 can be configured in a material having an adhesive force which differs from that of the first coupling member 321. Because the connection member 380 can be configured in a material having an adhesive force which differs from that of the first coupling member 321, a separation or detachment process (or rework) of the connection member 380 from the vehicle interior material 130 can be easily performed in a separation or detachment process (or rework) of the enclosure 310 (or sound apparatus 30) attached on the vehicle interior material 130. Accordingly, a process of attaching or mounting the enclosure 310 (or sound apparatus 30) on the vehicle interior material 130 or a process of separating or attaching/detaching the enclosure 310 (or sound apparatus 30) from the vehicle interior material 130 can be easily performed.

The connection member 380 can be coupled (or attached) to the rear surface 311*r* of the enclosure 310 and can contact (or surface-contact) an outer surface of the vehicle interior material 130, but embodiments of the present disclosure are not limited thereto. For example, in a case where the connection member 380 is coupled (or attached) to the rear surface 311*r* of the enclosure 310 and simply contacts (or surface-contacts) the outer surface of the vehicle interior material 130, a process of separating or detaching (or rework) the connection member 380 from the vehicle interior material 130 without damage of the enclosure 310 (or sound apparatus 30) or the vehicle interior material 130 can be easily performed in a process of separating and detaching (or rework) the sound apparatus 30 (or the enclosure 310) from the vehicle interior material 130. For example, the outer surface of the vehicle interior material 130 can be a second surface, an exterior surface (or an outdoor surface), a front surface, or an upper surface.

According to another embodiment of the present disclosure, the connection member 380 can be configured as a single-sided tape, a single-sided adhesive tape, a single-sided foam tape, a single-sided adhesive foam tape, a single-sided pad, a single-sided foam pad, a single-sided adhesive foam pad, a single-sided pad member, a single-sided cushion member, a single-sided cushion pad, or a single-sided cushion tape, or the like, but embodiments of the present disclosure are not limited thereto. For example, the connection member 380 can be rubber or the like, but embodiments of the present disclosure are not limited thereto. For example, the rubber can be ethylene propylene diene rubber (or ethylene propylene diene M-class rubber), ethylene propylene rubber, or urethane rubber, but embodiments of the present disclosure are not limited thereto. For example, the ethylene propylene rubber can be ethylene propylene diene monomer (EPDM), but embodiments of the present disclosure are not limited thereto. For example, a hardness of the EPDM can be 40 to 90, but embodiments of the present disclosure are not limited thereto. For example, a tensile strength of the EPDM can be 50 $kg/cm^2$ to 200 $kg/cm^2$, but embodiments of the present disclosure are not limited thereto. For example, the connection member 380 can be configured as high-elasticity rubber, but embodiments of the present disclosure are not limited thereto. According to an embodiment of the present disclosure, because the connection member 380 is configured as rubber or the like, when a vibration of the enclosure 310 or the first enclosure 311 is transferred to the vehicle interior material 130, the loss of the vibration can be prevented or minimized, and thus, a sound characteristic and/or a sound pressure level characteristic of a low-pitched sound band can be more improved.

According to an embodiment of the present disclosure, the connection member 380 can further include a hole 380*o*. For example, the connection member 380 can further include a hole 380*o* which is connected to the opening hole 315*o* of the protrusion part 315. The hole 380*o* can be disposed to correspond to (or overlap) the opening hole 315*o*. The hole 380*o* can have a same shape as the protrusion part 315 of the first enclosure 311 and can have a size which is greater than the protrusion part 315 of the first enclosure 311, but embodiments of the present disclosure are not limited thereto. For example, the hole 380*o* can be a through hole, a fourth through hole, an opening part, an opening hole, a slit, a slot, a connection hole, or an intermediate hole, but embodiments of the present disclosure are not limited thereto.

A thickness T1 of the connection member 380 can differ from that of a thickness of at least one of the first coupling member 321 and the second coupling member 322. For example, the thickness T1 of the connection member 380 can be thicker than that of the thickness of at least one of the first coupling member 321 and the second coupling member 322. The thickness T1 of the connection member 380 can be 0.5 mm or more, but embodiments of the present disclosure are not limited thereto. For example, the thickness T1 of the connection member 380 can be 0.5 mm to 3 mm, but embodiments of the present disclosure are not limited thereto.

According to another embodiment of the present disclosure, the connection member 380 can have a compressive force (or a contractive force) and an elastic restoring force and can be contracted or compressed by coupling between the coupling part 500 and the first enclosure 311. A length (or the thickness) of the connection member 380 can be smaller than or equal to a length (or a thickness) of the vehicle interior material 130. For example, the length (or the thickness) of the connection member 380 can be smaller than or equal to a length (or a thickness) of the first enclosure 311.

The connection member 380, as illustrated in FIG. 15, can have the initial thickness T1' before compression (or contraction) and can be compressed (or contracted) to have a deformed thickness (or a compression thickness) T1 illustrated in FIG. 14, based on pressure applied from the enclosure 310 by coupling (or connection) between the coupling part 500 and the enclosure 310. For example, when the enclosure 310 (or sound apparatus 30) is connected to the vehicle interior material 130 by the coupling part 500 or assembly and/or rework are/is completed, a thickness of the connection member 380 can be compressed from the initial thickness T1' to the compression thickness T1, and thus, a vibration of the enclosure 310 can be efficiently transferred to the vehicle interior material 130. For example, when the enclosure 310 (or sound apparatus 30) is separated (or detached) from the vehicle interior material 130 by the detachment of the coupling part 500, the connection member 380 can be restored from the deformed thickness (or the compression thickness) T1 to the initial thickness T1' by an elastic restoring force.

The protrusion part 315 of the enclosure 310 can pass through the hole 380*o* of the connection member 380 and can be accommodated (or inserted) into the hole 137 of the vehicle interior material 130. The opening hole 315*o* of the protrusion part 315 can be exposed to an inner surface 130*s* of the vehicle interior material 130.

The coupling part 500 can be inserted into the opening hole 315*o* of the protrusion part 315 exposed to the inner surface 130*s* of the vehicle interior material 130 and can be detachably fastened to the protrusion part 315. A method of fastening of the coupling part 500 and the protrusion part 315 is substantially a same as the hook fastening scheme described above with reference to FIGS. 7 and 8, and thus, repeated descriptions thereof are omitted.

The sound apparatus 30 according to another embodiment of the present disclosure can have a same effect as the sound apparatus described above with reference to FIGS. 3 to 8, and can additionally have a same effect as the sound apparatus described above with reference to FIGS. 10 to 12.

Figure 16:
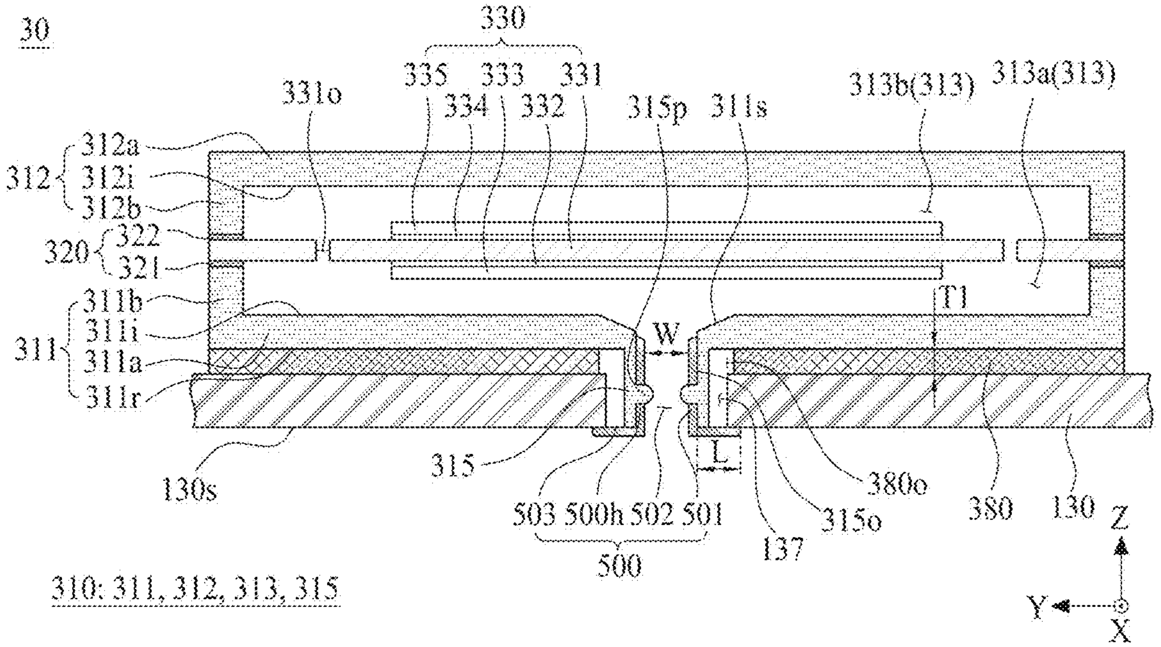
FIG. 16 illustrates a sound apparatus according to another embodiment of the present disclosure.
Figure 17:
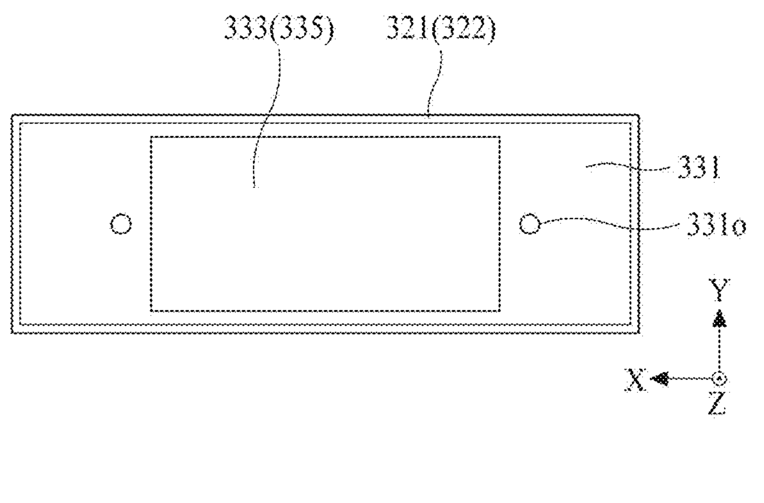
FIG. 17 is a plan view illustrating a vibration member and a vibration apparatus according to another embodiment of the present disclosure.

FIG. 16 illustrates a sound apparatus according to another embodiment of the present disclosure. FIG. 17 is a plan view illustrating a vibration member and a vibration apparatus according to another embodiment of the present disclosure. Particularly, FIGS. 16 and 17 illustrate an embodiment where at least one hole is additionally configured at the sound generating module 330 (or the sound apparatus 30) described above with reference to FIGS. 1 to 15. In the following description, therefore, the at least one hole will be described in detail, the other elements can be substantially a same as that of descriptions described above with reference to FIGS. 1 to 15, and thus, like reference numerals refer to like elements and repeated descriptions can be omitted or will be briefly given below. Therefore, descriptions above with reference to FIGS. 1 to 15 can be included in the descriptions of FIGS. 16 and 17.

With reference to FIGS. 16 and 17, a sound apparatus 30 according to another embodiment of the present disclosure can further include one or more holes 331*o*.

The one or more holes 331*o* can be configured at the sound generating module 330. The one or more holes 331*o* can be configured at the vibration member 331 of the sound generating module 330. The vibration member 331 can include one or more holes 331*o*. The vibration member 331 can include one or more holes 331*o* configured at a periphery of the vibration apparatus 333 and 335.

The one or more holes 331*o* can be configured to pass through the vibration member 331. The one or more holes 331*o* can be configured to pass through the vibration member 331 along a thickness direction Z of the vibration member 331. For example, the one or more holes 331*o* can be formed to vertically pass through the vibration member 331 along the thickness direction Z of the vibration member 331.

The one or more holes 331*o* can be configured to adjust airflow in an internal space 313 of the enclosure 310. For example, the one or more holes 331*o* can perform control so that air flows in the internal spaces 313 of the enclosure 310 spatially separated from each other by the vibration member 331. For example, the one or more holes 331*o* can be configured to adjust air flow between a first space 313*a* and a second space 313*b* spatially separated from each other by the vibration member 331 in the internal space 313 of the enclosure 310. For example, the one or more holes 331*o* can be a through hole, a fifth through hole, a first air hole, a first vent hole, a first air flow hole, a first duct hole, a first connection hole, a first communication hole, or a first space connection part, but embodiments of the present disclosure are not limited thereto.

The one or more holes 331*o* according to an embodiment of the present disclosure can be configured in a polygonal shape such as a circular shape, an oval shape, or a tetragonal shape, but embodiments of the present disclosure are not limited thereto.

The one or more holes 331*o* can be configured to decrease an air pressure of the internal space 313 of the enclosure 310. For example, the one or more holes 331*o* can be configured to connect, with each other, the first space 313*a* and the second space 313*b* spatially separated from each other by the vibration member 331, in the internal space 313 of the enclosure 310. For example, the first space 313*a* and the second space 313*b* of the internal space 313 in the enclosure 310 can be connected to (or communicated with) each other through the one or more holes 331*o*. For example, the one or more holes 331*o* can be configured to decrease an air pressure of the first space 313*a* of the first enclosure 311 or the first space 313*a* provided between the vibration member 331 and the first enclosure 311. Accordingly, a band (reproduction band) of a low-pitched sound band can expand, and thus, a sound characteristic and/or a sound pressure level characteristic of the low-pitched sound band can be improved. Further, the sound generating module 330 can be more stably vibrated by the one or more holes 331*o* in the vibration member 331, and thus, a sound characteristic and/or a sound pressure level characteristic can be more improved.

According to an embodiment of the present disclosure, the one or more holes 331*o* can be disposed adjacent to a vibration apparatus 333 and 335. For example, the one or more holes 331*o* can be disposed at a periphery of the vibration apparatus 333 and 335. For example, the one or more holes 331*o* can be disposed adjacent to a lateral surface of the vibration apparatus 333 and 335. For example, a distance between the one or more holes 331*o* and the vibration apparatus 333 and 335 can be smaller than a distance between the one or more holes 331*o* and a sidewall (or lateral surface) of the enclosure 310. For example, when the one or more holes 331*o* is disposed at a position farther away from the vibration apparatus 333 and 335, a sound characteristic and/or a sound pressure level characteristic of a low-pitched sound band can be more improved.

According to an embodiment of the present disclosure, the one or more holes 331*o* can be configured at the vibration member 331 adjacent to the vibration apparatus 333 and 335 with the vibration apparatus 333 and 335 therebetween. For example, the vibration member 331 can include a first periphery region adjacent a first lateral surface of the vibration apparatus 333 and 335 and a second periphery region, which is opposite to a second side opposite to a first side, of each of the vibration apparatus 333 and 335. For example, with respect to a first direction X, the vibration member 331 can include the first periphery region, a vibration region, and the second periphery region. For example, in the vibration member 331, each of the first and second periphery regions can be a hole region or a non-arrangement region of the vibration apparatus 333 and 335, and the vibration region can be an arrangement region (or a disposition region) of the vibration apparatus 333 and 335. For example, each of the first and second periphery regions may not overlap the vibration apparatus 333 and 335, and the vibration region can overlap the vibration apparatus 333 and 335. For example, the one or more holes 331*o* can be configured in each of the first periphery region and the second periphery region of the vibration member 331 to have a symmetric structure (or a horizontal symmetric structure or a left-right symmetric structure) or an asymmetric structure (or horizontal asymmetric structure or a left-right asymmetric structure), with respect to the vibration apparatuses 333 and 335.

According to an embodiment of the present disclosure, the vibration apparatus 333 and 335 can each include a long side and a short side. A distance (or separation distance or shortest distance) between the one or more holes 331*o* and the short side of the vibration apparatus 333 and 335 can represent a ratio of a short-side length of the vibration apparatus 333 and 335. According to an embodiment of the present disclosure, a distance between the one or more holes 331*o* and the vibration apparatus 333 and 335 can be 60% or less of the short-side length of the vibration apparatus 333 and 335.

The one or more holes 331*o* can be disposed closer to the vibration apparatus 333 and 335 than a coupling member 320. The coupling member 320 can include a first coupling member 321 and a second coupling member 322. For example, the one or more holes 331*o* can be disposed closer to the vibration apparatus 333 and 335 than the first coupling member 321 and the second coupling member 322. Accordingly, a sound characteristic and/or a sound pressure level characteristic of a low-pitched sound band can be enhanced.

According to an embodiment of the present disclosure, the one or more holes 331*o* may not overlap an opening part 310*o*. For example, the one or more holes 331*o* can be disposed to be spaced apart from the opening part 310*o*. Accordingly, a sound generated based on a vibration (or driving) of each of the vibration apparatuses 333 and 335 in the second space 313*b* can be output to the first space 313*a* through the one or more holes 331*o*, and a sound characteristic and/or a sound pressure level characteristic of a low-pitched sound band can be enhanced.

According to an embodiment of the present disclosure, a sound generated based on a vibration (or driving) of each of the vibration apparatus 333 and 335 at a rear surface of the vibration member 331 or the second space 313*b* of the enclosure 310 can be output to the first space 313*a* through the at least one hole 331*o* and can output (or radiated) through the opening hole 315*o* of the protrusion part 315 of the first enclosure 311 and a hollow part 501 of a coupling part 500, and thus, a sound characteristic and/or a sound pressure level characteristic of a low-pitched sound band can be more enhanced.

Figure 18:
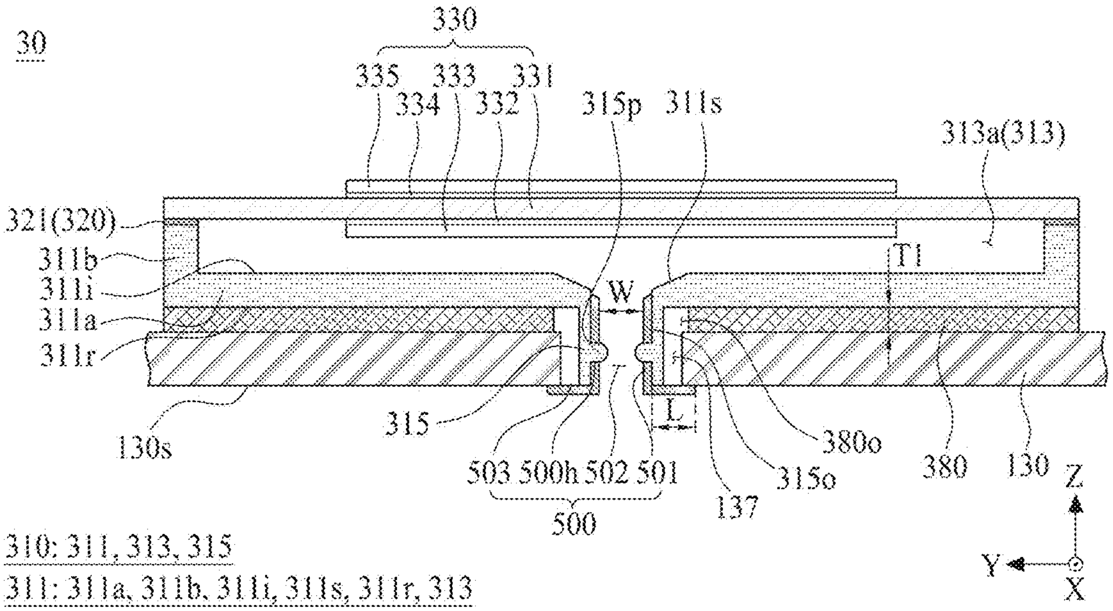
FIG. 18 illustrates a sound apparatus according to another embodiment of the present disclosure.

FIG. 18 illustrates a sound apparatus according to another embodiment of the present disclosure. Particularly, FIG. 18 illustrates an embodiment implemented by modifying the enclosure 310 in the sound apparatus 30 described above with reference to FIGS. 3 to 13. In the following description, therefore, the enclosure 310 will be described in detail, the other elements can be substantially a same as that of descriptions described above with reference to FIGS. 3 to 13, and thus, like reference numerals refer to like elements and repetitive descriptions can be omitted or will be briefly given below. Therefore, in the descriptions of FIGS. 3 to 13, the descriptions of other elements except the descriptions of the enclosure 310 can be included in the descriptions of FIG. 18.

With reference to FIG. 18, in a sound apparatus 30 according to another embodiment of the present disclosure, the enclosure 310 can include a first enclosure 311. For example, the second enclosure 312 can be removed (or omitted) in the enclosure 310 described above with reference to FIGS. 1 to 13, and thus, the enclosure 310 can be configured with only the first enclosure 311.

The enclosure 310 or the first enclosure 311 can be connected to a sound generating module 330 with an internal space 313 therebetween. The enclosure 310 or the first enclosure 311 can be connected to a rear periphery portion of a vibration member 331 with the internal space 313 therebetween.

According to another embodiment of the present disclosure, the vibration member 331 can be configured to cover the internal space 313 of the first enclosure 311. For example, the vibration member 331 can be configured to cover a portion of the internal space 313 of the first enclosure 311. The vibration member 331 can be configured to cover the first space 313*a* of the first enclosure 311. For example, the vibration member 331 can be configured to cover a portion of the first space 313*a* of the first enclosure 311.

In a case where the enclosure 310 is configured with only the first enclosure 311, a sound characteristic and/or a sound pressure level characteristic of a sound apparatus 30 can be more enhanced than a case where the enclosure 310 is configured with the first enclosure 311 and the second enclosure 312. For example, in a case where the enclosure 310 is configured with only the first enclosure 311, a sound characteristic and/or a sound pressure level characteristic of a middle-low-pitched sound band, for example, 2 kHz or less can be more enhanced, and a sound reproduction band can more expand.

The sound apparatus 30 according to another embodiment of the present disclosure can further include the coupling member 320 or the first coupling member 321. The first coupling member 321 can be between the vibration member 331 and the first enclosure 311. A description of the first coupling member 321 can be substantially a same as the description of FIG. 3, and thus, like reference numerals refer to like elements and repeated descriptions thereof are omitted or will be briefly given below.

The sound apparatus 30 according to another embodiment of the present disclosure can further include a connection member 380.

The connection member 380 according to another embodiment of the present disclosure can be disposed between the first enclosure 311 and the vehicle interior material 130. For example, the connection member 380 can be configured in a material which differs from that of the coupling member 320 or the first coupling member 321. For example, the connection member 380 can include a material having high elasticity (or a Young's modulus) than the coupling member 320 or the first coupling member 321. For example, the connection member 380 can be configured in a material having an adhesive force which differs from that of the coupling member 320 or the first coupling member 321.

The connection member 380 according to an embodiment of the present disclosure can be substantially a same as the connection member 380 described above with reference to FIGS. 14 and 15, and thus, repeated descriptions thereof are omitted. Therefore, the descriptions of the connection member 380 described above with reference to FIGS. 14 and 15 can be included in descriptions of the connection member 380 illustrated in FIG. 18.

According to another embodiment of the present disclosure, because the sound apparatus 30 is configured to include the first enclosure 311 and the connection member 380, a sound characteristic and/or a sound pressure level characteristic of each of a low-pitched sound band and a middle-pitched sound band can be more enhanced, a sound reproduction band can expand, and an attachment or detachment process of the enclosure 310 (or sound apparatus 30) attached on the vehicle interior material 130 can be easily performed.

According to another embodiment of the present disclosure, the connection member 380 is configured in a material such as rubber or the like between the vehicle interior material 130 and the enclosure 310 (or the first enclosure 311 or sound apparatus 30), and thus, a vibration of the sound generating module 330 and/or the enclosure 310 (or the first enclosure 311 or sound apparatus 30) can be transferred to the vehicle interior material 130 without being lost, thereby further enhancing a sound characteristic and/or a sound pressure level characteristic of the sound apparatus 30.

The sound apparatus 30 according to another embodiment of the present disclosure can further include one or more of the connection member 350 or the soft member 360 described above with reference to FIGS. 10 to 13 instead of the connection member 350 illustrated in FIG. 18. The descriptions of one or more of the connection member 350 or the soft member 360 illustrated in FIGS. 10 to 13 can be included in descriptions of FIG. 18.

Figure 19:
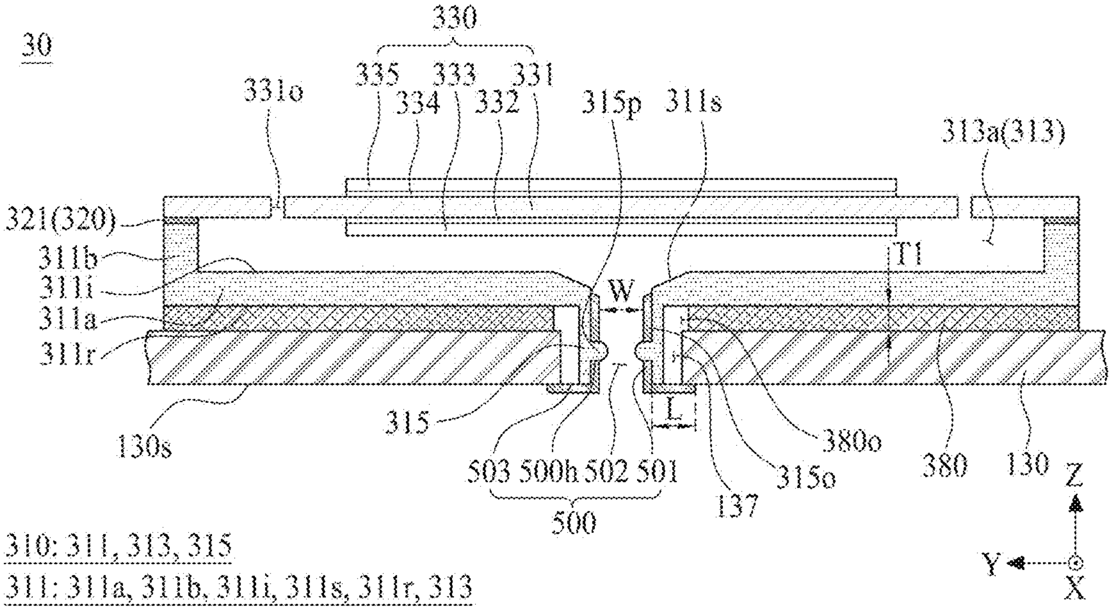
FIG. 19 illustrates a sound apparatus according to another embodiment of the present disclosure.

FIG. 19 illustrates a sound apparatus according to another embodiment of the present disclosure. Particularly, FIG. 19 illustrates an embodiment where at least one or more holes are additionally configured in the sound apparatus 30 described above with reference to FIG. 18. In the following description, therefore, the at least one or more holes will be described in detail, the other elements can be substantially a same as that of descriptions described above with reference to FIG. 18, and thus, like reference numerals refer to like elements and repeated descriptions can be omitted or will be briefly given below. The descriptions of the sound apparatus 30 described above with reference to FIG. 10 can be included in the descriptions of FIG. 19.

With reference to FIG. 19, a sound apparatus 30 according to another embodiment of the present disclosure can further include one or more holes 331*o*.

The one or more holes 331*o* can be configured at the vibration member 331. The vibration member 331 can include one or more holes 331*o* which are configured at a periphery of the vibration apparatus 333 and 335. The one or more holes 331*o* can be configured to adjust a flow of air between an external space and the internal space 313 of the enclosure 310. For example, the one or more holes 331*o* can perform control so that air flows in the internal spaces 313 of the inner space provided between the enclosure 310 (or the first enclosure 311) and the vibration member 331.

Descriptions of the one or more holes 331*o* can be substantially a same as the descriptions described above with reference to FIGS. 16 and 17, and thus, like reference numerals refer to like elements and repetitive descriptions can be omitted or will be briefly given below. Therefore, the descriptions of the one or more holes 331*o* described above with reference to FIGS. 16 and 17 can be included in the descriptions of FIG. 19.

Because the sound apparatus 30 according to another embodiment of the present disclosure further includes the one or more holes 331*o* which is configured at the vibration member 331, a sound characteristic and/or a sound pressure level characteristic of each of the low-pitched sound band and a middle-pitched sound band can be further enhanced, a sound reproduction band can expand.

Figure 20:
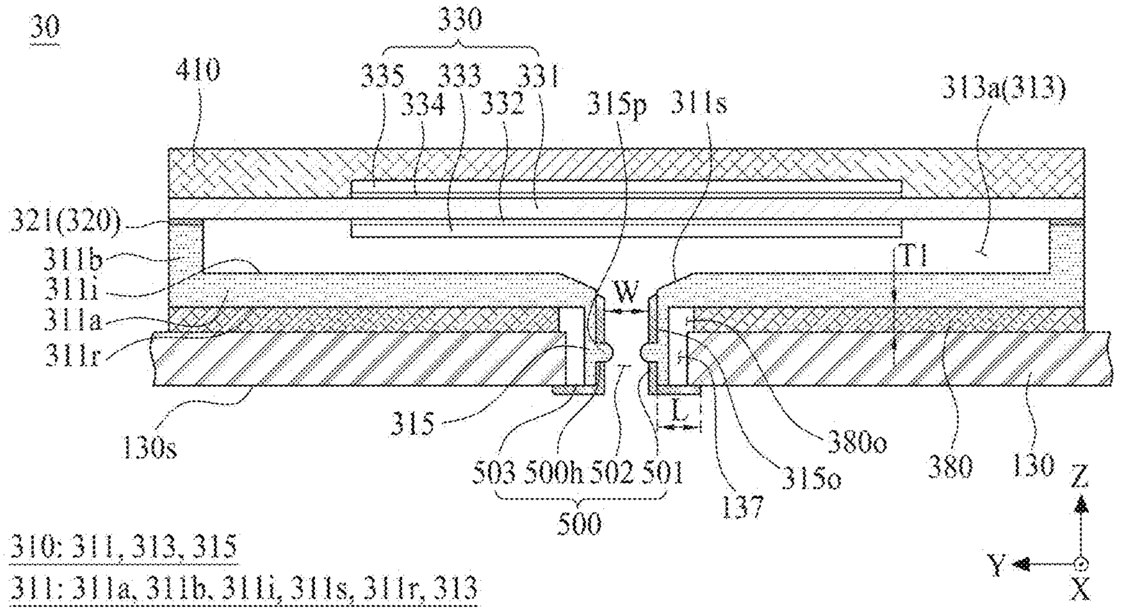
FIG. 20 illustrates a sound apparatus according to another embodiment of the present disclosure.

FIG. 20 illustrates a sound apparatus according to another embodiment of the present disclosure. Particularly, FIG. 20 illustrates an embodiment where a protection member is additionally configured at the sound apparatus 30 described above with reference to FIG. 18. In the following description, therefore, the protection member will be described in detail, the other elements can be substantially a same as that of descriptions described above with reference to FIG. 18, and thus, like reference numerals refer to like elements and repeated descriptions can be omitted or will be briefly given below. Therefore, the descriptions of the sound apparatus 30 described above with reference to FIG. 18 can be included in the descriptions of FIG. 20.

With reference to FIG. 20, a sound apparatus 30 according to another embodiment of the present disclosure can further include a protection member 410.

The protection member 410 can be disposed at a sound generating module 330. For example, the protection member 410 can cover the sound generating module 330. For example, the protection member 410 can be disposed at a second vibration apparatus 335. For example, the protection member 410 can be disposed to cover the second vibration apparatus 335.

The protection member 410 according to an embodiment of the present disclosure can include rubber or sponge, or the like, but embodiments of the present disclosure are not limited thereto. For example, the rubber can be ethylene propylene diene rubber (or ethylene propylene diene M-class rubber), ethylene propylene rubber, or urethane rubber, but embodiments of the present disclosure are not limited thereto. For example, the protection member 410 can include rubber material, or can be configured in ethylene propylene diene rubber, ethylene propylene rubber, or urethane rubber. For example, the ethylene propylene rubber can be ethylene propylene diene monomer (EPDM), but embodiments of the present disclosure are not limited thereto. For example, a hardness of the EPDM can be 40 to 90, but embodiments of the present disclosure are not limited thereto. For example, a tensile strength of the EPDM can be 50 $kg/cm^2$ to 200 $kg/cm^2$, but embodiments of the present disclosure are not limited thereto. For example, a minimum elongation rate of the EPDM can be 200%, but embodiments of the present disclosure are not limited thereto. For example, a use temperature of the EPDM can be −30° C. to 110° C., but embodiments of the present disclosure are not limited thereto. For example, the protection member 410 can be configured in high-elasticity rubber or low-elasticity rubber, but embodiments of the present disclosure are not limited thereto. For example, a thickness of the protection member 410 can be 0.5 mm to 2 mm, but embodiments of the present disclosure are not limited thereto.

According to an embodiment of the present disclosure, because the protection member 410 is configured at the sound generating module 330, a sound characteristic and/or a sound pressure level characteristic of a low-pitched sound band can be more complemented (or improved), and the sound apparatus 30 and/or the vibration apparatus 333 and 335 can be protected from the external impact. For example, the protection member 410 can be a sealing member, an encapsulation member, a buffer member, or an impact absorption member, but embodiments of the present disclosure are not limited thereto.

According to an embodiment of the present disclosure, the protection member 410 can be configured in a material which differs from that of the first coupling member 321. For example, the protection member 410 can be configured in a material having an adhesive force which differs from that of the first coupling member 321. The protection member 410 is configured in a material having an adhesive force which differs from that of at least one of the first coupling member 321 and the second coupling member 322, and thus, the protection member 410 can protect the sound apparatus 30 and/or the vibration apparatus 333 and 335. For example, the protection member 410 can be configured as rubber such as EPDM or the like, and thus, can reinforce a sound pressure level of the low-pitched sound band and can protect the sound apparatus 30 and/or the vibration apparatus 333 and 335.

According to an embodiment of the present disclosure, the protection member 410 can be connected or coupled to the vibration member 331 and/or the vibration apparatus 333 and 335. The protection member 410 can be connected or coupled to the vibration member 331 and/or the second vibration apparatus 335. For example, the protection member 410 can be configured to protect or fix the vibration member 331 and/or the vibration apparatus 333 and 335. The protection member 410 can be fixed at the vibration member 331 and/or the second vibration apparatus 335 to protect the vibration member 331 and/or the second vibration apparatus 335.

The vibration member 331 can include a first surface and a second surface which differs from (or opposite to) the first surface. For example, the enclosure 310 can be connected or coupled to the first surface of the vibration member 331. The protection member 410 can contact the second surface of the vibration member 331 and the second vibration apparatus 335. For example, the protection member 410 can be configured to cover the second surface of the vibration member 331 and the second vibration apparatus 335.

The protection member 410 can have the same size as that of the vibration member 331, but embodiments of the present disclosure are not limited thereto. For example, the protection member 410 can have a size which is greater than that of the vibration apparatus 333 and 335 and is smaller than that of the vibration member 331, but embodiments of the present disclosure are not limited thereto.

According to another embodiment of the present disclosure, because the sound apparatus 30 includes at least one or more of the first enclosure 311, the connection member 380, and the protection member 410, a sound characteristic and/or a sound pressure level characteristic of each of the low-pitched sound band and a middle-pitched sound band can be further enhanced, a sound reproduction band can expand, and the sound apparatus 30 can be protected from an external impact.

Figure 21:
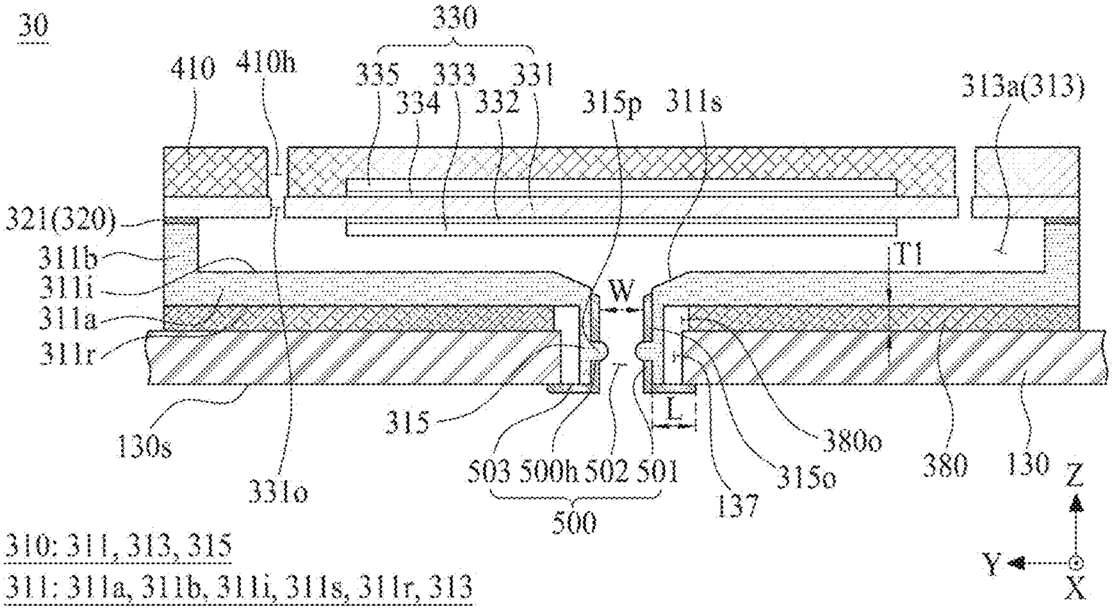
FIG. 21 illustrates a sound apparatus according to another embodiment of the present disclosure.

FIG. 21 illustrates a sound apparatus according to another embodiment of the present disclosure. Particularly, FIG. 21 illustrates an embodiment where one or more holes are additionally configured at each of the vibration member 331 and the protection member 410 described above with reference to FIG. 20. In the following description, therefore, the one or more holes will be described in detail, the other elements can be substantially a same as that of descriptions described above with reference to FIG. 20, and thus, like reference numerals refer to like elements and repeated descriptions can be omitted or will be briefly given below. Therefore, the descriptions of the sound apparatus 30 described above with reference to FIG. 20 can be included in the descriptions of FIG. 21.

With reference to FIG. 21, a sound apparatus 30 according to another embodiment of the present disclosure can further include one or more holes 331*o*.

The one or more holes 331*o* can be configured at a vibration member 331. The vibration member 331 can include one or more holes 331*o* which are configured at a periphery of the vibration apparatus 333 and 335. Descriptions of the one or more holes 331*o* can be substantially a same as the description of FIG. 19, and thus, like reference numerals refer to like elements and repeated descriptions are omitted or will be briefly given below. Therefore, the descriptions of the one or more holes 331*o* described above with reference to FIG. 19 can be included in descriptions of FIG. 21.

The sound apparatus 30 according to another embodiment of the present disclosure can further include one or more holes (or connection holes) 410*h* at the protection member 410.

The one or more holes 410*h* of the protection member 410 can be configured to correspond to (or align with) the one or more holes 331*o* at the vibration member 331. For example, the one or more holes 410*h* of the protection member 410 can be connected or directly connected to the one or more holes 331*o* at the vibration member 331. For example, the hole 410*h* can be a through hole, a sixth through hole, a second air hole, a second vent hole, a second air flow hole, a second duct hole, a second connection hole, a second communication hole, or a second space connection portion, or the like, but embodiments of the present disclosure are not limited thereto.

According to another embodiment of the present disclosure, because the sound apparatus 30 includes one or more of a first enclosure 311, the one or more holes 331*o* configured at the vibration member 331, and the one or more holes 410*h* configured at the protection member 410, a sound characteristic and/or a sound pressure level characteristic of each of the low-pitched sound band and a middle-pitched sound band can be further enhanced, a sound reproduction band can expand.

The inventors have recognized that a sound characteristic is changed based on a structure of the coupling part 500. Therefore, the inventors have performed various research and experiments on the structure of the coupling part 500. Based on the extensive research and experiments, the inventors have invented a sound apparatus including the coupling part 500 for enhancing a sound characteristic and/or a sound pressure level characteristic and a vehicular apparatus including the sound apparatus. This will be described below.

Figure 22:
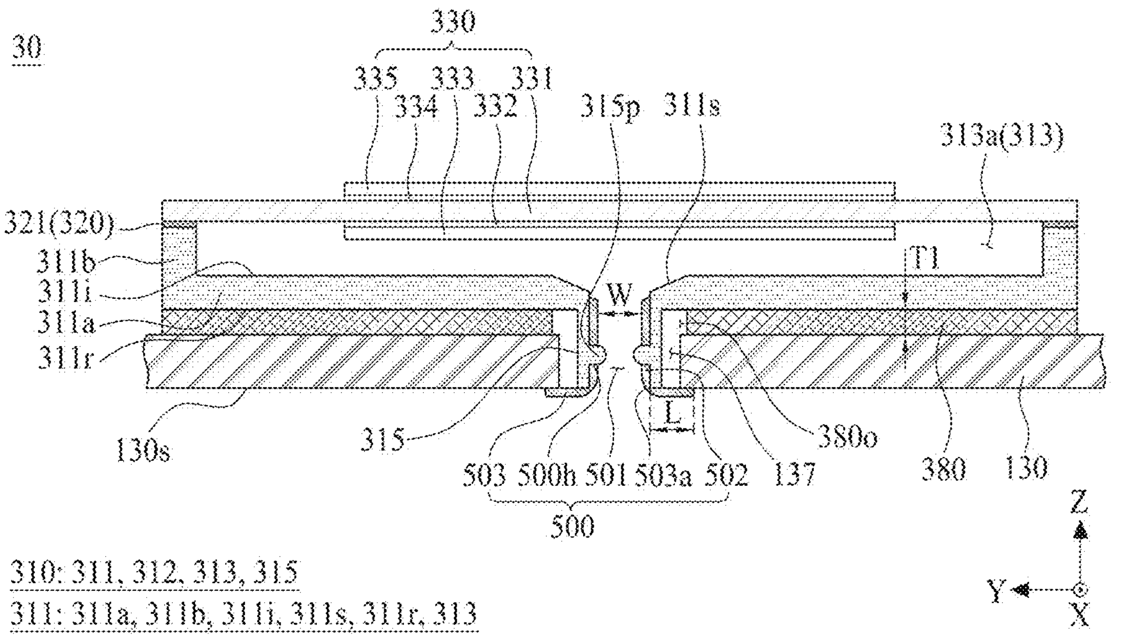
FIG. 22 illustrates a sound apparatus according to another embodiment of the present disclosure.
Figure 23:
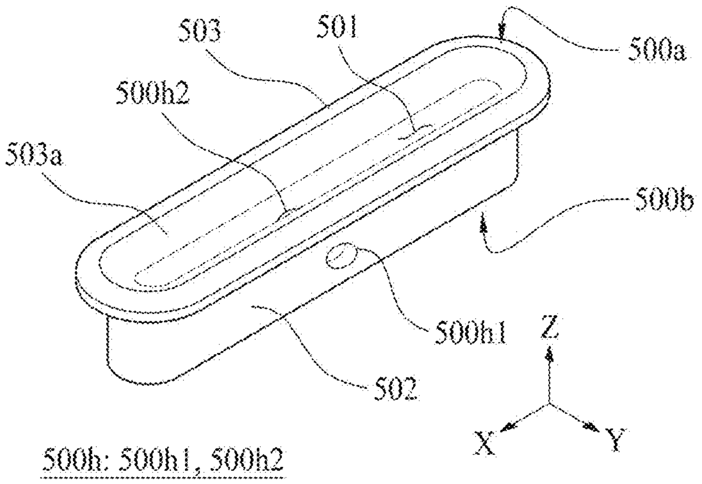
FIG. 23 illustrates a coupling part illustrated in FIG. 22 according to another embodiment of the present disclosure.

FIG. 22 illustrates a sound apparatus according to another embodiment of the present disclosure. FIG. 23 illustrates a coupling part illustrated in FIG. 22 according to another embodiment of the present disclosure. Particularly, FIGS. 22 and 23 illustrate an embodiment implemented by modifying the coupling part 500 in the sound apparatus 30 described above with reference to FIGS. 3 to 21. In the following description, therefore, the coupling part 500 will be described in detail, the other elements can be substantially a same as that of descriptions described above with reference to FIGS. 3 to 21, and thus, like reference numerals refer to like elements and repetitive descriptions can be omitted or will be briefly given below. Therefore, in the descriptions of FIGS. 3 to 21, the descriptions of other elements except the descriptions of the coupling part 500 can be included in the descriptions of FIGS. 22 and 23.

With reference to FIGS. 22 and 23, in a sound apparatus 30 according to another embodiment of the present disclosure, the coupling part 500 can include a hollow member 502 having a hollow part 501, and one or more holes 500*h*. The coupling part 500 can further include a latch member 503 and a chamfer portion 503*a*. In descriptions of the coupling part 500, descriptions of the other elements except the chamfer portion 503*a* can be substantially a same as the descriptions described above with reference to FIG. 6, and thus, like reference numerals refer to like elements and repetitive descriptions can be omitted or will be briefly given below. The descriptions of the coupling part 500 described above with reference to FIG. 10 can be included in descriptions of FIGS. 22 and 23.

The chamfer portion 503*a* can be configured at the hollow part 501. The chamfer portion 503*a* can be configured at the hollow member 502. The chamfer portion 503*a* can be configured at a first end (or a lower surface) 500*a* of the hollow member 502. For example, the chamfer portion 503*a* can be configured at the hollow member 502 and the latch member 503. For example, the chamfer portion 503*a* can be configured at a corner portion between the hollow member 502 and the latch member 503.

The chamfer portion 503*a* according to an embodiment of the present disclosure can include a non-rectangular shape (or a non-right-angled shape). For example, the chamfer portion 503*a* can be configured such that the corner portion between the hollow member 502 and the latch member 503 has a non-rectangular shape. For example, the chamfer portion 503*a* can include one or more of a curve shape (or a round shape) and a slope surface. For example, the chamfer portion 503*a* can have a curvature. For example, the chamfered portion 503*a* can have a curvature of 4 mm (4R), but embodiments of the present disclosure are not limited thereto. For example, the curvature of the chamfer portion 503*a* can be changed based on the length L of the latch member 503.

According to an embodiment of the present disclosure, a sound characteristic and/or a sound pressure level characteristic of the sound which is output through the hollow part 501 of the coupling part 500 can vary based on the curvature of the chamfer portion 503*a*. For example, comparing with a case where the chamfer portion 503*a* has a rectangular shape, in a case where the chamfer portion 503*a* has a non-rectangular shape, it can be seen that peak and/or dip in a low-pitched sound band to a high-pitched sound band are/is improved, thereby enhancing a balance characteristic of a sound pressure level or a flatness characteristic of a sound pressure level. Furthermore, as a curvature of the chamfer portion 503*a* increases, a flatness characteristic of a sound pressure level and/or a sound pressure level characteristic in a high-pitched sound band can be more enhanced.

Therefore, according to an embodiment of the present disclosure, because the coupling part 500 is configured to have a round shape or a slope surface, a sound characteristic and/or a sound pressure level characteristic in a low-pitched sound band including a sound of a low-pitched sound band can be enhanced, and peak and/or dip in a high-pitched sound band can be improved, thereby enhancing a balance characteristic of a sound pressure level or a flatness characteristic of a sound pressure level.

Figure 24:
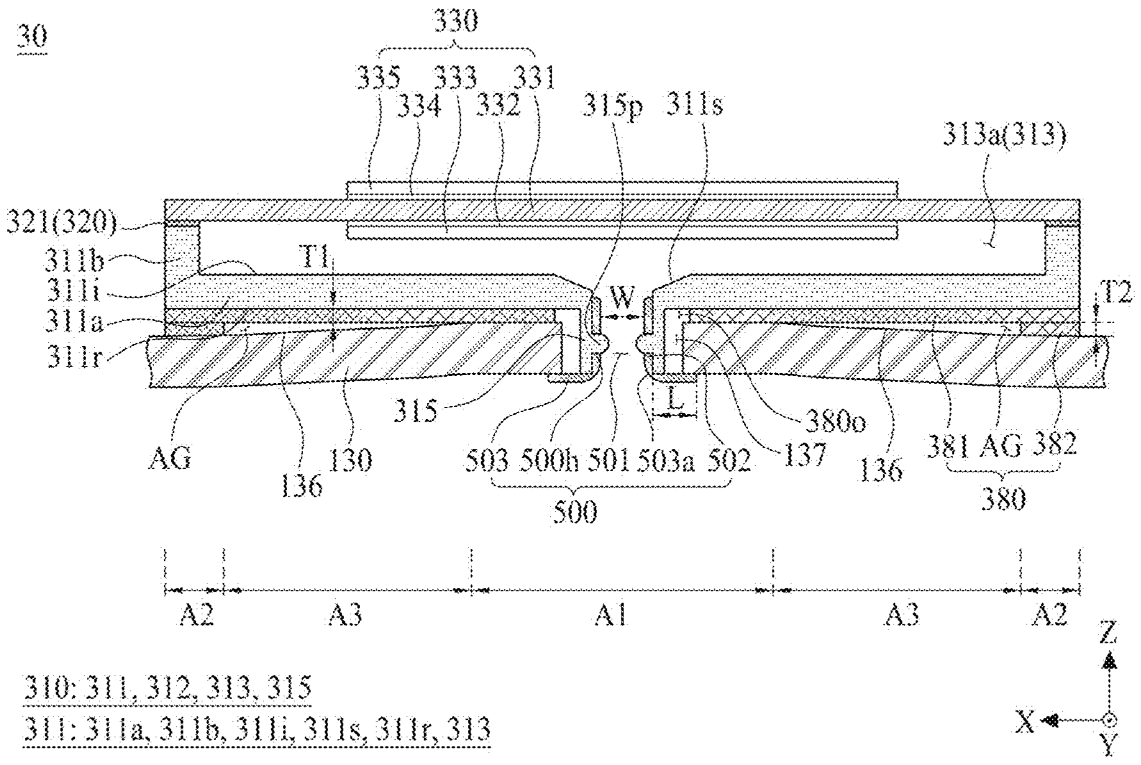
FIG. 24 illustrates a sound apparatus according to another embodiment of the present disclosure.

FIG. 24 illustrates a sound apparatus according to another embodiment of the present disclosure. Particularly, FIG. 24 illustrates an embodiment implemented by modifying the connection member 380 described above with reference to FIGS. 22 to 23. In the following description, therefore, the connection member 380 will be described in detail, the other elements can be substantially a same as that of descriptions described above with reference to FIG. 18, and thus, like reference numerals refer to like elements and repeated descriptions can be omitted or will be briefly given below. Therefore, in the descriptions of FIGS. 22 and 23, the descriptions of other elements except the descriptions of the connection member 380 can be included in the descriptions of FIG. 24.

In a case where the connection member 380 illustrated in FIG. 24 is configured, the inventors of the present disclosure have recognized that a sound characteristic and/or a sound pressure level characteristic are/is reduced because a periphery portion of the connection member 380 is not connected to or does not contact a vehicle interior material 130. For example, the inventors of the present disclosure have recognized that the loss of a sound (or vibration transfer) occurs due to the periphery portion of the connection member 380 which is not connected to or does not contact the vehicle interior material 130. Therefore, the inventors of the present disclosure have recognized that a sound characteristic and/or a sound pressure level characteristic of a low-pitched sound band are/is reduced. Accordingly, the inventors have performed extensive research and experiments. Based on the extensive research and experiments, the inventors of the present disclosure have invented a sound apparatus and a vehicular apparatus including the same, which can more enhance a sound characteristic and/or a sound pressure level characteristic of the low-pitched sound band. This will be described below.

With reference to FIG. 24, in a sound apparatus 30 according to another embodiment of the present disclosure, the connection member 380 can include a first portion and a second portion. The second portion can be a periphery portion of an enclosure 310. The second portion can be a portion (or a region) between the vehicle interior material 130 and the periphery portion of the enclosure 310. The first portion can be the other portion, except the periphery portion, of the enclosure 310. For example, the first portion can correspond to a center portion of the enclosure 310 surrounded by the second portion corresponding to the periphery portion of the enclosure 310.

The first portion of the connection member 380 can include a hole 380*o* that accommodates the protrusion part 315 of the enclosure 310 (or the first enclosure 311). The enclosure 310 or the first enclosure 311 can include one or more regions. For example, the enclosure 310 or the first enclosure 311 can include a first region A1, a second region A2, and a third region A3.

The first region A1 can correspond to a center portion of the enclosure 310 (or the first enclosure 311). The first region A1 can be at the center portion of the enclosure 310 (or the first enclosure 311). The second region A2 can correspond to a periphery portion, surrounding the center portion, of the enclosure 310 or the first enclosure 311. The third region A3 can be between the first region A1 and the second region A2. For example, the first portion of the connection member 380 can be at the first region A1 and the third region A3. For example, the second portion of the connection member 380 can be at the second region A2.

According to an embodiment of the present disclosure, the first portion and the second portion of the connection member 380 can have different thicknesses. For example, the connection member 380 can include the first portion and the second portion having different thicknesses. In the connection member 380, a thickness T1 of the first portion can differ from a thickness "T1+T2" of the second portion. For example, in the connection member 380, the thickness "T1+T2" of the second portion can be thicker than the thickness T1 of the first portion. For example, the thickness T1 of the connection member 380 at the first region A1 can differ from the thickness "T1+T2" of the connection member 380 at the second region A2. At least one of thicknesses of the connection members 30 at each of the first and third regions A1 and A3 can differ from the thickness "T1+T2" of the connection member 380 at the second region A2. For example, the thickness "T1+T2" of the connection member 380 at the second region A2 can be thicker than the thickness T1 of the connection member 380 at the first region A1.

According to an embodiment of the present disclosure, the second portion of the connection member 380 can have a thickness "T1+T2" which is thicker than the first portion, and thus, the periphery portion of the connection member 380 can be connected to or contact the vehicle interior material 130 without being partially detached (or lifted). Therefore, the periphery portion of the connection member 380 can be prevented from being partially detached (or lifted) from the vehicle interior material 130, and a vibration at a periphery portion of the enclosure 310 can be transferred to the vehicle interior material 130 without the loss of a vibration (or vibration transfer) at the periphery portion of the enclosure 310. A vibration at the periphery portion of the enclosure 310 can increase a vibration region of the vehicle interior material 130, and thus, can more improve or reinforce a sound characteristic of a low-pitched sound band.

Therefore, a sound generated from a vibration of the sound generating module 330 (or sound apparatus 30) can be transferred to the vehicle interior material 130 without being lost, and thus, a sound of the low-pitched sound band can be more enhanced. For example, a vibration of the periphery portion of the enclosure 310 (or first enclosure 311) caused by a sound (or sound wave) generated in the internal space 313 of the enclosure 130 based on a vibration of the sound generating module 330 (or sound apparatus 30) can be transferred to the vehicle interior material 130, and thus, vibration efficiency transferred from the enclosure 310 (or sound apparatus 30) to the vehicle interior material 130 can increase, thereby more enhancing a sound characteristic and/or a sound pressure level characteristic of the low-pitched sound band.

The connection member 380 according to an embodiment of the present disclosure can include a first connection member 381 and a second connection member 382.

The first connection member 381 can be at the first portion and the second portion. The first connection member 381 can be connected to the enclosure 310. The first connection member 381 can be connected to (or attached on) the first enclosure 311. The first connection member 381 can be connected to (or attached on) a rear surface 311*r* of the first enclosure 311. The first connection member 381 can be connected to (or attached on) the first to third regions A1, A2, and A3 of the enclosure 310. For example, the first connection member 381 can be connected to (or attached on) the entire rear surface 311*r* of the first enclosure 311.

According to an embodiment of the present disclosure, the first connection member 381 can at the first portion and can include a hole 380*o* corresponding to an opening hole 315*o* of the enclosure 310. For example, the first connection member 381 can at the first portion and can include a hole 380*o* accommodating the protrusion part 315 of the first enclosure 311.

The second connection member 382 can be at the second portion. The second connection member 382 can be connected to a portion of the first connection member 381. The second connection member 382 can be on the first connection member 381 at the second portion. For example, the first portion can include only the first connection member 381 of the first connection member 381 and the second connection member 382. The first connection member 381 and the second connection member 382 can be together at the second portion. For example, the second portion can include all of the first connection member 381 and the second connection member 382. For example, the first connection member 381 and the second connection member 382 can be together at the second region A2.

The first portion and the second portion of the connection member 380 can have different widths (or sizes). In the connection member 380, a width of the first portion can be smaller than that of the second portion. For example, widths of the connection member 380 at the first regions A1 and the third regions A3 can be smaller than a width of the connection member 380 at the second regions A2. Accordingly, the connection member 380 can include the first portion and the second portion having different sizes (or widths) and different thicknesses.

The second connection member 382 can be at a periphery of the first connection member 381. The second connection member 382 can be configured to be stacked on the first connection member 381, at the second portion. The second connection member 382 can be configured to be stacked on the first connection member 381, at the second region A2. Accordingly, the thickness "T1+T2" of the second portion of the connection member 380 can be thicker than the thickness T1 of the first portion, and thus, the periphery portion of the enclosure 310 can be connected to (or contact) the vehicle interior material 130 without being partially detached (or lifted). For example, the second connection member 382 can be a cushion member or a pad member, but embodiments of the present disclosure are not limited thereto.

The first connection member 381 can be substantially a same as the connection member 380 described above with reference to FIG. 18, and thus, the repetitive descriptions can be omitted.

The second connection member 382 can include a same material (or substance) as that of the first connection member 381, but embodiments of the present disclosure are not limited thereto. For example, one of the first connection member 381 and the second connection member 382 can be configured in a material which is a relatively high elasticity (or Young's modulus). One of the first connection member 381 and the second connection member 382 can be high-elasticity rubber or the like, but embodiments of the present disclosure are not limited thereto. One of the first connection member 381 and the second connection member 382 can have a material which is a relatively high elasticity (or Young's modulus) and can be configured in a material which is relatively high in tensile strength. For example, one of the first connection member 381 and the second connection member 382 can include a rubber material, or can include ethylene propylene diene rubber (or ethylene propylene diene M-class rubber), ethylene propylene rubber, or urethane rubber. For example, the ethylene propylene rubber can be ethylene propylene diene monomer (EPDM), but embodiments of the present disclosure are not limited thereto. For example, a hardness of the EPDM can be 40 to 90, but embodiments of the present disclosure are not limited thereto. For example, a tensile strength of the EPDM can be 50 $kg/cm^2$ to 200 $kg/cm^2$, but embodiments of the present disclosure are not limited thereto. For example, a minimum elongation rate of the EPDM can be 200%, but embodiments of the present disclosure are not limited thereto. For example, a use temperature of the EPDM can be −30° C. to 110° C., but embodiments of the present disclosure are not limited thereto.

According to an embodiment of the present disclosure, a coupling member 320 can be configured in a material which differs from that of the connection member 380. For example, one of the first connection member 381 and the second connection member 382 can be configured in a material having elasticity which is higher than that of the coupling member 320.

According to an embodiment of the present disclosure, a width of the connection member 380 at the second portion can be greater than that of a width of the coupling member 320. For example, the width of the connection member 380 at the second region A2 can be greater than that of the width of the coupling member 320.

According to an embodiment of the present disclosure, each of the first connection member 381 and the second connection member 382 of the connection member 380 can have a compressive force (or contractive force) and an elastic restoring force and can be contracted or compressed by coupling between the coupling part 500 and the first enclosure 311. For example, the first connection member 381 disposed (or interposed) between the first enclosure 311 and the vehicle interior material 130 can have a first thickness T1 obtained through compression by a pressing force of the first enclosure 311. The second connection member 382 disposed (or interposed) between the first enclosure 311 and the vehicle interior material 130 can have a second thickness T2 obtained through compression by a pressing force of the first enclosure 311.

The first thickness T1 of the first connection member 381 can be equal to or different from the second thickness T2 of the second connection member 382. The first thickness T1 of the first connection member 381 and the second thickness T2 of the second connection member 382 can each be 0.5 mm or more, but embodiments of the present disclosure are not limited thereto. For example, the first thickness T1 of the first connection member 381 and the second thickness T2 of the second connection member 382 can each be 0.5 mm to 3 mm, but embodiments of the present disclosure are not limited thereto.

The sound apparatus 30 according to another embodiment of the present disclosure can further include an air gap AG at a region between the enclosure 310 and the vehicle interior material 130. For example, the air gap AG can be at a region between the vehicle interior material 130 and the first portion of the connection member 380 or a region between the first portion and the second portion of the connection member 380. For example, the air gap AG can be at the third region A3 between the first region A1 and the second region A2 of the enclosure 310. For example, the air gap AG can be at a region between the third region A3 of the enclosure 310 and the vehicle interior material 130. For example, the air gap AG can be provided at the third region A3 between the first region A1 and the second region A2 of the enclosure 310, and thus, can minimize separation or interference between a vibration of the first region A1 and a vibration of the second region A2, thereby increasing a vibration force (or the amount of vibration) transferred from the second region A2 (for example, the periphery portion) of the enclosure 310 to the vehicle interior material 130. Accordingly, a band (a reproduction band) of a low-pitched sound band can expand, and thus, a sound characteristic and/or a sound pressure level characteristic of the low-pitched sound band can be more improved.

According to an embodiment of the present disclosure, the connection member 380 including the first and second portions having different thicknesses can be configured, thereby providing the sound apparatus 30 where a sound characteristic and/or a sound pressure level characteristic of the low-pitched sound band are/is more enhanced. According to an embodiment of the present disclosure, because the second connection member 382 is configured, a vibration area (or a vibration region) of a roof trim of a vehicular apparatus can be widened when coupling the sound apparatus 30 to the roof trim of the vehicular apparatus, and thus, a sound characteristic and/or a sound pressure level characteristic of the low-pitched sound band can be more enhanced.

Figure 25:
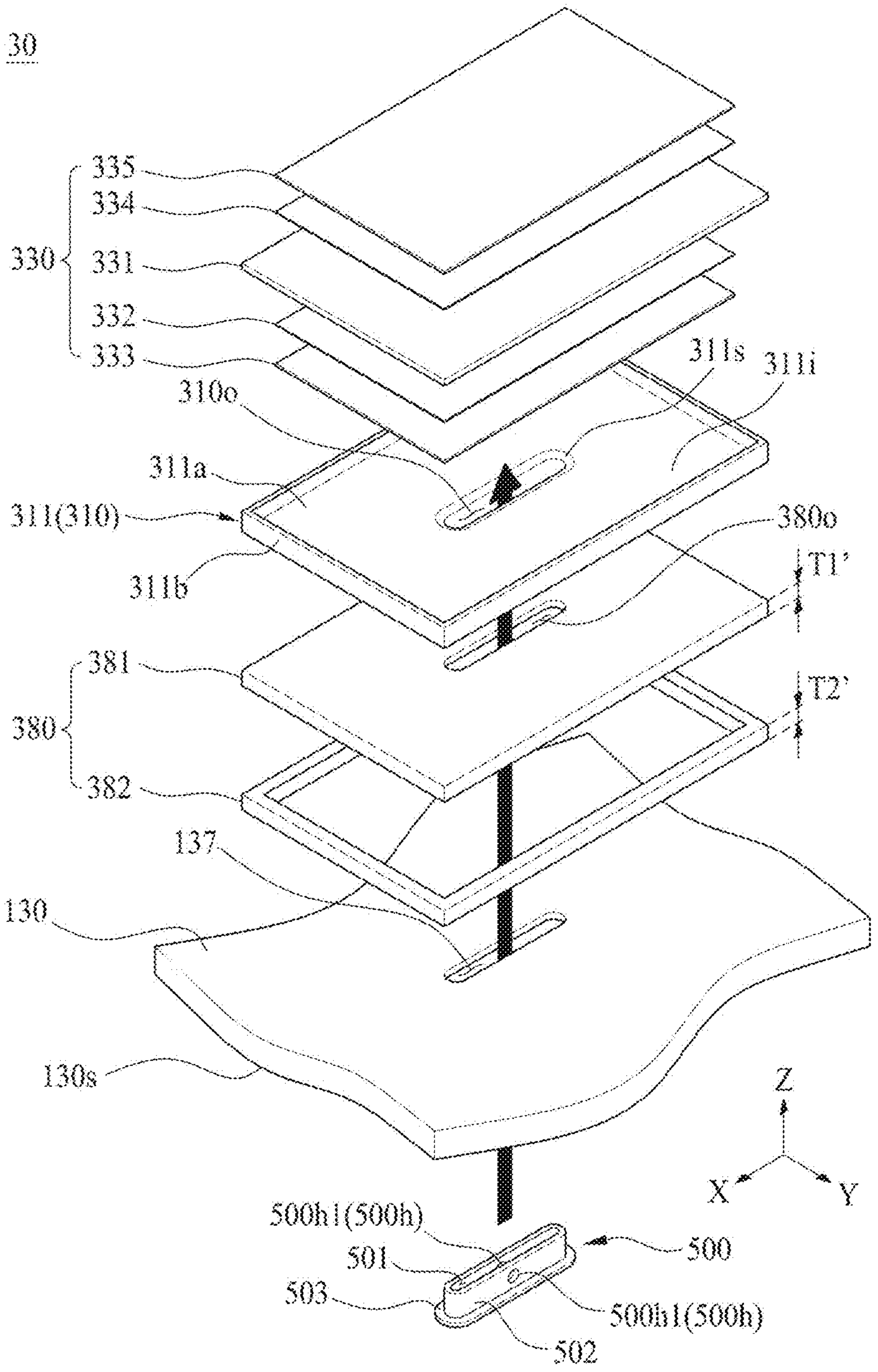
FIG. 25 illustrates a method of fastening a coupling part to a protrusion part of an enclosure illustrated in FIG. 24 according to another embodiment of the present disclosure.

FIG. 25 illustrates a method of fastening a coupling part to a protrusion part of an enclosure illustrated in FIG. 24 according to another embodiment of the present disclosure.

With reference to FIGS. 24 and 25, according to an embodiment of the present disclosure, the first connection member 381 of the connection member 380 can be connected (or attached) to the rear surface (or the first portion and the second portion) of the enclosure 310 (or the first enclosure 311) so that the hole **380*o* accommodates the protrusion part 315 of the enclosure 310 (or the first enclosure 311), and the second connection member 382 of the connection member 380 can be connected (or attached) to the periphery portion (or the second portion) of the first connection member 381**.

The enclosure 310 or the first enclosure 311 can be disposed on the vehicle interior material 130 so that the protrusion part 315 is accommodated into the hole 137 of the vehicle interior material 130. The coupling part 500 can be coupled or fastened to the protrusion part 315 based on a hook coupling scheme by being accommodated (or inserted)

(an arrow direction) into the opening part 310*o* of the protrusion part 315, at (or within) an interior space of the vehicle.

Accordingly, the first enclosure 311 can be connected (or contact) the interior material 130 by the first connection member 381 and the second connection member 382 and coupling with the coupling part 500 and can vibrate the vehicle interior material 130 to output a sound based on a vibration of the sound generating module 330.

The first connection member 381 can have an initial thickness T1' before compression (or contraction) and can be compressed (or contracted) to have a deformed thickness (or a compression thickness) T1, based on pressure applied from the enclosure 310 by coupling (or connection) between the coupling part 500 and the enclosure 310. For example, when the coupling part 500 is coupled (or connected) to the enclosure 310, a thickness of the first connection member 381 can be compressed from the initial thickness T1' to the compression thickness T1, based on pressure applied from the enclosure 310, and thus, a vibration of the first region A1 in the first enclosure 311 can be efficiently transferred to the vehicle interior material 130 through the first portion of the first connection member 381. For example, when the enclosure 310 (or sound apparatus 30) is separated (or detached) from the vehicle interior material 130 by the detachment of the coupling part 500, the first connection member 381 can be restored from the deformed thickness T1 to the initial thickness T1' by an elastic restoring force.

The second connection member 382 can have an initial thickness T2' before compression (or contraction) and can be compressed (or contracted) to have a deformed thickness (or a compression thickness) T2, based on pressure applied from the enclosure 310 by coupling (or connection) between the coupling part 500 and the enclosure 310. For example, when the coupling part 500 is coupled (or connected) to the enclosure 310, a thickness of the second connection member 382 can be compressed from the initial thickness T2' to the compression thickness T2, based on pressure applied from the enclosure 310, and thus, a vibration of the second region A2 at the first enclosure 311 can be efficiently transferred to the vehicle interior material 130 through the second portion of the first connection member 381 and the second connection member 382 which are compressed (or contracted). For example, when the enclosure 310 (or sound apparatus 30) is separated (or detached) from the vehicle interior material 130 by the detachment of the coupling part 500, the second connection member 382 can be restored from the deformed thickness T2 to the initial thickness T2' by an elastic restoring force.

The vehicle interior material 130 connected to (or contacting) the enclosure 310 or the first enclosure 311 can be deformed to include a flexural portion or at least one curved portion, based on coupling (or connection) between the coupling part 500 and the enclosure 310, and thus, partial detachment (or lifting or separation) occurring between the periphery portion of the enclosure 310 or the first enclosure 311 and the vehicle interior material 130 can be prevented by the second portion of the connection member 380 having a relatively thick thickness. Accordingly, a vibration at the periphery portion of the enclosure 310 or the first enclosure 311 based on a vibration of the sound generating module 330 can be transferred to the vehicle interior material 130 without the loss of a vibration (or vibration transfer) at the periphery portion of the first enclosure 311, and thus, vibration efficiency transferred from the enclosure 310 to the vehicle interior material 130 can increase, thereby further enhancing a sound characteristic and/or a sound pressure level characteristic of the low-pitched sound band.

According to another embodiment of the present disclosure, the connection member 380 described above with reference to FIGS. 12 to 21 can be changed to the connection member 380 that includes the first connection member 381 and the second connection member 382 described above with reference to FIGS. 23 and 25, and thus, in the sound apparatus 30 described above with reference to FIGS. 12 to 21, a sound characteristic and/or a sound pressure level characteristic of each of a low-pitched sound band and a middle-pitched sound band can be more enhanced, a sound reproduction band can more expand.

Figure 26:
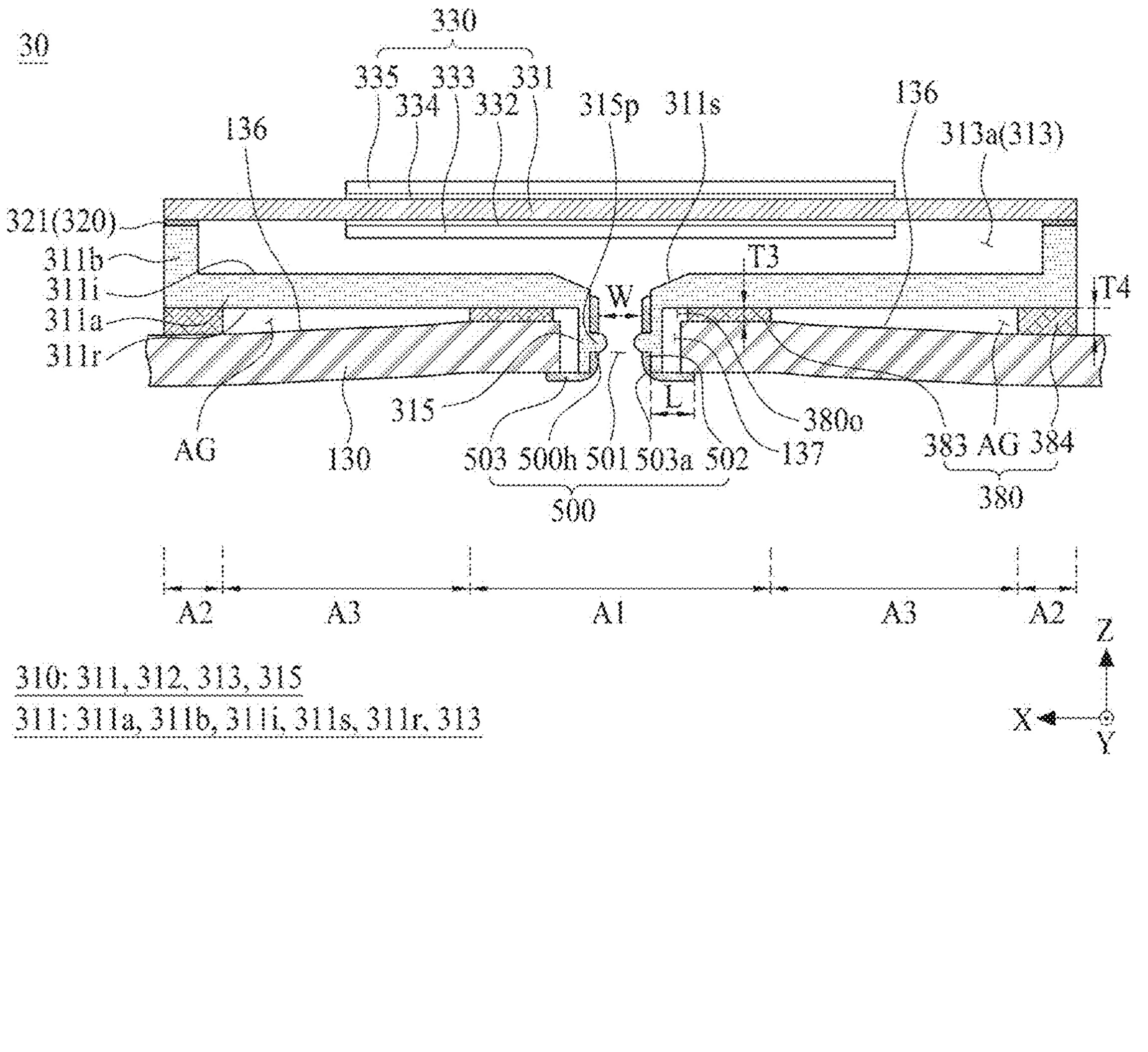
FIG. 26 illustrates a sound apparatus according to another embodiment of the present disclosure.

FIG. 26 illustrates a sound apparatus according to another embodiment of the present disclosure. Particularly, FIG. 26 illustrates another embodiment of the connection member 380 described above with reference to FIGS. 24 and 25. In the following description, therefore, the connection member 380 will be described in detail, the other elements can be substantially a same as that of descriptions described above with reference to FIGS. 24 and 25, and thus, like reference numerals refer to like elements and repeated descriptions can be omitted or will be briefly given below. Therefore, in the descriptions of FIGS. 24 and 25, the descriptions of other elements except the descriptions of the connection member 380 can be included in the descriptions of FIG. 26.

With reference to FIG. 26, in a sound apparatus 30 according to another embodiment of the present disclosure, the connection member 380 can include a first portion and a second portion.

The first portion of the connection member 380 can include a hole 380*o* that accommodates the protrusion part 315 of the enclosure 310 (or the first enclosure 311). The enclosure 310 or the first enclosure 311 can include one or more regions. For example, the enclosure 310 or the first enclosure 311 can include a first region A1, a second region A2, and a third region A3.

According to an embodiment of the present disclosure, the first portion and the second portion of the connection member 380 can have different thicknesses T3 and T4. For example, the connection member 380 can include the first portion and the second portion having different thicknesses T3 and T4. In the connection member 380, a thickness T3 of the first portion can differ from a thickness T4 of the second portion. For example, in the connection member 380, the thickness T4 of the second portion can be thicker than the thickness T3 of the first portion. For example, the thickness T3 of the connection member 380 at the first region A1 can differ from the thickness T4 of the connection member 380 at the second region A2. For example, the thickness T4 of the connection member 380 at the second region A2 can be thicker than the thickness T3 of the connection member 380 at the first region A1. For example, the connection member 380 may not be disposed at the third region A3 between the first region A1 and the second region A2 or at a portion between the first portion and the second portion.

According to an embodiment of the present disclosure, the second portion of the connection member 380 can have the thickness T4 which is thicker than the first portion, and thus, the periphery portion of the connection member 380 can be connected to or contact the vehicle interior material 130 without being partially detached (or lifted or separated). Therefore, the periphery portion of the connection member 380 can be prevented from being partially detached (or lifted or separated) from the vehicle interior material 130, and a vibration at a periphery portion of the enclosure 310 can be transferred to the vehicle interior material 130 without the loss of a vibration (or vibration transfer) at the periphery portion of the enclosure 310. A vibration at the periphery portion of the enclosure 310 can increase a vibration region of the vehicle interior material 130, and thus, can further improve or reinforce a sound characteristic of a low-pitched sound band.

Therefore, a sound generated from a vibration of the sound apparatus 30 (or sound generating module 330) can be transferred to the vehicle interior material 130 without being lost, and thus, a sound of the low-pitched sound band can be more enhanced. For example, a vibration of the periphery portion of the enclosure 310 (or first enclosure 311) caused by a sound (or sound wave) generated in the internal space 313 of the enclosure 130 based on a vibration of the sound generating module 330 (or sound apparatus 30) can be transferred to the vehicle interior material 130, and thus, vibration efficiency transferred from the enclosure 310 (or sound apparatus 30) to the vehicle interior material 130 can increase, thereby more enhancing a sound characteristic and/or a sound pressure level characteristic of the low-pitched sound band.

According to an embodiment of the present disclosure, the connection member 380 can include a first connection member 383 and a second connection member 384.

The first connection member 383 can be connected to the rear surface 311*r* of the enclosure 310. The first connection member 383 can be at the first portion. The first connection member 383 can be only at the first portion of the first portion and the second portion. The first connection member 383 can be connected to (or attached on) the first enclosure 311 of the enclosure 310. For example, the first connection member 383 can be connected to (or attached on) the rear surface 311*r* of the first enclosure 311. For example, the first connection member 383 can be connected to (or attached on) the rear surface 311*r* of the first enclosure 311 corresponding to the first portion of the first portion and the second portion. For example, the first connection member 383 can be connected to (or attached on) a center portion (or a rear center portion) of the first enclosure 311. For example, the first connection member 383 can be connected to (or attached to) only the first region A1 of the first to third regions A1, A2, and A3 of the enclosure 310.

According to an embodiment of the present disclosure, the first connection member 383 can at the first portion and can include a hole 380*o* corresponding to an opening hole 315*o* of the enclosure 310. For example, the first connection member 383 can at the first portion and can include a hole 380*o* accommodating the protrusion part 315 of the first enclosure 311.

The second connection member 384 can be at the second portion. The second connection member 384 can be only at the second portion of the first portion and the second portion and can be spaced apart from the first connection member 383. The second connection member 384 can be at the second portion of the first portion and the second portion to surround the first connection member 383 with an air gap AG therebetween. The second connection member 384 can be connected to (or attached on) the second area A2 of the enclosure 310. For example, the second connection member 384 can be connected to (or attached to) the rear surface 311*r* of the first enclosure 311 corresponding to the second portion of the first portion and the second portion. For example, the second connection member 384 can be connected to (or attached on) a periphery portion (or a rear periphery portion) of the first enclosure 311. For example, the second connection member 384 can be connected (or attached) only to the second region A2 of the first to third regions A1, A2, and A3 of the enclosure 310.

The first portion and the second portion of the connection member 380 can have different widths (or sizes). A width of the first portion can be smaller than that of a width of the second portion. For example, a width of the first connection member 383 at the first regions A1 can be smaller than a width of the second connection member 384 at the second regions A2. Accordingly, the first connection member 383 and the second connection member 384 can include different sizes (or widths) and different thicknesses.

Each of the first connection member 383 and the second connection member 384 can be a cushion member or a pad member, but embodiments of the present disclosure are not limited thereto.

The first connection member 383 can include a same material (or substance) as that of the second connection member 384. Each of the first connection member 383 and the second connection member 384 can be high-elasticity rubber or the like, but embodiments of the present disclosure are not limited thereto. For example, each of the first connection member 383 and the second connection member 384 can include a rubber material, or can include ethylene propylene diene rubber (or ethylene propylene diene M-class rubber), ethylene propylene rubber, or urethane rubber.

According to an embodiment of the present disclosure, a width of the connection member 380 at the second portion can be greater than that of a width of the coupling member 320. For example, a width of the connection member 380 at the second region A2 can be greater than that of the width of the coupling member 320.

According to an embodiment of the present disclosure, each of the first connection member 383 and the second connection member 384 of the connection member 380 can have a compressive force (or contractive force) and an elastic restoring force and can be contracted or compressed by coupling between the coupling part 500 and the first enclosure 311. For example, the first connection member 383 disposed (or interposed) between the first enclosure 311 and the vehicle interior material 130 can have a first thickness (or a third thickness) T3 obtained through compression by a pressing force of the first enclosure 311. The second connection member 384 disposed (or interposed) between the first enclosure 311 and the vehicle interior material 130 can have a second thickness (or a fourth thickness) T4 obtained through compression by a pressing force of the first enclosure 311.

The first thickness T3 of the first connection member 383 can be different from the second thickness T4 of the second connection member 382. The first thickness T3 of the first connection member 383 and the second thickness T4 of the second connection member 384 can each be 0.5 mm or more, but embodiments of the present disclosure are not limited thereto. For example, the first thickness T3 of the first connection member 383 and the second thickness T4 of the second connection member 384 can each be 0.5 mm to 3 mm, but embodiments of the present disclosure are not limited thereto. For example, the first thickness T3 of the first connection member 383 and the second thickness T4 of the second connection member 384 can have different thicknesses within a range of 0.5 mm to 3 mm. For example, the second thickness T4 of the second connection member 384 can be thicker than the first thickness T3 of the first connection member 383 within a range of 0.5 mm to 3 mm.

The sound apparatus 30 according to another embodiment of the present disclosure can further include an air gap AG.

For example, the air gap AG can be at a region between the vehicle interior material 130 and the first portion of the connection member 380 or a region between the first portion and the second portion of the connection member 380. For example, the air gap AG can be at the third region A3 between the first region A1 and the second region A2 of the enclosure 310. For example, the air gap AG can be at a region between the second region A2 of the enclosure 310 and the vehicle interior material 130. For example, the air gap AG can be provided at the third region A3 between the first region A1 and the second region A2 of the enclosure 310, and thus, can minimize separation or interference between a vibration of the first region A1 and a vibration of the second region A2, thereby increasing a vibration force (or the amount of vibration) transferred from the second region A2 (for example, the periphery portion) of the enclosure 310 to the vehicle interior material 130. Accordingly, a band (a reproduction band) of a low-pitched sound band can expand, and thus, a sound characteristic and/or a sound pressure level characteristic of the low-pitched sound band can be further improved.

According to an embodiment of the present disclosure, the connection member 380 including the first and second connection members 383 and 384 having different thicknesses T3 and T4 can be configured, thereby providing the sound apparatus 30 where a sound characteristic and/or a sound pressure level characteristic of the low-pitched sound band are/is further enhanced. According to an embodiment of the present disclosure, because the second connection member 384 is configured, a vibration area (or a vibration region) of a roof trim of a vehicular apparatus can be widened when coupling the sound apparatus 30 to the roof trim of the vehicular apparatus, and thus, a sound characteristic and/or a sound pressure level characteristic of the low-pitched sound band can be further enhanced.

Figure 27:
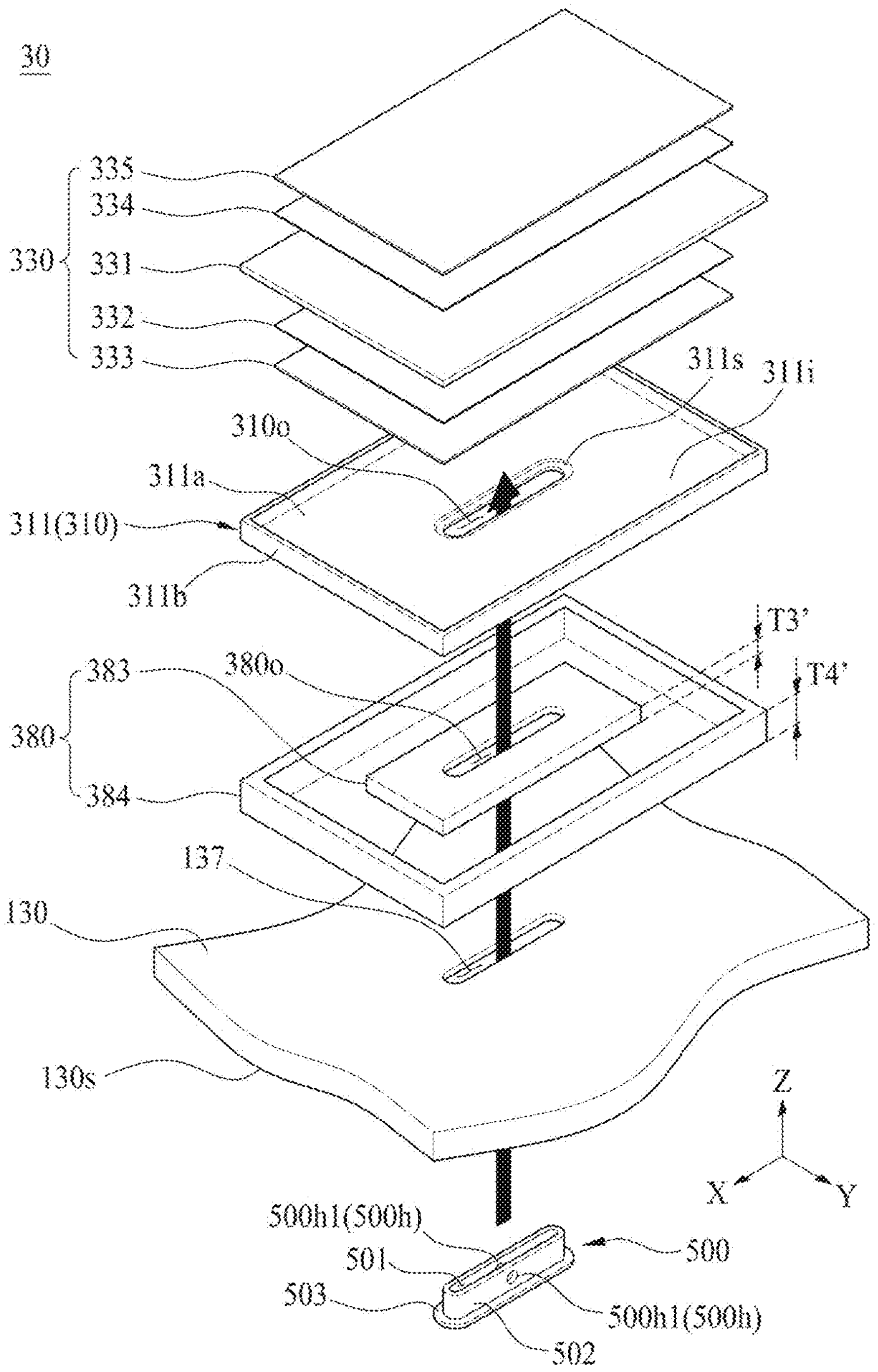
FIG. 27 illustrates a method of fastening a coupling part to a protrusion part of an enclosure illustrated in FIG. 26 according to another embodiment of the present disclosure.

FIG. 27 illustrates a method of fastening a coupling part to a protrusion part of an enclosure illustrated in FIG. 26 according to another embodiment of the present disclosure.

With reference to FIGS. 26 and 27, according to an embodiment of the present disclosure, the first connection member 383 of the connection member 380 can be connected (or attached) to the center portion (or the first portion) of the enclosure 310 (or the first enclosure 311) so that the hole 380*o* accommodates the protrusion part 315 of the enclosure 310 (or the first enclosure 311), and the second connection member 384 of the connection member 380 can be connected (or attached) to the periphery portion (or the second portion) of the enclosure 310 (or the first enclosure 311).

The enclosure 310 or the first enclosure 311 can be disposed on the vehicle interior material 130 so that the protrusion part 315 is accommodated into the hole 137 of the vehicle interior material 130. The coupling part 500 can be coupled or fastened to the protrusion part 315 based on a hook coupling scheme by being accommodated (or inserted) (an arrow direction) into the opening part 310*o* of the protrusion part 315, at (or within) an interior space of the vehicle.

Accordingly, the first enclosure 311 can be connected (or contact) the interior material 130 by the first connection member 383 and the second connection member 384 and coupling with the coupling part 500 and can vibrate the vehicle interior material 130 to output a sound based on a vibration of the sound generating module 330.

The first connection member 383 can have an initial thickness T3' before compression (or contraction) and can be compressed (or contracted) to have a deformed thickness (or a compression thickness) T3, based on pressure applied from the enclosure 310 by coupling (or connection) between the coupling part 500 and the enclosure 310. For example, when the coupling part 500 is coupled (or connected) to the enclosure 310, a thickness of the first connection member 383 can be compressed from the initial thickness T3' to the compression thickness T3, based on pressure applied from the enclosure 310, and thus, a vibration of the first region A1 in the first enclosure 311 can be efficiently transferred to the vehicle interior material 130 through the first connection member 381. For example, when the sound apparatus 30 (or enclosure 310) is separated (or detached) from the vehicle interior material 130 by the detachment of the coupling part 500, the first connection member 383 can be restored from the deformed thickness T3 to the initial thickness T3' by an elastic restoring force.

The second connection member 384 can have an initial thickness T4' before compression (or contraction) and can be compressed (or contracted) to have a deformed thickness (or a compression thickness) T4, based on pressure applied from the enclosure 310 by coupling (or connection) between the coupling part 500 and the enclosure 310. For example, when the coupling part 500 is coupled (or connected) to the enclosure 310, a thickness of the second connection member 384 can be compressed from the initial thickness T4' to the compression thickness T4, based on pressure applied from the enclosure 310, and thus, a vibration of the second region A2 at the first enclosure 311 can be efficiently transferred to the interior material 130 through the second connection member 384 which is compressed (or contracted). For example, when the enclosure 310 (or sound apparatus 30) is separated (or detached) from the vehicle interior material 130 by the detachment of the coupling part 500, the second connection member 384 can be restored from the deformed thickness T4 to the initial thickness T4' by an elastic restoring force.

The vehicle interior material 130 connected to (or contacting) the enclosure 310 or the first enclosure 311 can be deformed to include a flexural portion or at least one curved portion, based on coupling (or connection) between the coupling part 500 and the enclosure 310, and thus, partial detachment (or lifting or separation) occurring between the periphery portion of the enclosure 310 or the first enclosure 311 and the vehicle interior material 130 can be prevented by the second connection member 384 having a relatively thick thickness. Accordingly, a vibration at the periphery portion of the enclosure 310 or the first enclosure 311 based on a vibration of the sound generating module 330 can be transferred to the vehicle interior material 130 without the loss of a vibration (or vibration transfer) at the periphery portion of the first enclosure 311, and thus, vibration efficiency transferred from the enclosure 310 to the vehicle interior material 130 can increase, thereby further enhancing a sound characteristic and/or a sound pressure level characteristic of the low-pitched sound band.

According to another embodiment of the present disclosure, the connection member 380 described above with reference to FIGS. 12 to 21 can be changed to the connection member 380 that includes the first connection member 383 and the second connection member 384 described above with reference to FIGS. 26 and 27, and thus, in the sound apparatus 30 described above with reference to FIGS. 12 to 21, a sound characteristic and/or a sound pressure level characteristic of each of a low-pitched sound band and a middle-pitched sound band can be more enhanced, a sound reproduction band can more expand.

Figure 28:
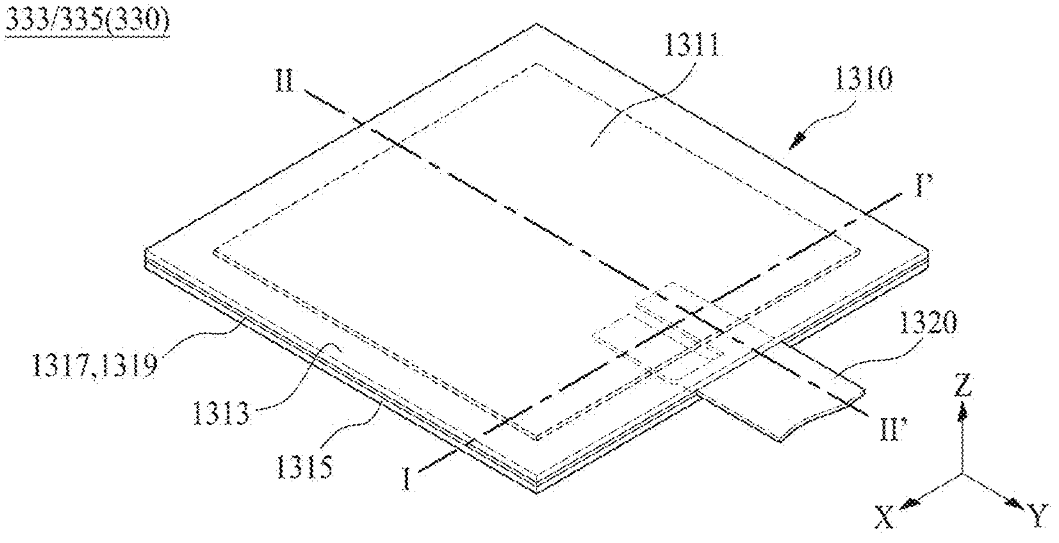
FIG. 28 illustrates a vibration apparatus according to an embodiment of the present disclosure.
Figure 29:
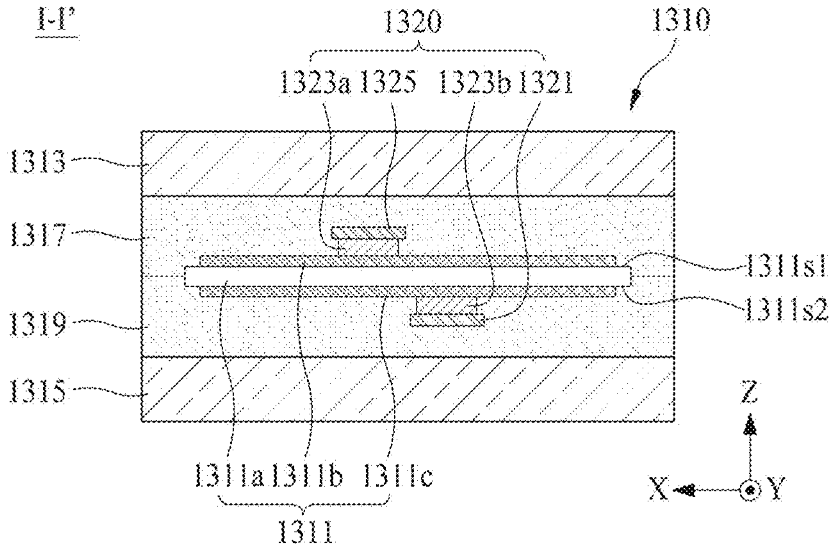
FIG. 29 is a cross-sectional view taken along line I-I' illustrated in FIG. 28 according to an embodiment of the present disclosure.
Figure 30:
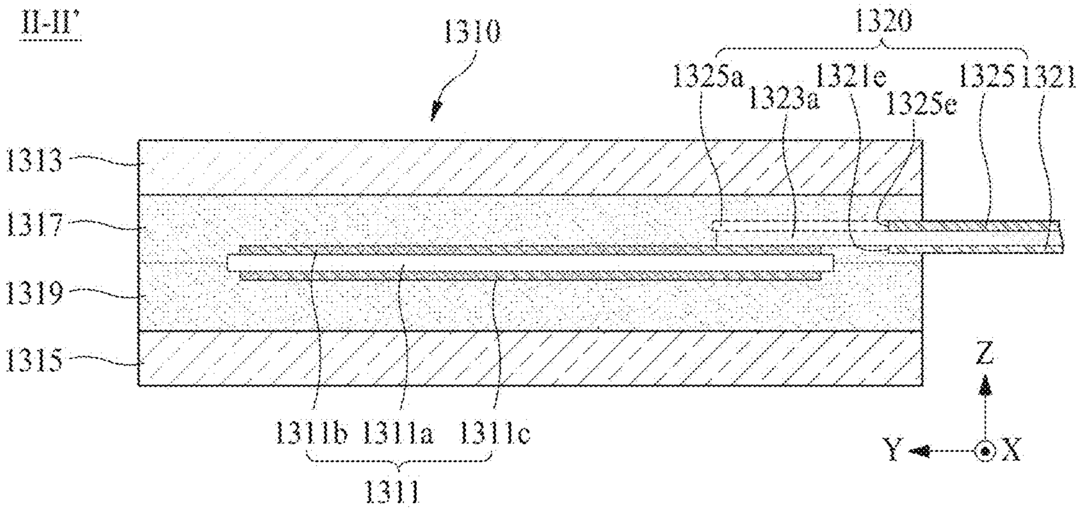
FIG. 30 is a cross-sectional view taken along line II-II' illustrated in FIG. 28 according to an embodiment of the present disclosure.

FIG. 28 illustrates a vibration apparatus according to an embodiment of the present disclosure. FIG. 29 is a cross-sectional view taken along line I-I' illustrated in FIG. 28 according to an embodiment of the present disclosure. FIG. 30 is a cross-sectional view taken along line II-II' illustrated in FIG. 28 according to an embodiment of the present disclosure.

With reference to FIGS. 28 to 30, a sound generating module 330 according to an embodiment of the present disclosure can include a vibration apparatus 333 and 335. The vibration apparatus 333 and 335 can include one or more vibration generators 1310.

The vibration generator 1310 can include a piezoelectric material having a piezoelectric characteristic. The vibration generator 1310 can vibrate (or displace or drive) a vibration member (or a vehicle interior material) based on a vibration (or displacement or driving) of the piezoelectric material based on an electric signal (or a voice signal or a sound signal) applied to the piezoelectric material. For example, the vibration generator 1310 can alternately repeat contraction and/or expansion by a piezoelectric effect (or a piezoelectric characteristic) to vibrate (or displace or drive). For example, the vibration generator 1310 can vibrate (or displace or drive) in a vertical direction (or a thickness direction) Z as contraction and/or expansion are alternately repeated by an inverse piezoelectric effect. For example, in the vibration generator 1310, the piezoelectric material including a piezoelectric ceramic can vibrate or mechanically displace (or vibrate or drive) in response to an electrical signal applied from the outside.

The vibration generator 1310 can be configured as a ceramic-based piezoelectric material capable of implementing a relatively strong vibration, or can be configured as a piezoelectric ceramic having a perovskite-based crystal structure. For example, the vibration generator 1310 can be a vibration generating device, a vibration film, a vibration generating film, a vibrator, an active vibrator, an active vibration generator, an actuator, an exciter, a film actuator, a film exciter, an ultrasonic actuator, or an active vibration member, or the like, but embodiments of the present disclosure are not limited thereto.

The vibration generator 1310 according to an embodiment of the present disclosure can include a vibration generating part 1311.

The vibration generating part 1311 can be configured to vibrate by the piezoelectric effect based on a driving signal. For example, the vibration generating part 1311 can include a piezoelectric type vibration part. The vibration generating part 1311 can include at least one or more of a piezoelectric inorganic material and a piezoelectric organic material. For example, the vibration generating part 1311 can be a vibration device, a piezoelectric device, a piezoelectric device part, a piezoelectric device layer, a piezoelectric structure, a piezoelectric vibration part, or a piezoelectric vibration layer, or the like, but embodiments of the present disclosure are not limited thereto.

The vibration generating part 1311 according to an embodiment of the present disclosure can include a vibration part 1311*a*, a first electrode part 1311*b*, and a second electrode part 1311*c*.

The vibration part 1311*a* can include a piezoelectric material or an electroactive material which includes a piezoelectric effect. For example, the vibration part 1311*a* can be a piezoelectric layer, a piezoelectric material layer, an electroactive layer, a piezoelectric composite layer, a piezoelectric composite, or a piezoelectric ceramic composite, or the like, but embodiments of the present disclosure are not limited thereto.

The vibration part 1311*a* can be configured as a ceramic-based material capable of implementing a relatively strong vibration, or can be configured as a piezoelectric ceramic having a perovskite-based crystalline structure. For example, the vibration part 1311*a* can include at least one or more of lead titanate ($PbTiO_3$), lead zirconate ($PbZrO_3$), lead zirconate titanate ($PbZrTiO_3$), barium titanate ($BaTiO_3$), and strontium titanate ($SrTiO_3$), but embodiments of the present disclosure are not limited thereto.

The piezoelectric ceramic can be configured as a single crystalline ceramic having a crystalline structure, or can be configured as a ceramic material having a polycrystalline structure or polycrystalline ceramic. A piezoelectric material including the single crystalline ceramic can include $\alpha$-$AlPO_4$, $\alpha$-$SiO_2$, $LiNbO_3$, $Tb_2(MoO_4)_3$, $Li_2B_4O_7$, or ZnO, but embodiments of the present disclosure are not limited thereto. A piezoelectric material including the polycrystalline ceramic can include a lead zirconate titanate (PZT)-based material, including lead (Pb), zirconium (Zr), and titanium (Ti), or can include a lead zirconate nickel niobate (PZNN)-based material, including lead (Pb), zirconium (Zr), nickel (Ni), and niobium (Nb), but embodiments of the present disclosure are not limited thereto. For example, the vibration part 1311*a* can include at least one or more of calcium titanate ($CaTiO_3$), $BaTiO_3$, and $SrTiO_3$, without lead (Pb), but embodiments of the present disclosure are not limited thereto.

The first electrode part 1311*b* can be disposed at a first surface (or an upper surface or a front surface) 1311*si* of the vibration part 1311*a*. The first electrode part 1311*b* can have a same size as the vibration part 1311*a*, or can have a size which is smaller than the vibration part 1311*a*.

The second electrode part 1311*c* can be disposed at a second surface (or a lower surface or a rear surface) 1311*s*2 which is opposite to or different from the first surface 1311*si* of the vibration part 1311*a*. The second electrode part 1311*c* can have a same size as the vibration part 1311*a*, or can have a size which is smaller than the vibration part 1311*a*. For example, the second electrode part 1311*c* can have a same shape as the vibration part 1311*a*, but embodiments of the present disclosure are not limited thereto.

According to an embodiment of the present disclosure, in order to prevent electrical short circuit between the first electrode part 1311*b* and the second electrode part 1311*c*, each of the first electrode part 1311*b* and the second electrode part 1311*c* can be formed at a remaining portion except a periphery portion of the vibration part 1311*a*. For example, the first electrode part 1311*b* can be formed at an entire remaining portion except a periphery portion of the first surface 1311*s*1 of the vibration part 1311*a*. For example, the second electrode part 1311*c* can be formed at an entire remaining portion except a periphery portion of the second surface 1311*s*2 of the vibration part 1311*a*. For example, a distance between a lateral surface (or an outer sidewall) of each of the first electrode part 1311*b* and the second electrode part 1311*c* and a lateral surface (or an outer sidewall) of the vibration part 1311*a* can be at least 0.5 mm or more. For example, the distance between the lateral surface of each of the first electrode part 1311*b* and the second electrode part 1311*c* and the lateral surface of the vibration part 1311*a* can be at least 1 mm or more, but embodiments of the present disclosure are not limited thereto.

One or more of the first electrode part 1311*b* and the second electrode part 1311*c* according to an embodiment of the present disclosure can be formed of a transparent conductive material, a semitransparent conductive material, or an opaque conductive material. For example, the transparent conductive material or the semitransparent conductive material can include indium tin oxide (ITO) or indium zinc oxide (IZO), but embodiments of the present disclosure are not limited thereto. The opaque conductive material can include gold (Au), silver (Ag), platinum (Pt), palladium (Pd), molybdenum (Mo), magnesium (Mg), carbon, or silver (Ag) including glass frit, or the like, or can be made of an alloy thereof, but embodiments of the present disclosure are not limited thereto. For example, to enhance an electrical characteristic and/or a vibration characteristic of the vibration part 1311*a*, each of the first electrode part 1311*b* and the second electrode part 1311*c* can include silver (Ag) having a low resistivity. For example, the carbon can include one or more of carbon black, ketjen black, carbon nanotube, and a carbon material including graphite, but embodiments of the present disclosure are not limited thereto.

The vibration part 1311*a* can be polarized (or poling) by a certain voltage applied to the first electrode part 1311*b* and the second electrode part 1311*c* in a certain temperature atmosphere, or a temperature atmosphere that can be changed from a high temperature to a room temperature, but embodiments of the present disclosure are not limited thereto. For example, a polarization direction (or a poling direction) formed in the vibration part 1311*a* can be formed or aligned (or arranged) from the first electrode part 1311*b* to the second electrode part 1311*c*, but embodiments of the present disclosure are not limited thereto. For example, the polarization direction (or the poling direction) formed in the vibration part 1311*a* can be formed or aligned (or arranged) from the second electrode part 1311*c* to the first electrode part 1311*b*.

The vibration part 1311*a* can alternately and repeatedly contract and/or expand by an inverse piezoelectric effect based on a driving signal applied to the first electrode part 1311*b* and the second electrode part 1311*c* from the outside to vibrate. For example, the vibration part 1311*a* can vibrate in a vertical direction (or thickness direction) and in a planar direction by the signal applied to the first electrode part 1311*b* and the second electrode part 1311*c*. The vibration part 1311*a* can be displaced (or vibrated or driven) by contraction and/or expansion of the planar direction, thereby improving a vibration characteristic including a sound characteristic and/or a sound pressure level characteristic of the vibration generator 1310.

The vibration generator 1310 according to an embodiment of the present disclosure can further include a first cover member 1313 and a second cover member 1315.

The first cover member 1313 can be disposed at a first surface of the vibration generating part 1311. For example, the first cover member 1313 can be configured to cover the first electrode part 1311*b* of the vibration generating part 1311. For example, the first cover member 1313 can be at the first electrode part 1311*b*. For example, the first cover member 1313 can be configured to have a larger size than the vibration generating part 1311. The first cover member 1313 can be configured to protect the first surface of the vibration generating part 1311 and the first electrode part 1311*b*.

The second cover member 1315 can be disposed at a second surface of the vibration generating part 1311. For example, the second cover member 1315 can be configured to cover the second electrode part 1311*c* of the vibration generating part 1311. For example, the second cover member 1315 can be at the second electrode part 1311*c*. For example, the second cover member 1315 can be configured to have a greater size than the vibration generating part 1311 and can be configured to have a same size as the first cover member 1313. The second cover member 1315 can be configured to protect the second surface of the vibration generating part 1311 and the second electrode part 1311*c*.

The first cover member 1313 and the second cover member 1315 according to an embodiment of the present disclosure can include a same material or a different material. For example, each of the first cover member 1313 and the second cover member 1315 can be a polyimide (PI) film, a polyethylene terephthalate (PET) film, or a polyethylene naphthalate (PEN) film, but embodiments of the present disclosure are not limited thereto.

The first cover member 1313 can be connected or coupled to the first surface of the vibration generating part 1311 or the first electrode part 1311*b* by a first adhesive layer 1317. For example, the first cover member 1313 can be connected or coupled to the first surface of the vibration generating part 1311 or the first electrode part 1311*b* by a film laminating process using the first adhesive layer 1317.

The second cover member 1315 can be connected or coupled to the second surface of the vibration generating part 1311 or the second electrode part 1311*c* by a second adhesive layer 1319. For example, the second cover member 1315 can be connected or coupled to the second surface of the vibration generating part 1311 or the second electrode part 1311*c* by a film laminating process using the second adhesive layer 1319.

Each of the first adhesive layer 1317 and second adhesive layer 1319 according to an embodiment of the present disclosure can include an electrically insulating material which has adhesiveness and is capable of compression and decompression. For example, each of the first adhesive layer 1317 and the second adhesive layer 1319 can include an epoxy resin, an acrylic resin, a silicone resin, a urethane resin, an acrylic-based polymer, a silicone-based polymer, or a urethane-based polymer, but embodiments of the present disclosure are not limited thereto.

The first adhesive layer 1317 and second adhesive layer 1319 can be configured between the first cover member 1313 and the second cover member 1315 to surround the vibration generating part 1311. For example, one or more of the first adhesive layer 1317 and second adhesive layer 1319 can be configured to partially or completely surround the vibration generating part 1311.

Any one of the first cover member 1313 and the second cover member 1315 can be connected or coupled to the vibration member 331 by the adhesive member 332 and 334 illustrated in FIGS. 3 to 27.

The vibration generator 1310 according to an embodiment of the present disclosure can further include a signal supply member 1320.

The signal supply member 1320 can be configured to supply the driving signal supplied from a driving circuit part to the vibration generating part 1311. The signal supply member 1320 can be configured to be electrically connected to the vibration part 1311*a*. The signal supply member 1320 can be configured to be electrically connected to the first electrode part 1311*b* and the second electrode part 1311*c* of the vibration generating part 1311.

A portion of the signal supply member 1320 can be accommodated (or inserted) between the first cover member 1313 and the second cover member 1315. An end portion (or a distal end portion or one side) of the signal supply member 1320 can be disposed or inserted (or accommodated) between one edge portion (or one periphery portion) of the first cover member 1313 and one edge portion (or one periphery portion) of the second cover member 1315. The one edge portion of the first cover member 1313 and the one edge portion of the second cover member 1315 can accommodate or vertically (or up and down) cover the end portion (or the distal end portion or the one side) of the signal supply member 1320. Accordingly, the signal supply member 1320 can be integrated as one body with the vibration generating part 1311. Accordingly, the sound generating module 330 or the vibration apparatus 333 and 335 can be implemented in a film type integrated with the signal supply member 1320. For example, the signal supply member 1320 can be configured as one part (or one component) with the vibration generating part 1311, thereby realizing an effect of uni-materialization. For example, the signal supply member 1320 can be configured as a signal cable, a flexible cable, a flexible printed circuit cable, a flexible flat cable, a single-sided flexible printed circuit, a single-sided flexible printed circuit board, a flexible multilayer printed circuit, or a flexible multilayer printed circuit board, but embodiments of the present disclosure are not limited thereto.

The signal supply member 1320 according to an embodiment of the present disclosure can include a base member 1321 and a plurality of signal lines 1323*a* and 1323*b*. For example, the signal supply member 1320 can include a base member 1321, a first signal line 1323*a*, and a second signal line 1323*b*.

The base member 1321 can include a transparent or opaque plastic material, but embodiments of the present disclosure are not limited thereto. The base member 1321 can have a certain width along a first direction X and can be extended long along a second direction Y intersecting with the first direction X.

The first signal line 1323*a* and the second signal line 1323*b* can be disposed at the first surface of the base member 1321 in parallel with the second direction Y and can be spaced apart from each other or electrically separated from each other along the first direction X. The first signal line 1323*a* and the second signal line 1323*b* can be disposed in parallel to each other at the first surface of the base member 1321. For example, the first signal line 1323*a* and the second signal line 1323*b* can be implemented in a line shape by patterning of a metal layer (or a conductive layer) formed or deposited at the first surface of the base member 1321.

End portions (or distal end portions or one sides) of the first signal line 1323*a* and the second signal line 1323*b* can be separated from each other, and thus, can be individually curved or bent.

The end portion (or the distal end portion or the one side) of the first signal line 1323*a* can be electrically connected to the first electrode part 1311*b* of the vibration generating part 1311. For example, the end portion of the first signal line 1323*a* can be electrically connected to at least a portion of the first electrode part 1311*b* of the vibration generating part 1311 in the one edge portion of the first cover member 1313. For example, the end portion (or the distal end portion or the one side) of the first signal line 1323*a* can be electrically and directly connected to at least a portion of the first electrode part 1311*b* of the vibration generating part 1311. For example, the end portion (or the distal end portion or the one side) of the first signal line 1323*a* can be electrically connected to or directly contact the first electrode part 1311*b* of the vibration generating part 1311. For example, the end portion of the first signal line 1323*a* can be electrically connected to the first electrode part 1311*b* by a conductive double-sided tape. Accordingly, the first signal line 1323*a* can be configured to transfer a first driving signal, supplied from a driving circuit part (or a vibration driver), to the first electrode part 1311*b* of the vibration generating part 1311.

The end portion (or the distal end portion or the one side) of the second signal line 1323*b* can be electrically connected to the second electrode part 1311*c* of the vibration generating part 1311. For example, the end portion of the second signal line 1323*b* can be electrically connected to at least a portion of the second electrode part 1311*c* of the vibration generating part 1311 in the one edge portion of the second cover member 1315. For example, the end portion of the second signal line 1323*b* can be electrically and directly connected to at least a portion of the second electrode part 1311*c* of the vibration generating part 1311. For example, the end portion of the second signal line 1323*b* can be electrically connected to or directly contact the second electrode part 1311*c* of the vibration generating part 1311. For example, the end portion of the second signal line 1323*b* can be electrically connected to the second electrode part 1311*c* by a conductive double-sided tape. Accordingly, the second signal line 1323*b* can be configured to transfer a second driving signal, supplied from the driving circuit part (or vibration driver), to the second electrode part 1311*c* of the vibration generating part 1311.

The signal supply member 1320 according to an embodiment of the present disclosure can further include an insulation layer 1325.

The insulation layer 1325 can be disposed at the first surface of the base member 1321 to cover each of the first signal line 1323*a* and the second signal line 1323*b* other than the end portion (or one side) of the signal supply member 1320.

An end portion (or one side) of the signal supply member 1320 including an end portion (or one side) of the base member 1321 and an end portion (or one side) 1325*a* of the insulation layer 1325 can be inserted (or accommodated) between the first cover member 1313 and the second cover member 1315 and can be fixed between the first cover member 1313 and the second cover member 1315 by a first adhesive layer 1317 and the second adhesive layer 1319. Accordingly, the end portion (or one side) of the first signal line 1323*a* can be maintained with being electrically connected to the first electrode part 1311*b* of the vibration generating part 1311, and the end portion (or one side) of the second signal line 1323*b* can be maintained with being electrically connected to the second electrode part 1311*c* of the vibration generating part 1311. In addition, the end portion (or one side) of the signal supply member 1320 can be inserted (or accommodated) and fixed between the vibration generating part 1311 and the first cover member 1313, and thus, a contact defect between the vibration generator 1310 and the signal supply member 1320 caused by the movement of the signal supply member 1320 can be prevented.

In the signal supply member 1320 according to an embodiment of the present disclosure, each of the end portion (or one side) of the base member 1321 and the end portion (or one side) 1325*a* of the insulation layer 1325 can be removed. For example, each of the end portion of the first signal line 1323*a* and the end portion of the second signal line 1323*b* can be exposed at the outside without being supported or covered by each of the end portion (or one side) of the base member 1321 and the end portion (or one side) 1325*a* of the insulation layer 1325, respectively. For example, the end portion (or one side) of each of the first signal line 1323*a* and the second signal line 1323*b* can protrude (or extend) to have a certain length from an end 1321*e* of the base member 1321 or an end 1325*e* of the insulation layer 1325. Accordingly, each of the end portion (or the distal end portion or the one side) of each of the first signal line 1323*a* and the second signal line 1323*b* can be individually or independently bent.

The end portion (or one side) of the first signal line 1323*a*, which is not supported by the end portion (or one side) of the base member 1321 and the end portion 1325*a* of the insulation layer 1325, can be directly connected to or directly contact the first electrode part 1311*b* of the vibration generating part 1311. The end portion (or one side) of the second signal line 1323*b*, which is not supported by the end portion (or one side) of the base member 1321 and the end portion 1325*a* of the insulation layer 1325, can be directly connected to or directly contact the second electrode part 1311*c* of the vibration generating part 1311.

According to an embodiment of the present disclosure, a portion of the signal supply member 1320 or a portion of the base member 1321 can be disposed or inserted (or accommodated) between the first cover member 1313 and the second cover member 1315, and thus, the signal supply member 1320 can be integrated (or configured) as one body with the vibration generating part 1311. Accordingly, the vibration generating part 1311 and the signal supply member 1320 can be configured as one part (or one component), and thus, an effect of uni-materialization can be obtained.

According to an embodiment of the present disclosure, the first signal line 1323*a* and the second signal line 1323*b* of the signal supply member 1320 can be integrated as one body with the vibration generator 1310, and thus, a soldering process for an electrical connection between the vibration generator 1310 and the signal supply member 1320 may not be needed. Accordingly, a manufacturing process and a structure of the vibration apparatus 333 and 335 can be simplified, and hazards associated with the soldering process can be reduced.

Figure 31:
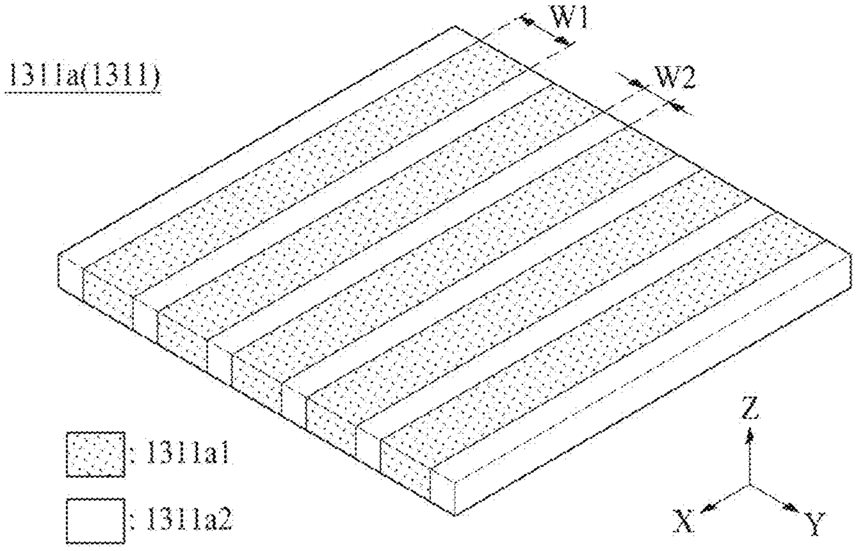
FIG. 31 illustrates a vibration part according to another embodiment of the present disclosure.

FIG. 31 illustrates a vibration part according to another embodiment of the present disclosure. Particularly, FIG. 31 illustrates another embodiment of the vibration part described above with reference to FIGS. 28 to 30.

With reference to FIGS. 29 and 31, the vibration part 1311*a* according to another embodiment of the present disclosure can include a plurality of first portions 1311*a*1 and a plurality of second portions 1311*a*2. For example, the plurality of first portions 1311*a*1 and the plurality of second portions 1311*a*2 can be alternately and repeatedly disposed along a second direction Y (or a first direction X).

Each of the plurality of first portions 1311*a*1 can include an inorganic material portion having a piezoelectric effect (or a piezoelectric characteristic). For example, each of the plurality of first portions 1311*a*1 can include at least one or more of a piezoelectric inorganic material and a piezoelectric organic material. For example, each of the plurality of first portions 1311*a*1 can be an inorganic portion, an inorganic material portion, a piezoelectric portion, a piezoelectric material portion, or an electroactive portion, but embodiments of the present disclosure are not limited thereto.

According to an embodiment of the present disclosure, each of the plurality of first portions 1311*a*1 can have a first width W1 parallel to the second direction Y (or the first direction X) and can be extended along the first direction X (or the second direction Y). Each of the plurality of first portions 1311*a*1 can be substantially a same as a vibration part 1311*a* described above with reference to FIGS. 28 to 30, and thus, repeated descriptions are omitted or will be briefly given below.

Each of the plurality of second portions 1311*a*2 can be disposed between the plurality of first portions 1311*a*1. For example, each of the plurality of first portions 1311*a*1 can be disposed between two adjacent second portions 1311*a*2 of the plurality of second portions 1311*a*2. Each of the plurality of second portions 1311*a*2 can have a second width W2 parallel to the second direction Y (or the first direction X) and can be extended along the first direction X (or the second direction Y). The first width W1 can be a same as or different from the second width W2. For example, the first width W1 can be greater than the second width W2. For example, the first portion 1311*a*1 and the second portion 1311*a*2 can include a line shape or a stripe shape which has a same size or different sizes.

Each of the plurality of second portions 1311*a*2 can be configured to fill a gap between two adjacent first portions of the plurality of first portions 1311*a*1. Each of the plurality of second portions 1311*a*2 can be configured to fill a gap between two adjacent first portions of the plurality of first portions 1311*a*1, and thus, can be connected to or attached on lateral surfaces of the first portion 1311*a*1 adjacent thereto. According to an embodiment of the present disclosure, each of the plurality of first portions 1311*a*1 and the plurality of second portions 1311*a*2 can be disposed (or arranged) at a same plane (or a same layer) in parallel with each other. Therefore, the vibration part 1311*a* can be expanded to a desired size or length by a lateral coupling (or connection) of the first portions 1311*a*1 and the second portions 1311*a*2.

According to an embodiment of the present disclosure, each of the plurality of second portions 1311*a*2 can absorb an impact applied to the first portions 1311*a*1, and thus, can enhance the total durability of the first portions 1311*a*1 and provide flexibility to the vibration part 1311*a*. Each of the plurality of second portions 1311*a*2 can include an organic material having a ductile characteristic. For example, each of the plurality of second portions 1311*a*2 can include one or more of an epoxy-based polymer, an acrylic-based polymer, and a silicone-based polymer, but embodiments of the present disclosure are not limited thereto. For example, each of the plurality of second portions 1311*a*2 can be an organic portion, an organic material portion, an adhesive portion, a stretch portion, a bending portion, a damping portion, or a ductile portion, but embodiments of the present disclosure are not limited thereto.

A first surface of each of the plurality of first portions 1311*a*1 and the plurality of second portions 1311*a*2 can be connected to the first electrode part 1311*b* in common. A second surface of each of the plurality of first portions 1311*a*1 and the plurality of second portions 1311*a*2 can be connected to the second electrode part 1311*c* in common. For example, one or both of the first electrode part 1311*b* and the second electrode part 1311*c* can be formed as pattern-shaped electrodes to correspond only to the plurality of first portions 1311*a*1.

The plurality of first portions 1311*a*1 and the plurality of second portion 1311*a*2 can be disposed on (or connected to) the same plane, and thus, the vibration part 1311*a* according to another embodiment of the present disclosure can have a single thin film-type. Accordingly, the vibration generating part 1311 or the vibration generator 1310 including the vibration part 1311*a* according to another embodiment of the present disclosure can vibrate by the first portion 1311*a*1 having a vibration characteristic and can be bent in a curved shape by the second portion 1311*a*2 having flexibility.

Figure 32:
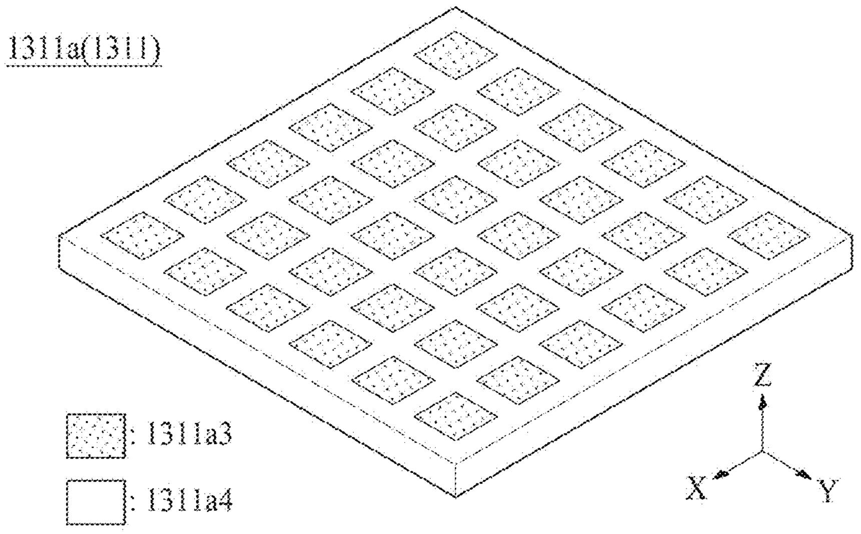
FIG. 32 illustrates a vibration part according to another embodiment of the present disclosure.

FIG. 32 illustrates a vibration part according to another embodiment of the present disclosure. Particularly, FIG. 32 illustrates another embodiment of the vibration part described above with reference to FIGS. 28 to 30.

With reference to FIGS. 29 and 32, the vibration part 1311*a* according to another embodiment of the present disclosure can include a plurality of first portions 1311*a*3 and a second portion 1311*a*4 disposed between the plurality of first portions 1311*a*3.

Each of the plurality of first portions 1311*a*3 can be disposed to be spaced apart from one another along each of the first direction X and the second direction Y. For example, each of the plurality of first portions 1311*a*3 can have a hexahedral shape having a same size and can be disposed in a lattice shape, but embodiments of the present disclosure are not limited thereto. For example, each of the plurality of first portions 1311*a*3 can have a circular shape plate, an oval shape plate, or a polygonal shape plate, which has a same size as each other, but embodiments of the present disclosure are not limited thereto.

Each of the plurality of first portions 1311*a*3 can be substantially a same as the first portion 1311*a*1 described above with reference to FIG. 31, and thus, repeated descriptions are omitted or will be briefly given below.

The second portion 1311*a*4 can be disposed between the plurality of first portions 1311*a*3 along each of the first direction X and the second direction Y. The second portion 1311*a*4 can be configured to fill a gap between two adjacent first portions 1311*a*3, or to be adjacent to each of the plurality of first portions 1311*a*3 or to surround each of the plurality of first portions 1311*a*3, and thus, the second portion 1311*a*4 can be connected to or attached on the first portion 1311*a*3 adjacent thereto. The second portion 1311*a*4 can be substantially a same as the second portion 1311*a*2 described above with reference to FIG. 31, and thus, repeated descriptions are omitted or will be briefly given below.

A first surface of each of the plurality of first portions 1311*a*3 and the second portions 1311*a*4 can be connected to the first electrode part 1311*b* in common. A second surface of each of the plurality of first portions 1311*a*3 and the second portions 1311*a*4 can be connected to the second electrode part 1311*c* in common. For example, one or both of the first electrode part 1311*b* and the second electrode part 1311*c* can be formed as pattern-shaped electrodes to correspond only to the plurality of first portions 1311*a*3.

The plurality of first portions 1311*a*3 and the second portion 1311*a*4 can be disposed on (or connected to) the same plane, and thus, the vibration part 1311*a* according to another embodiment of the present disclosure can have a single thin film-type. Accordingly, the vibration generating part 1311 or the vibration generator 1310 including the vibration part 1311*a* according to another embodiment of the present disclosure can vibrate by the first portion 1311*a*3 having a vibration characteristic and can be bent in a curved shape by the second portion 1311*a*4 having flexibility.

Figure 33:
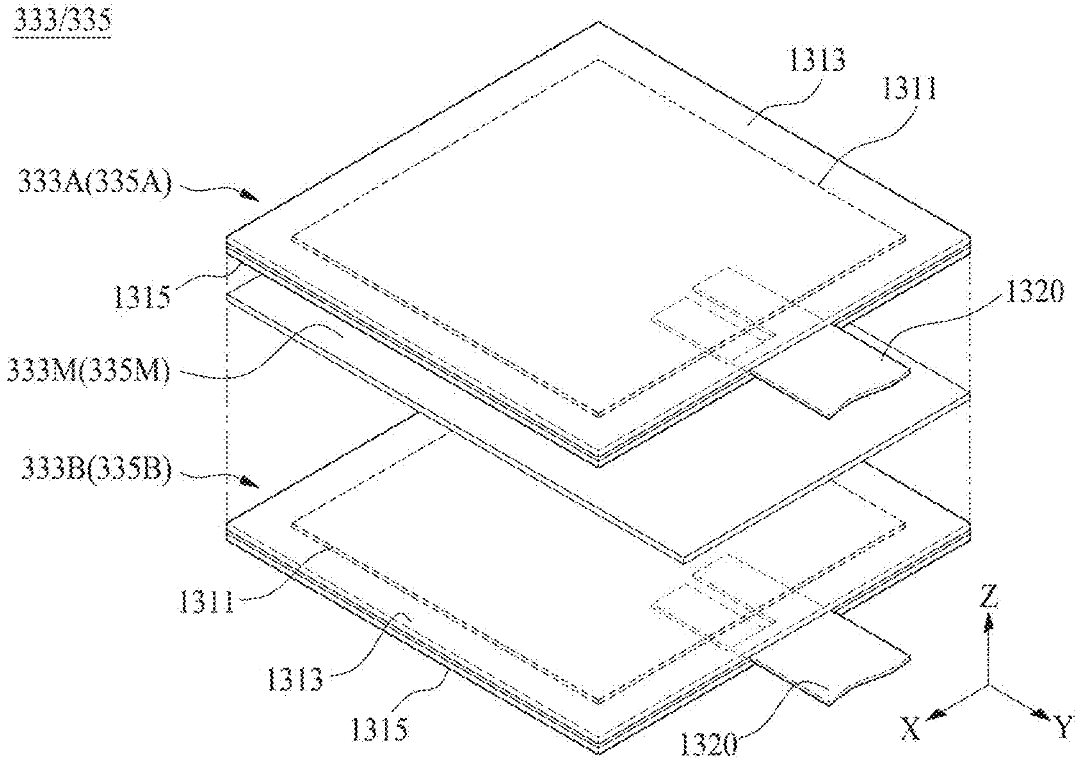
FIG. 33 illustrates a vibration apparatus according to another embodiment of the present disclosure.

FIG. 33 illustrates a vibration apparatus according to another embodiment of the present disclosure. Particularly, FIG. 33 illustrates a vibration apparatus including one or more vibration generators described above with reference to FIG. 9.

With reference to FIGS. 9 and 33, the vibration apparatus 333 and 335 according to another embodiment of the present disclosure can include two or more vibration generators 333A, 333B, 335A, and 335B. For example, the vibration apparatus 333 and 335 can include a first vibration generator 333A and 335A and a second vibration generator 333B and 335B.

The first vibration generator 333A and 335A and the second vibration generator 333B and 335B can overlap or be stacked with each other to be displaced (or driven or vibrated) in a same direction to maximize an amplitude displacement of the vibration apparatus 333 and 335 or an amplitude displacement of a vibration member 331. For example, the first vibration generator 333A and 335A and the second vibration generator 333B and 335B can have substantially a same size, but embodiments of the present disclosure are not limited thereto. For example, the first vibration generator 333A and 335A and the second vibration generator 333B and 335B can have substantially a same size within an error range of a manufacturing process, but embodiments of the present disclosure are not limited thereto. Therefore, the first vibration generator 333A and 335A and the second vibration generator 333B and 335B can maximize the amplitude displacement of the vibration apparatus 333 and 335 and/or the amplitude displacement of the vibration member 331.

According to an embodiment of the present disclosure, any one of the first vibration generator 333A and 335A and the second vibration generator 333B and 335B can be connected or coupled to the vibration member 331 by an adhesive member 332 and 334 illustrated in FIGS. 3 to 27. For example, the first vibration generator 333A and 335A can be connected or coupled to the vibration member 331 by the adhesive member 332 and 334.

Each of the first vibration generator 333A and 335A and the second vibration generator 333B and 335B can be a same as or substantially a same as the vibration generating part 1311 described above with reference to FIGS. 28 to 32, and thus, like reference numeral refer to like element and repeated descriptions are omitted or will be briefly given below.

The vibration apparatus 333 and 335 according to another embodiment of the present disclosure can further include an intermediate member 333M and 335M.

The intermediate member 333M and 335M can be disposed or connected between the first vibration generator 333A and 335A and the second vibration generator 333B and 335B. For example, the intermediate member 333M and 335M can be disposed or connected between the second cover member 1315 of the first vibration generator 333A and 335A and the first cover member 1313 of the second vibration generator 333B and 335B. For example, the intermediate member 333M and 335M can be an adhesive member or a connection member, but embodiments of the present disclosure are not limited thereto.

The intermediate member 333M and 335M according to an embodiment of the present disclosure can be configured in a material including an adhesive layer which is good in adhesive force or attaching force with respect to each of the first vibration generator 333A and 335A and the second vibration generator 333B and 335B. For example, the intermediate member 333M and 335M can include a foam pad, a double-sided tape, a double-sided foam tape, a double-sided pad, a double-sided foam pad, or an adhesive, or the like, but embodiments of the present disclosure are not limited thereto. For example, an adhesive layer of the intermediate member 333M and 335M can include epoxy, acrylic, silicone, or urethane, but embodiments of the present disclosure are not limited thereto. For example, the adhesive layer of the intermediate member 333M and 335M can include a urethane-based material (or substance) having relatively ductile characteristic. Accordingly, the vibration loss caused by displacement interference between the first vibration generator 333A and 335A and the second vibration generator 333B and 335B can be reduced or minimized, or each of the first vibration generator 333A and 335A and the second vibration generator 333B and 335B can be freely displaced (or vibrated or driven).

The vibration apparatus 333 and 335 according to another embodiment of the present disclosure can include the first vibration generator 333A and 335A and the second vibration generator 333B and 335B which are stacked (or piled or overlap) to vibrate (or displace or drive) in the same direction, and thus, the amount of displacement or an amplitude displacement can be maximized or increase. Accordingly, the amount of displacement (or a bending force or a driving force) or an amplitude of displacement of the vibration member 331 can be maximized or increased.

Figure 34:
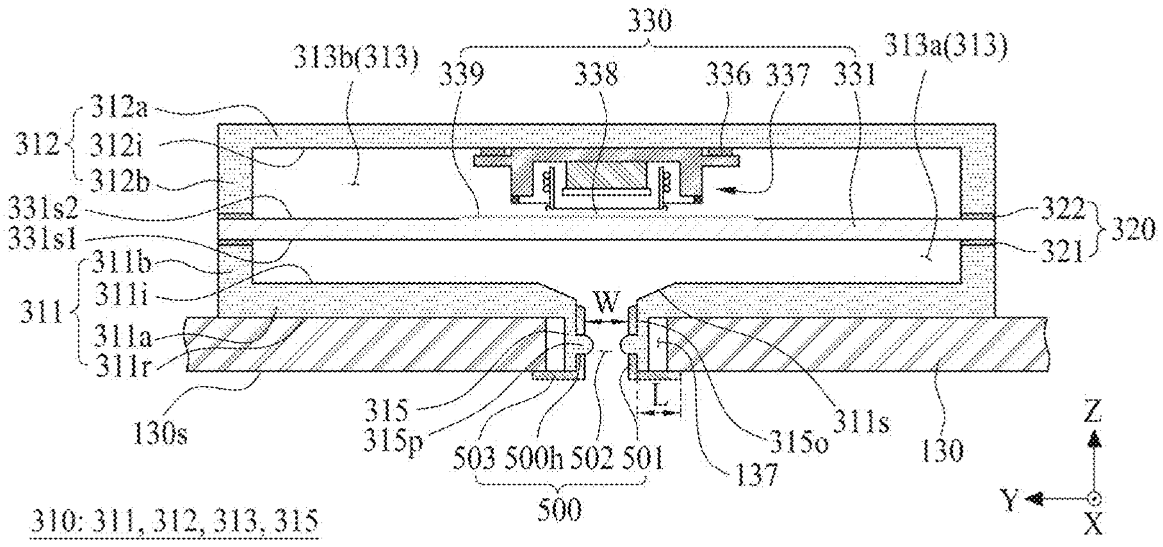
FIG. 34 illustrates a sound apparatus according to another embodiment of the present disclosure.
Figure 35:
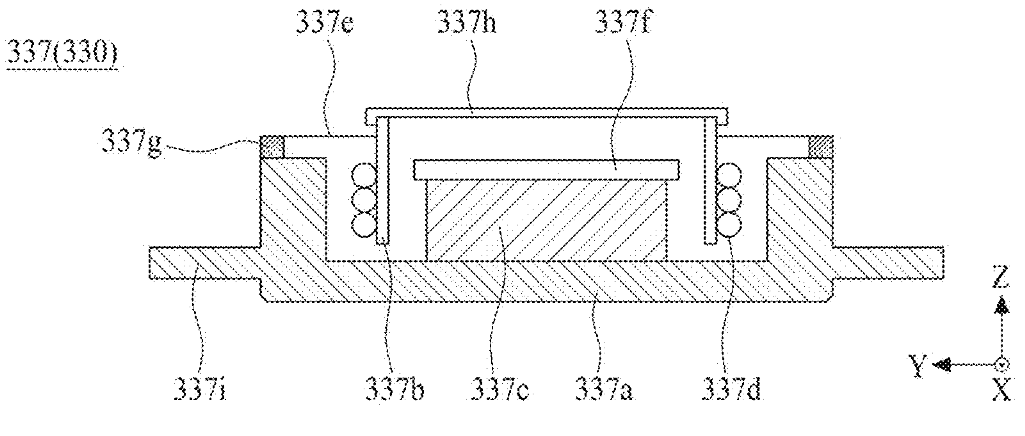
FIG. 35 is a cross-sectional view illustrating a vibration apparatus illustrated in FIG. 34 according to another embodiment of the present disclosure.
Figure 36:
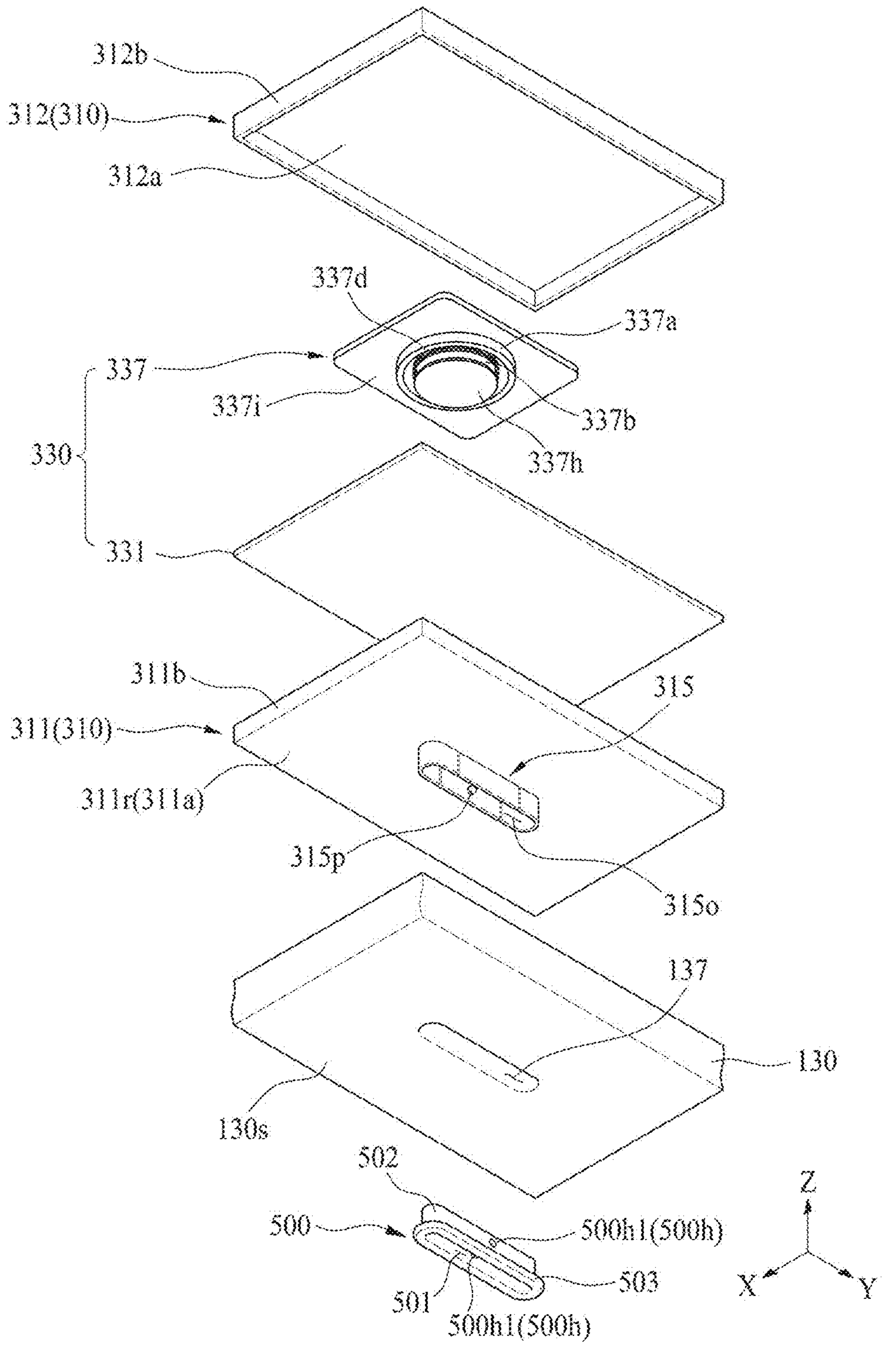
FIG. 36 is an exploded perspective view of a sound apparatus illustrated in FIG. 34 according to another embodiment of the present disclosure.

FIG. 34 illustrates a sound apparatus according to another embodiment of the present disclosure. FIG. 35 is a cross-sectional view illustrating a vibration apparatus illustrated in FIG. 34 according to another embodiment of the present disclosure. FIG. 36 is an exploded perspective view of a sound apparatus illustrated in FIG. 34 according to another embodiment of the present disclosure. Particularly, FIGS. 34 to 36 illustrate an embodiment implemented by modifying the vibration apparatus of the sound generating module 330 in the sound apparatus 30 described above with reference to FIGS. 3 to 8. In the following description, therefore, the vibration apparatus will be described in detail, the other elements can be substantially a same as that of descriptions described above with reference to FIGS. 3 to 8, and thus, like reference numerals refer to like elements and repeated descriptions can be omitted or will be briefly given below. Therefore, in the descriptions of FIGS. 3 to 8, the descriptions of other elements except the descriptions of the vibration apparatus 333 and 335 can be included in the descriptions of FIGS. 34 to 36.

With reference to FIGS. 34 to 36, in a sound apparatus 30 according to another embodiment of the present disclosure, a vibration apparatus 337 of the sound generating module 330 can include a coil-type vibration apparatus or a coil-type actuator which is configured to vibrate the vibration member 331. For example, the vibration apparatus 337 can be configured to vibrate with a current (or a voice current) applied based on Fleming's left hand rule. For example, the vibration apparatus 337 can include a sound generator, a sound generating device, a vibration generating device, a sound wave generating device, a vibration generator, a vibration source, or a sound wave generator, or the like, but embodiments of the present disclosure are not limited thereto. For example, the vibration apparatus 337 can be configured with a sound actuator, a sound exciter, or a sound transducer that includes a coil (or a voice coil) and a magnet.

The vibration apparatus 337 can be disposed or configured at the second space 313*b* of the internal space 313 of the enclosure 310 to vibrate (or displace) the vibration member 331. For example, the vibration apparatus 337 can be disposed or configured between the second enclosure 312 and the vibration member 331. For example, the vibration apparatus 337 can be disposed or configured between the second plate 312*a* of the second enclosure 312 and the second surface 331*s*2 of the vibration member 331.

The vibration apparatus 337 can be supported by or coupled to the enclosure 310 and connected or coupled to the vibration member 331. For example, the vibration apparatus 337 can be supported by or coupled to the second enclosure 312 and connected or coupled to the vibration member 331. For example, the vibration apparatus 337 can be supported by or coupled to the second plate 312*a* of the second enclosure 312 and can be connected or coupled to the second surface 331*s*2 of the vibration member 331. For example, the second surface 331*s*2 of the vibration member 331 at a periphery of the vibration apparatus 337 can be the second surface of the sound generating module 330.

The vibration apparatus 337 can vibrate (or displace or drive) based on a driving signal (or a vibration driving signal or a voice signal) applied thereto to vibrate (or displace or drive) the vibration member 331.

The sound apparatus 30 or the sound generating module 330 according to an embodiment of the present disclosure can further include a fixing member 336.

The fixing member 336 can be configured to fix the vibration apparatus 337 to the enclosure 310. For example, the fixing member 336 can be configured to fix the vibration apparatus 337 to the second enclosure 312 or the second plate 312*a* of the second enclosure 312. Accordingly, the vibration apparatus 337 can be fixed (or supported) or connected (or coupled) to the second enclosure 312 or the second plate 312*a* of the second enclosure 312 by the fixing member 336.

The fixing member 336 according to an embodiment of the present disclosure can be an adhesive member (or a second adhesive member). The adhesive member can be disposed or connected between at least a portion of the vibration apparatus 337 and the second enclosure 312 (or the second plate 312*a* of the second enclosure 312). Accordingly, the vibration apparatus 337 can be fixed (or supported) or connected (or coupled) to the second enclosure 312 (or the second plate 312*a*) by the adhesive member. For example, the adhesive member can be configured in an adhesive, a double-sided tape, a double-sided sponge tape, a double-sided porous tape, or a double-sided cushion tape, or the like, but embodiments of the present disclosure are not limited thereto.

The fixing member 336 according to another embodiment of the present disclosure can include a plurality of screws (or a plurality of bolts). The plurality of screws can pass through at least a portion of the vibration apparatus 337 and can be fastened to the second enclosure 312 or the second plate 312*a* of the second enclosure 312. Therefore, the vibration apparatus 337 can be fixed (or supported) or connected (or coupled) to the second enclosure 312 or the second plate 312*a* of the second enclosure 312 by the plurality of screws.

The sound apparatus 30 or the sound generating module 330 according to an embodiment of the present disclosure can further include an adhesive member (or a first adhesive member) 338.

The adhesive member 338 can be disposed (or interposed) between the vibration member 331 and the vibration apparatus 337. The adhesive member 338 can be configured to connect (or couple) the vibration apparatus 337 to the vibration member 331. For example, the adhesive member 338 can be disposed or connected between the vibration apparatus 337 and the second surface 331*s*2 of the vibration member 331. Accordingly, the vibration apparatus 337 can be connected (or coupled) to the vibration member 331 by the adhesive member 338. For example, the vibration apparatus 337 can be attached to the vibration member 331 or the second surface 331*s*2 of the vibration member 331 by the adhesive member 338. For example, the adhesive member 338 can be configured in a double-sided tape, a double-sided foam tape, a double-sided pad, a double-sided foam pad, a conductive double-sided tape, a conductive double-sided foam tape, or a conductive adhesive, or the like, but embodiments of the present disclosure are not limited thereto.

The sound apparatus 30 or the sound generating module 330 according to an embodiment of the present disclosure can further include a heat dissipation plate 339.

The heat dissipation plate 339 can be disposed or connected between the vibration apparatus 337 of the sound generating module 330 and the vibration member 331. The heat dissipation plate 339 can be attached to the second surface 331*s*2 of the vibration member 331 to overlap the vibration apparatus 337 and can be coupled (or connected) to the vibration apparatus 337. The heat dissipation plate 339 can be connected (or coupled) to the vibration apparatus 337 by the adhesive member 338. For example, the vibration apparatus 337 can be attached or connected (or coupled) to the heat dissipation plate 339 by the adhesive member 338. The heat dissipation plate 339 can dissipate (or diffuse) heat generated when driving (or vibration) the vibration apparatus 337, toward the vibration member 331 and can thus prevent a reduction in performance of the vibration apparatus 337.

The heat dissipation plate 339 can be configured to have a size (or area) which is relatively greater than the vibration apparatus 337. The heat dissipation plate 339 can be formed of a metal material having high heat conductivity such as one material of aluminum (Al), copper (Cu), silver (Ag), and magnesium (Mg) or an alloy thereof or the like, but embodiments of the present disclosure are not limited thereto. For example, the heat dissipation plate 339 can be a heat diffusion member, a heat diffusion sheet, a heat diffusion layer, a heat diffusion plate, a heat sink, a heat dissipation sheet, or a heat dissipation layer, or the like, but embodiments of the present disclosure are not limited thereto.

The vibration apparatus 337 according to an embodiment of the present disclosure can include a base frame 337*a*, a magnetic circuit part including a bobbin 337*b*, and a damper 337*e*. For example, the vibration apparatus 337 can include the base frame 337*a*, the bobbin 337*b*, a magnet 337*c*, a coil 337*d*, and the damper 337*e*.

The base frame 337*a* can be a main body of the vibration apparatus 530. The base frame 337*a* can support the magnet 337*c*. The base frame 337*a* can include a metal material having magnetism like iron (Fe). The base frame 337*a* can be referred to as a base plate, a lower plate, or a yoke, or the like, but embodiments of the present disclosure are not limited thereto.

The base frame 337*a* can include a groove portion which accommodates the magnet 337*c* and the bobbin 337*b*. For example, the groove portion can be formed concavely from an upper surface of the base plate 337*a* to have a shape corresponding to a shape of each of the magnet 337*c* and the bobbin 337*b*.

The magnetic circuit part can be disposed at the base frame 337*a* and can be configured to vibrate (or displace) the vibration member 331. For example, the magnetic circuit part can include the magnet 337*c*, the bobbin 337*b*, and the coil 337*d*, which are disposed at the base frame 337*a*. For example, the magnetic circuit part can be a magnetic vibration part or a magnetic vibration unit, but embodiments of the present disclosure are not limited thereto.

The magnetic circuit part according to an embodiment of the present disclosure can have an external magnetic type structure or a dynamic magnetic type structure where the magnet 337*c* is disposed outward from the coil 337*d* (or the bobbin 337*b*), or can have an internal magnetic type structure or micro type structure where the magnet 337*c* is disposed inward from the coil 337*d* (or the bobbin 337*b*). The vibration apparatus 337 including the magnetic circuit part having the internal magnetic type structure can have a totally small size and a low leakage magnetic flux. The vibration apparatus 337 according to an embodiment of the present disclosure can have the external magnetic type structure or the internal magnetic type structure, and hereinafter, an example where the vibration apparatus 337 has the internal magnetic type will be described.

The magnet 337*c* can be accommodated or inserted into the groove portion of the base frame 337*a*. The magnet 337*c* can be a permanent magnet capable of being accommodated or inserted into the bobbin 337*b*.

The bobbin 337*b* can be disposed on the base frame 337*a* to surround around the magnet 337*c*. For example, the bobbin 337*b* can include a structure formed of a material obtained by processing pulp or paper, A1 or magnesium (Mg) or an alloy thereof, or synthetic resin such as polyimide or the like. For example, the bobbin 337*b* can be implemented with a polyimide film which is relatively good in heat dissipation characteristic and is relatively lightweight.

The bobbin 337*b* can have a circular shape or an oval shape, but embodiments of the present disclosure are not limited thereto. For example, the oval shape of the bobbin 337*b* can have an elliptical shape, a rectangular shape with rounded corners, or non-circular curved shape having a width different from its height, but embodiments of the present disclosure are not limited thereto. For example, the bobbin 337*b* having the oval shape can improve a sound of a high-pitched sound band than the bobbin 337*b* having the circular shape and can decrease the occurrence of heat caused by a vibration, and thus, can have an excellent heat dissipation characteristic.

The bobbin 337*b* can be connected (or coupled) to the vibration member 331 by the adhesive member 338. For example, a front surface (or a front end portion) of the bobbin 337*b* can be attached to the second surface 331*s*2 of the vibration member 331 by the adhesive member 338. For example, when the sound apparatus 30 includes the heat dissipation plate 339 attached to the second surface 331*s*2 of the vibration member 331, the bobbin 337*b* can be connected to the heat dissipation plate 339 by the adhesive member 338.

The coil 337*d* can be wound to surround an outer circumference surface of the bobbin 337*b* and can be supplied with a sound-generating current (or a voice current) from the outside. The coil 337*d* can be lowered or raised together with the bobbin 337*b*. The coil 337*d* can be referred to as a voice coil. When a current is applied to the coil 337*d*, a whole portion of the bobbin 337*b* can move upward and downward according to Fleming's left hand rule based on an application magnetic field generated around the coil 337*d* and an external magnetic field generated around the magnet 337*c*, and a sound (or a sound wave) or a vibration can be generated by a vibration of the vibration member 331 based on a vertical movement (or vibration) of the bobbin 337*b*.

The damper 337*e* can be connected between the base frame 337*a* and the bobbin 337*b*. For example, the damper 337*e* can be a spider, a suspension, or an edge, or the like, but embodiments of the present disclosure are not limited thereto.

According to an embodiment of the present disclosure, one end (or one side) of the damper 337*e* can be connected to the base frame 337*a*, and the other end (or the other side) of the damper 337*e* can be connected to an outer surface of the bobbin 337*b*. The damper 337*e* can have a creased structure between the one end (or one side) and the other end (or the other side) thereof and can be contracted and relaxed based on a vertical motion (or a vertical movement) of the bobbin 337*b* to control a vibration of the bobbin 337*b*. The damper 337*e* can limit a vibration distance of the bobbin 337*b* with a restoring force. For example, when the bobbin

337*b* vibrates by a certain distance or more or vibrates by a certain distance or less, the bobbin 337*b* can be returned (or restored) to its original position by the restoring force of the damper 337*e*.

The vibration apparatus 337 according to an embodiment of the present disclosure can further include a center pole 337*f* and an edge frame 337*g*.

The center pole 337*f* can be accommodated or inserted into the bobbin 337*b* and can be configured to guide raising or lowering of the bobbin 337*b*. For example, since the center pole 337*f* can be accommodated or inserted into the bobbin 337*b*, an outer circumference surface of the center pole 337*f* can be surrounded by the bobbin 337*b*. For example, the center pole 337*f* can be an elevation guider or pole pieces, or the like, but embodiments of the present disclosure are not limited thereto.

The edge frame 337*g* can be disposed at a front edge (or a front periphery) of the base frame 337*a*. The edge frame 337*g* can be configured to support the one end of the damper 337*e*. For example, the damper 337*e* can be connected between the edge frame 337*g* and the bobbin 337*b*. The edge frame 337*g* according to an embodiment of the present disclosure can be provided at the front edge of the base frame 337*a* to have a certain height and the same shape as that of the bobbin 337*b*. The edge frame 337*g* according to another embodiment of the present disclosure can be provided at the front edge of the base frame 337*a* to have a certain height and can include a hollow part that is a same shape as that of the bobbin 337*b*.

According to an embodiment of the present disclosure, in the vibration apparatus 337, at least a portion of the base frame 337*a* can be fixed (or supported) or connected (or coupled) to the second enclosure 312 of the enclosure 310 (or the second plate 312*a* of the second enclosure 312) by the fixing member 336. As an embodiment of the present disclosure, the fixing member 336 can include an adhesive member which is disposed (or interposed) between at least a portion of the base frame 337*a* and the second enclosure 312 of the enclosure 310 (or the second plate 312*a* of the second enclosure 312). As another embodiment of the present disclosure, the fixing member 336 can include a plurality of screws which pass through at least a portion of the base frame 337*a* and are fastened to the second enclosure 312 of the enclosure 310 (or the second plate 312*a* of the second enclosure 312).

The vibration apparatus 337 according to an embodiment of the present disclosure can further include an extension portion 337*i*.

The extension portion 337*i* can extend (or protrude) from a lateral surface of the base frame 337*a*. The extension portion 337*i* can be fixed (or supported) or connected (or coupled) to the second enclosure 312 of the enclosure 310 or the second plate 312*a* of the second enclosure 312 by the fixing member 336.

According to an embodiment of the present disclosure, when the fixing member 336 is an adhesive member (or a second adhesive member), the adhesive member can be disposed or connected between the extension portion 337*i* of the vibration apparatus 337 and the second enclosure 312 (or the second plate 312*a* of the second enclosure 312). Accordingly, the vibration apparatus 337 can be fixed (or supported) or connected (or coupled) to the second enclosure 312 or the second plate 312*a* of the second enclosure 312 by the adhesive member.

According to another embodiment of the present disclosure, when the fixing member 336 is a plurality of screws (or a plurality of bolts), the plurality of screws can pass through the extension portion 337*i* of the vibration apparatus 337 and can be fastened to the second enclosure 312 (or the second plate 312*a* of the second enclosure 312). Accordingly, the vibration apparatus 337 can be fixed (or supported) or connected (or coupled) to the second enclosure 312 or the second plate 312*a* of the second enclosure 312 by the plurality of screws.

According to another embodiment of the present disclosure, since the vibration apparatus 337 is disposed (or interposed) between the vibration member 331 and the second enclosure 312 (or the second plate 312*a* of the second enclosure 312), the vibration apparatus 337 should have a relatively thin thickness so as to thinly reduce a thickness of the sound apparatus 30 or slim the sound apparatus 30, and due to this, when a height (or a thickness) of the bobbin 337*b* is reduced, a sound pressure level can be lowered. Therefore, so as to solve a problem where a sound pressure level is lowered due to a reduction in height of the bobbin 337*b*, the inventors of the present disclosure have designed a structure where an area of the damper 337*e* disposed around the bobbin 337*b* is wide. When an area of the damper 337*e* is enlarged, the inventors of the present disclosure have recognized that a space where a line for applying a current to the coil 337*c* is disposed is narrowed, causing interference between the line and the damper 337*e*. Therefore, through various experiments, the inventors of the present disclosure have configured the damper 337*e* which is formed of a conductor and performs a function of the line.

The damper 337*e* according to another embodiment of the present disclosure can include a metal material electrically connected to the coil 337*c*. For example, the damper 337*e* can be configured in a metal material such as stainless steel or copper (Cu), or the like, but embodiments of the present disclosure are not limited thereto.

The sound apparatus 30 or the vibration apparatus 337 according to an embodiment of the present disclosure can further include a protection member 337*h*.

The protection member 337*h* can be configured to protect the bobbin 337*b* from an impact or prevent the deformation of the bobbin 337*b* caused by an impact. The protection member 337*h* can be configured to protect the bobbin 337*b* and transfer a vibration of the bobbin 337*b* to the vibration member 331. The protection member 337*h* can vibrate together with the bobbin 337*b*. The protection member 337*h* can be disposed (or interposed) between the vibration member 331 and the bobbin 337*b*. The protection member 337*h* can be configured on the front surface (or the front end portion) of the bobbin 337*b* to protect the front surface (or the front end portion) of the bobbin 337*b*. The protection member 337*h* can transmit raising or lowering (or vibration) of the bobbin 337*b* to the vibration member 331. The protection member 337*h* according to an embodiment of the present disclosure can have a ring shape connected to (at attached at) the front surface of the bobbin 337*b*, a circular plate shape covering an entire front surface of the bobbin 337*b*, or a cap shape surrounding the front surface and an upper outer surface of the bobbin 337*b*. For example, the protection member 337*h* can be a bobbin protection member, an intermediate member, or a bobbin ring, but embodiments of the present disclosure are not limited thereto.

The protection member 337*h* can be connected (or coupled) to the vibration member 331 by the adhesive member 338. For example, the protection member 337*h* can be attached to the second surface 331*s*2 of the vibration member 331 by the adhesive member 338. For example, when the sound apparatus 30 includes the heat dissipation plate 339 attached to the second surface 331*s*2 of the vibration member 331, the protection member 337*h* can be connected to the heat dissipation plate 339 by the adhesive member 338.

According to an embodiment of the present disclosure, a vibration width (or a displacement width or a driving width) of the vibration apparatus 337 based on a coil type can be relatively greater than a vibration width (or a displacement width or a driving width) of a vibration apparatus based on a piezoelectric type, and thus, the vibration apparatus 337 based on the coil type can enhance a sound characteristic and/or a sound pressure level characteristic of a pitched sound band including a low-pitched sound band generated based on a vibration of the vibration member 331.

Accordingly, the sound apparatus 30 according to another embodiment of the present disclosure can vibrate the vibration member 331 to output a sound, based on a vibration of the vibration apparatus 337 of the coil type where a sound characteristic and/or a sound pressure level characteristic of a low-pitched sound band are/is relatively better than a piezoelectric-type vibration apparatus, thereby enhancing a sound characteristic and/or a sound pressure level characteristic of a pitched sound band including a low-pitched sound band.

According to another embodiment of the present disclosure, the vibration apparatus 333 and 335 of a piezoelectric type described above with reference to FIGS. 9 to 16 can be changed to (or replaced with) the vibration apparatus 337 of the coil type described above with reference to FIGS. 34 to 36, and thus, in the sound apparatus 30 described above with reference to FIGS. 9 to 16, a sound characteristic and/or a sound pressure level characteristic of each of a low-pitched sound band and a middle-pitched sound band can be more enhanced, a sound reproduction band can more expand.

According to another embodiment of the present disclosure, in the sound apparatus where the connecting member 380 described above with reference to FIGS. 12 to 21 is changed to (or replaced with) the connecting member 380 that includes the first connecting member 381 and the second connecting member 382 described with reference to FIGS. 24 to 27, the vibration apparatus 333 and 335 of a piezoelectric type can be changed to (or replaced with) the vibration apparatus 337 of the coil type described above with reference to FIGS. 34 to 36. In this case, a sound characteristic and/or a sound pressure level characteristic of each of a low-pitched sound band and a middle-pitched sound band can be more enhanced, a sound reproduction band can more expand.

Figure 37:
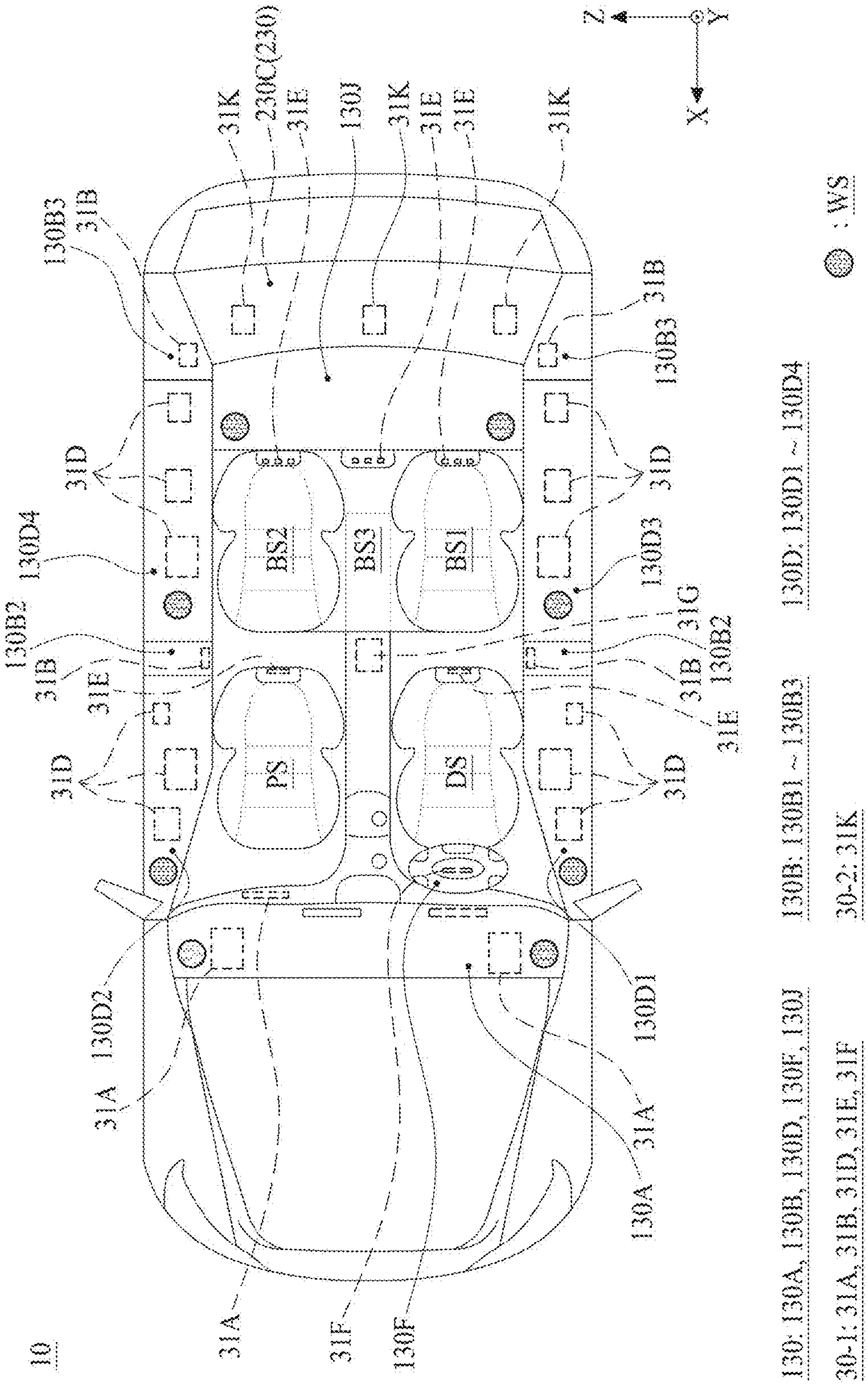
FIG. 37 illustrates a vehicular apparatus according to an embodiment of the present disclosure.
Figure 38:
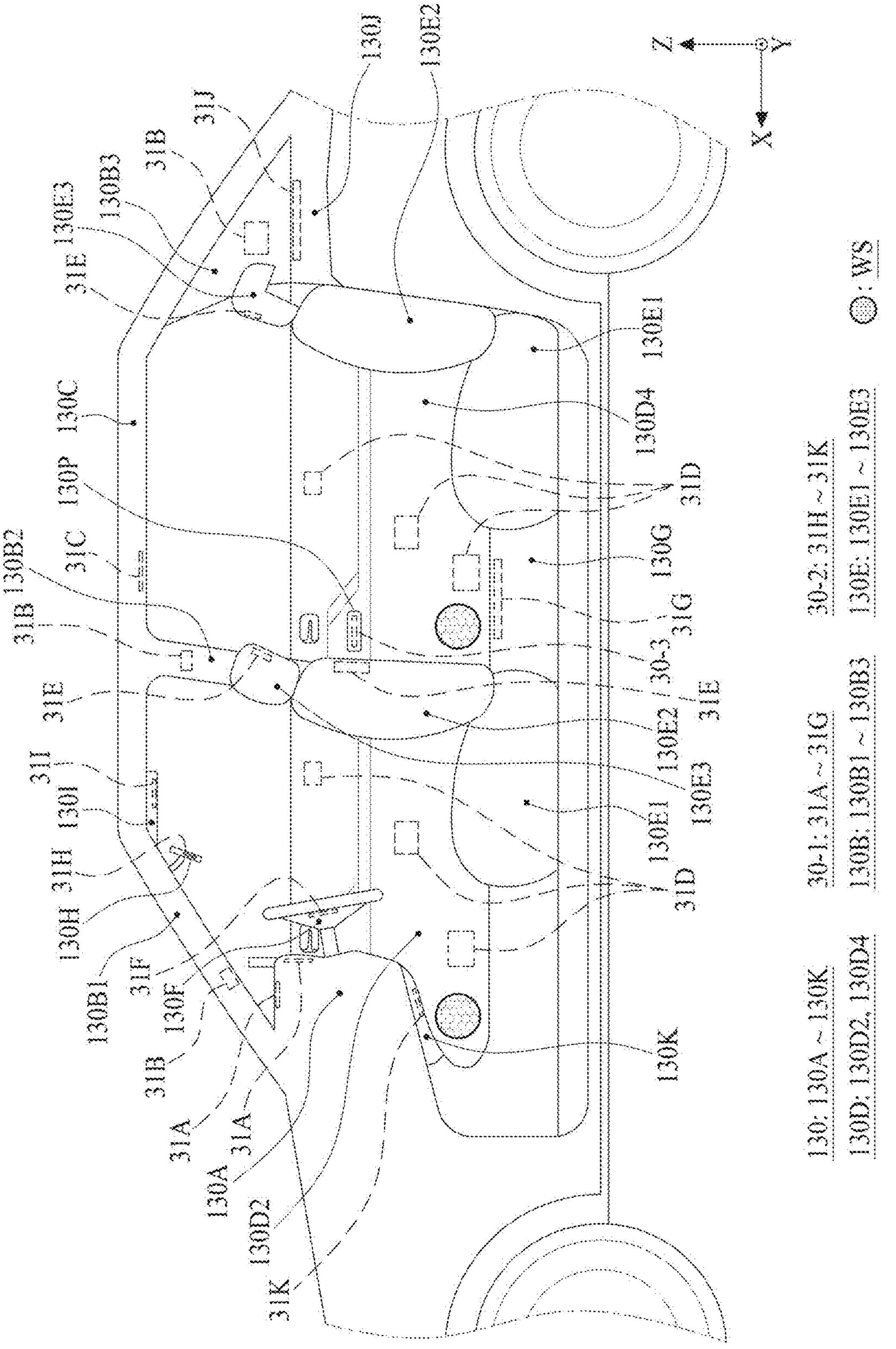
FIG. 38 illustrates a vehicular apparatus according to an embodiment of the present disclosure.
Figure 39:
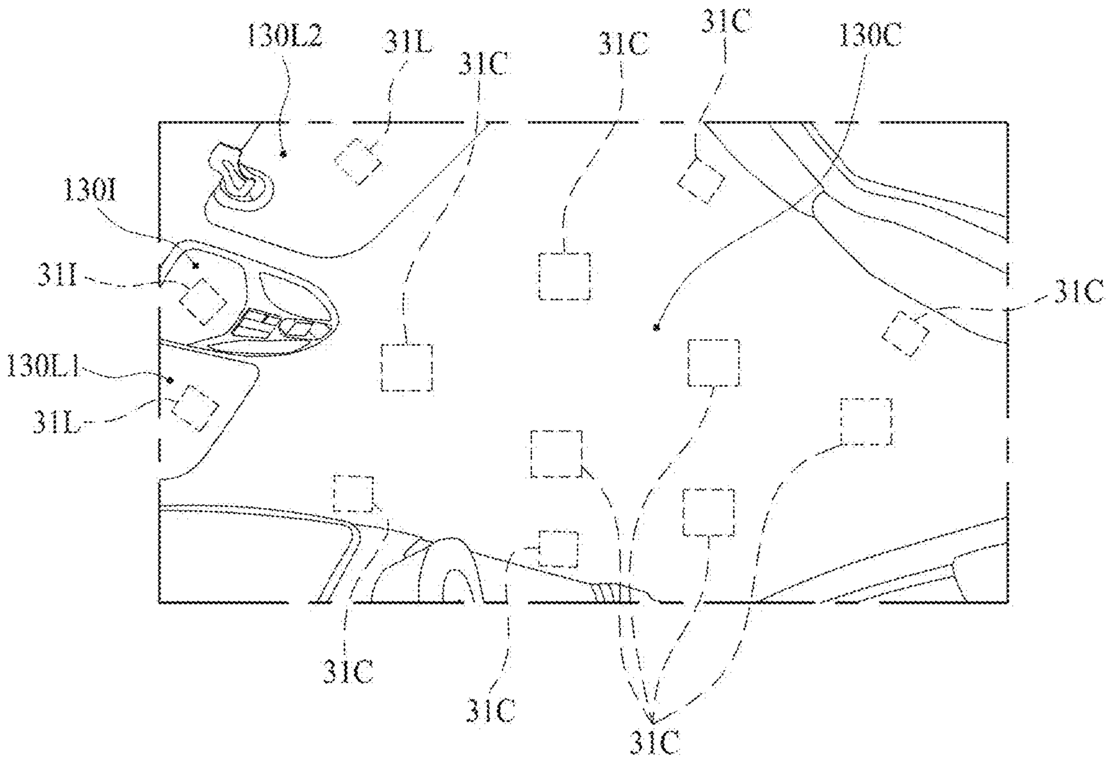
FIG. 39 illustrates a sound generating apparatus disposed at a roof of a vehicular apparatus illustrated in FIGS. 37 and 38.
Figure 40:
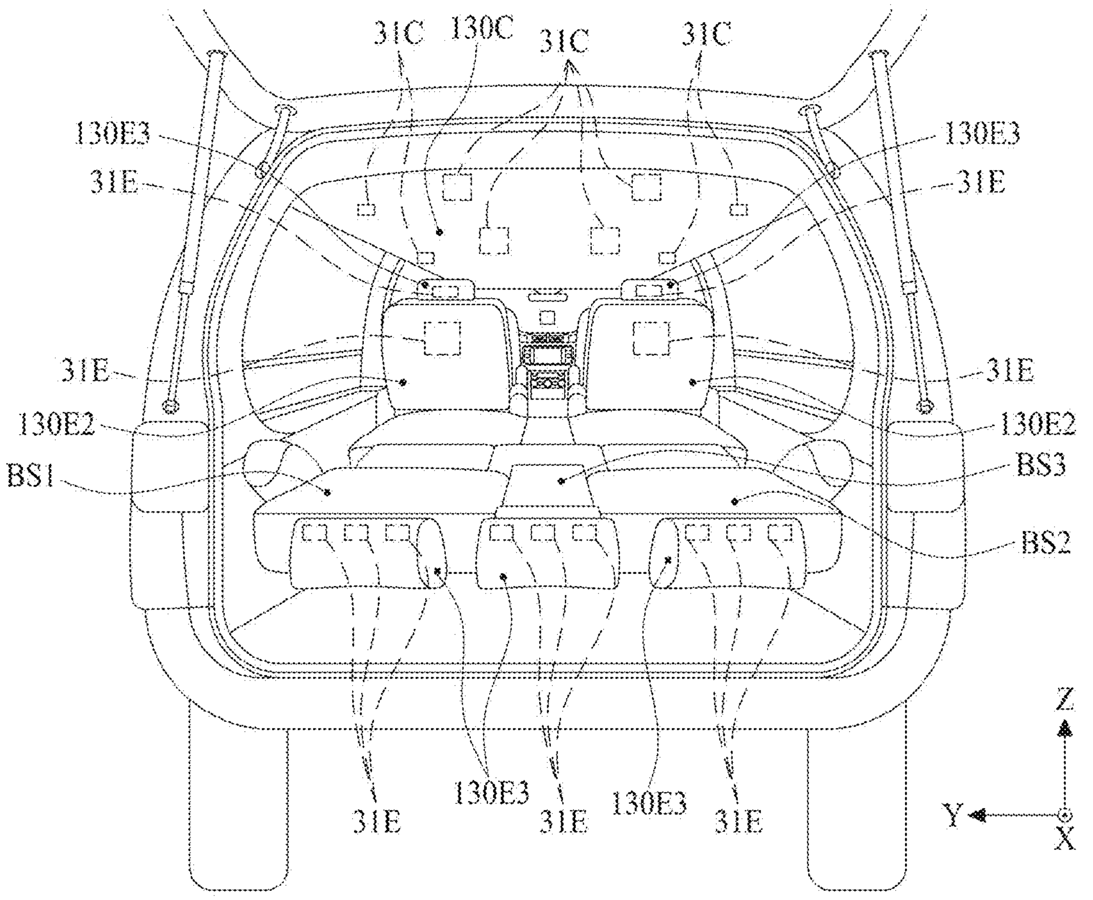
FIG. 40 illustrates a sound generating apparatus disposed at a roof and a seat of a vehicular apparatus illustrated in FIGS. 37 and 38.

FIG. 37 illustrates a vehicular apparatus according to an embodiment of the present disclosure. FIG. 38 illustrates a vehicular apparatus according to an embodiment of the present disclosure. FIG. 39 illustrates a sound generating apparatus disposed at a roof of a vehicular apparatus illustrated in FIGS. 37 and 38. FIG. 40 illustrates a sound generating apparatus disposed at a roof and a seat of a vehicular apparatus illustrated in FIGS. 37 and 38. Descriptions of FIGS. 37 to 40 can be described with reference to FIGS. 1 and 2.

With reference to FIGS. 37 to 40, a vehicular apparatus 10 according to an embodiment of the present disclosure can include a vehicle interior material 130 and one or more sound generating apparatuses 30-1 and 30-2.

According to an embodiment of the present disclosure, a vehicle interior material 130 can include at least one or more of a dashboard, a pillar interior material (or a pillar trim), a floor interior material (or a floor carpet), a roof interior material (or a headliner), a door interior material (or a door trim), a handle interior material (or a steering cover), a seat interior material, a rear package interior material (or a back seat shelf), an overhead console (or an indoor illumination interior material), a rear view mirror, a glove box, and a sun visor, or the like, but embodiments of the present disclosure are not limited thereto. The one or more sound generating apparatuses 30-1 and 30-2 can vibrate at least one or more of the dashboard, the pillar interior material (or the pillar trim), the floor interior material (or the floor carpet), the roof interior material (or the headliner), the door interior material (or the door trim), the handle interior material (or the steering cover), the seat interior material, the rear package interior material (or the back seat shelf), the overhead console (or the indoor illumination interior material), the rear view mirror, the glove box, and the sun visor.

With reference to FIGS. 1, 2, 37, and 38, the one or more sound generating apparatuses 30-1 and 30-2 can be configured at a region between the vehicle interior material 130 and the main structure 110, or a region between the vehicle interior material 130 and the exterior material 120. The one or more sound generating apparatuses 30-1 and 30-2 can be disposed at a region between the vehicle interior material 130 and the main structure 110, or a region between the vehicle interior material 130 and the exterior material 120, and can indirectly or directly vibrate one or more of the region between the vehicle interior material 130 and the main structure 110 and the region between the vehicle interior material 130 and the exterior material 120 to output sound.

According to an embodiment of the present disclosure, the protection member 410 (see FIGS. 20 and 21) at the one or more sound generating apparatuses 30-1 and 30-2 can be disposed closer to at least one of the main structure 110 and the exterior material 120 than the vehicle interior material 130. For example, the protection member 410 at the one or more sound generating apparatuses 30-1 and 30-2 can be spaced apart from each of the main structure 110 or the exterior material 120. For example, a space between the protection member 410 at the one or more sound generating apparatuses 30-1 and 30-2 and the main structure 110 can be further included. For example, a space between the protective member 410 at the one or more sound generating apparatuses 30-1 and 30-2 and the exterior material 120 can be further included. For example, a space between the protection member 410 at the one or more sound generating apparatuses 30-1 and 30-2 and the main structure 110 and/or a space between the protection member 410 at the one or more sound generating apparatuses 30-1 and 30-2 and the exterior material 120 can be further included.

The vehicular apparatus 10 according to an embodiment of the present disclosure can include the first sound generating apparatus 30-1 which is configured to output a sound at the main structure 110, the exterior material 120, and a region between the main structure 110 and the vehicle interior material 130. For example, the first sound generating apparatus 30-1 can be disposed at at least one or more of between the main structure 110 and the exterior material 120 of the vehicular apparatus 10, between the main structure 110 and the vehicle interior material 130, the exterior material 120, the vehicle interior material 130, and between the exterior material 120 and the vehicle interior material 130 to output a sound. For example, the vehicle interior material 130 can output a sound based on a vibration of the one or more first sound generating apparatuses 30-1. For example, the vehicle interior material 130 can be exposed at an interior space IS.

The first sound generating apparatus 30-1 can include one or more sound generating modules 31A to 31G which are disposed at at least one or more of the dashboard 130A, the pillar interior material 130B, the roof interior material 130C, the door interior material 130D, the seat interior material 130E, the handle interior material 130F, and the floor interior material 130G. For example, the first sound generating apparatus 30-1 can include at least one or more of the first to seventh sound generating modules 31A to 31G (or sound apparatus, or sound output apparatus, or sound generating unit), and thus, can output sounds of one or more channels.

With reference to FIGS. 37 to 40, the first sound generating module 31A according to an embodiment of the present disclosure can be disposed between the dashboard 130A and a dash panel and can vibrate the dashboard 130A to output a sound based on a vibration of the dashboard 130A. For example, the first sound generating module 31A can be configured to directly vibrate the dashboard 130A to output a sound based on a vibration of the dashboard 130A. For example, the first sound generating module 31A can include the sound apparatus 30 described above with reference to FIGS. 3 to 36, and thus, the repetitive descriptions can be omitted. For example, the first sound generating module 31A can be a dashboard speaker.

According to an embodiment of the present disclosure, at least one or more of the dash panel and the dashboard 130A can include a first region corresponding to a driver seat DS, a second region corresponding to a passenger seat PS, and a third region (or a middle region) between the first region and the second region. At least one or more of the dash panel and the dashboard 130A can include a fourth region which is inclined to face the passenger seat PS.

According to an embodiment of the present disclosure, the first sound generating module 31A can be disposed to vibrate at least one or more of the first to fourth regions of the dashboard 130A. For example, the first sound generating module 31A can be disposed at each of the first and second regions of the dashboard 130A, or can be disposed at each of the first to fourth regions of the dashboard 130A. For example, the first sound generating module 31A can be disposed at each of the first and second regions of the dashboard 130A, or can be disposed at at least one or more of the first to fourth regions of the dashboard 130A. For example, the first sound generating module 31A can be configured to output a sound of about 150 Hz to about 20 kHz. For example, the first sound generating module 31A configured to vibrate at least one or more of the first to fourth regions of the dashboard 130A can have a same sound output characteristic or different sound output characteristics. For example, the first sound generating module 31A configured to vibrate each of the first to fourth regions of the dashboard 130A can have a same sound output characteristic or different sound output characteristics.

The second sound generating module 31B according to an embodiment of the present disclosure can be disposed between the pillar interior material 130B and a pillar panel and can vibrate the pillar interior material 130B to output a sound based on a vibration of the pillar interior material 130B. For example, the second sound generating module 31B can directly vibrate the pillar interior material 130B to output a sound based on a vibration of the pillar interior material 130B. For example, the second sound generating module 31B can include the sound apparatus 30 described above with reference to FIGS. 3 to 36, and thus, repeated descriptions are omitted. For example, the second sound generating module 31B can be a pillar speaker or a tweeter speaker.

According to an embodiment of the present disclosure, the pillar panel can include a first pillar (or an A pillar) disposed at both sides of a front window, a second pillar (or a B pillar) disposed at both sides of a center of a vehicle body, and a third pillar (or a C pillar) disposed at both sides of a rear portion of the vehicle body. The pillar interior material 130B can include a first pillar interior material 130B1 covering the first pillar, a second pillar interior material 130B2 covering the second pillar, and a third pillar interior material 130B3 covering the third pillar.

According to an embodiment of the present disclosure, the second sound generating module 31B can be disposed at at least one or more of a region between the first pillar and the first pillar interior material 130B1, a region between the second pillar and the second pillar interior material 130B2, and a region between the third pillar and the third pillar interior material 130B3, and thus, can vibrate at least one or more of the first to third pillar interior materials 130B1, 130B2, and 130B3. For example, the second sound generating module 31B can be configured to output a sound at about 2 kHz to about 20 kHz, but embodiments of the present disclosure are not limited thereto. For example, the second sound generating module 31B can be configured to output a sound at about 150 Hz to about 20 kHz. For example, the second sound generating module 31B configured to vibrate at least one or more of the first to third pillar interior materials 130B1, 130B2, and 130B3 can have a same sound output characteristic or different sound output characteristics.

With reference to FIGS. 38 to 40, the third sound generating module 31C according to an embodiment of the present disclosure can be disposed between the roof interior material 130C and a roof frame (or a roof panel) and can vibrate the roof interior material 130C to output a sound based on a vibration of the roof interior material 130C. For example, the third sound generating module 31C can directly vibrate the roof interior material 130C to output a sound based on a vibration of the roof interior material 130C. For example, the third sound generating module 31C can include the sound apparatus 30 described above with reference to FIGS. 3 to 36, and thus, repeated descriptions are omitted. For example, the third sound generating module 31C can be a roof speaker.

With reference to FIG. 39, at least one or more the third sound generating modules 31C can be disposed at the roof interior material 130C. For example, at least six or more third sound generating modules 31C can be disposed at the roof interior material 130C, but embodiments of the present disclosure are not limited thereto.

According to an embodiment of the present disclosure, at least one or more of the roof frame and the roof interior material 130C covering the roof frame can include the first region corresponding to the driver seat DS, the second region corresponding to the passenger seat PS, a third region corresponding to a region between the driver seat DS and the passenger seat PS, a fourth region corresponding to a first rear seat BS1 behind the driver seat DS, a fifth region corresponding to a second rear seat BS2 behind the passenger seat PS, a sixth region corresponding to a region between the first rear seat BS1 and the second rear seat BS2, and a seventh region between the third region and the sixth region.

According to an embodiment of the present disclosure, the third sound generating module 31C can be disposed to vibrate at least one or more among the first to seventh regions of the roof interior material 130C. For example, the third sound generating module 31C can be configured to output a sound of about 150 Hz to about 20 kHz. For example, the third sound generating module 31C configured to vibrate at least one or more of the first to seventh regions of the roof interior material 130C can have a same sound output characteristic or different sound output characteristics. For example, the third sound generating module 31C configured to vibrate each of the first to seventh regions of the roof interior material 130C can have a same sound output characteristic or different sound output characteristics. For example, at least one or more third sound generating modules 31C configured to vibrate at least one or more of the first to seventh regions of the roof interior material 130C can be configured to output a sound of about 2 kHz to about 20 kHz, and the other third sound generating modules 31C can be configured to output a sound of about 150 Hz to about 20 kHz. For example, at least one or more third sound generating modules 31C configured to vibrate each of the first to seventh regions of the roof interior material 130C can be configured to output a sound of about 2 kHz to about 20 kHz, and the other third sound generating modules 31C can be configured to output a sound of about 150 Hz to about 20 kHz.

With reference to FIGS. 38 and 39, the fourth sound generating module 31D according to an embodiment of the present disclosure can be disposed between the door frame and the door interior material 130D and can vibrate the door interior material 130D to output a sound based on a vibration of the door interior material 130D. For example, the fourth sound generating module 31D can directly vibrate the door interior material 130D to output a sound based on a vibration of the door interior material 130D. According to an embodiment of the present disclosure, the fourth sound generating module 31D can include the sound apparatus 30 described above with reference to FIGS. 3 to 36, and thus, repeated descriptions are omitted. For example, the fourth sound generating module 31D can be a door speaker.

According to an embodiment of the present disclosure, at least one or more of the door frame and the door interior material 130D can include an upper region, a middle region, and a lower region with respect to a height direction Z of the vehicular apparatus 10. For example, the fourth sound generating module 31D can be disposed at at least one or more of the upper region, the middle region, and the lower region between the door frame and the door interior material 130D, and thus, can vibrate at least one or more of the upper region, the middle region, and the lower region of the door interior material 130D.

According to an embodiment of the present disclosure, the upper region of the door interior material 130D can have a relatively small curvature radius. The fourth sound generating module 31D for vibrating the upper region of the door interior material 130D can include the sound apparatus 30 having a flexible characteristic described above with reference to FIGS. 28 to 32. Furthermore, the fourth sound generating module 31D for vibrating the upper region of the door interior material 130D can include the sound apparatus 30 having the soft member 360 described above with reference to FIG. 12 or the sound apparatus 30 having the connection member 380 described above with reference to FIGS. 14 to 36.

According to an embodiment of the present disclosure, the door frame can include a first door frame (or a left front door frame), a second door frame (or a right front door frame), a third door frame (or a left rear door frame), and a fourth door frame (or a right rear door frame). According to an embodiment of the present disclosure, the door interior material 130D can include a first door interior material (or a left front door interior material) 130D1 covering the first door frame, a second door interior material (or a right front door interior material) 130D2 covering the second door frame, a third door interior material (or a left rear door interior material) 130D3 covering the third door frame, and a fourth door interior material (or a right rear door interior material) 130D4 covering the fourth door frame. For example, the fourth sound generating module 31D can be disposed at at least one or more of an upper region, a middle region, and a lower region between each of the first to fourth door frames and the first to fourth door interior materials 130D1, 130D2, 130D3, and 130D4 and can vibrate at least one or more of the upper region, the middle region, and the lower region of each of the first to fourth door interior materials 130D1, 130D2, 130D3, and 130D4.

According to an embodiment of the present disclosure, the fourth sound generating module 31D configured to vibrate the upper region of each of the first to fourth door interior materials 130D1, 130D2, 130D3, and 130D4 can be configured to output a sound of about 2 kHz to about 20 kHz, or can be configured to output a sound of about 150 Hz to about 20 kHz. For example, the fourth sound generating module 31D configured to vibrate the upper regions of at least one or more of the first to fourth door interior materials 130D1, 130D2, 130D3, and 130D4 can be configured to output a sound of about 2 kHz to about 20 kHz, or can be configured to output a sound of about 150 Hz to about 20 kHz.

According to an embodiment of the present disclosure, the fourth sound generating module 31D configured to vibrate the middle regions and the lower regions of at least one or more of the first to fourth door interior materials 130D1, 130D2, 130D3, and 130D4 can be configured to output a sound of about 150 Hz to about 20 kHz. The fourth sound generating module 31D configured to vibrate the middle region and the lower region of each of the first to fourth door interior materials 130D1, 130D2, 130D3, and 130D4 can be configured to output a sound of about 150 Hz to about 20 kHz. For example, the fourth sound generating module 31D configured to vibrate the middle regions and the lower regions of at least one or more of the first to fourth door interior materials 130D1, 130D2, 130D3, and 130D4 can be one or more of a woofer, a mid-woofer, and a sub-woofer. For example, the fourth sound generating module 31D configured to vibrate the middle region and the lower region of each of the first to fourth door interior materials 130D1, 130D2, 130D3, and 130D4 can be one or more of a woofer, a mid-woofer, and a sub-woofer.

Sounds, which are respectively output from the fourth sound generating module 31D disposed at the first door interior material 130D1 and the fourth sound generating module 31D disposed at the second door interior material 130D2, can be combined and output. For example, sounds, which are respectively output from at least one or more of the fourth sound generating modules 31D disposed at the first door interior material 130D1 and the fourth sound generating module 31D disposed at the second door interior material 130D2, can be combined and output. In addition, sounds, which are respectively output from the fourth sound generating module 31D disposed at the third door interior material 130D3 and the fourth sound generating module 31D disposed at the fourth door interior material 130D4 can be combined and output.

According to an embodiment of the present disclosure, the upper region of each of the first to fourth door interior materials 130D1, 130D2, 130D3, and 130D4 can include a first upper region adjacent to the dashboard 130A, a second upper region adjacent to the rear seats BS1, BS2, and BS3, and a third upper region between the first upper region and the second upper region. For example, the fourth sound generating module 31D can be disposed at one or more of the first to third upper regions of each of the first to fourth door interior materials 130D1, 130D2, 130D3, and 130D4. For example, the fourth sound generating module 31D can be disposed at the first upper region of each of the first and second door interior materials 130D1 and 130D2 and can be disposed at one or more of the second and third upper regions of each of the first and second door interior materials 130D1 and 130D2. For example, the fourth sound generating module 31D can be disposed at one or more among the first to third upper regions of one or more of the first to fourth door interior materials 130D1 to 130D4. For example, the fourth sound generating module 31D configured to vibrate the first upper regions of one or more of the first and second door interior materials 130D1 and 130D2 can be configured to output a sound of about 2 kHz to about 20 kHz, and the fourth sound generating module 31D configured to vibrate one or more among the second and third upper regions of each of the first and second door interior materials 130D1 and 130D2 can be configured to output a sound of about 2 kHz to about 20 kHz, or can be configured to output a sound of about 150 Hz to about 20 kHz. For example, the fourth sound generating module 31D configured to vibrate one or more among the second and third upper regions of at least one or more of the first and second door interior materials 130D1 and 130D2 can be configured to output a sound of about 2 kHz to about 20 kHz, or can be configured to output a sound of about 150 Hz to about 20 kHz.

With reference to FIGS. 37, 38, and 40, the fifth sound generating module 31E according to an embodiment of the present disclosure can be disposed between a seat frame and the seat interior material 130E and can vibrate the seat interior material 130E to output a sound based on a vibration of the seat interior material 130E. For example, the fifth sound generating module 31E can directly vibrate the seat interior material 130E to output a sound based on a vibration of the seat interior material 130E. According to an embodiment of the present disclosure, the fifth sound generating module 31E can include the sound apparatus 30 described above with reference to FIGS. 3 to 36, and thus, repeated descriptions are omitted. For example, the fifth sound generating module 31E can be a sheet speaker or a headrest speaker.

According to an embodiment of the present disclosure, the seat frame can include a first seat frame (or a driver seat frame), a second seat frame (or a passenger seat frame), a third seat frame (or a first rear seat frame), a fourth seat frame (or a second rear seat frame), and a fifth seat frame (or a third rear seat frame). According to an embodiment of the present disclosure, the seat interior material 130E can include the first seat interior material surrounding the first seat frame, the second seat interior material surrounding the second seat frame, the third seat interior material surrounding the third seat frame, the fourth seat interior material surrounding the fourth seat frame, and the fifth seat interior material surrounding the fifth seat frame.

According to an embodiment of the present disclosure, at least one or more of the first to fifth seat frames can include a seat bottom frame, a seat back frame, and a headrest frame. The seat interior material 130E can include a seat bottom interior material 130E1 surrounding the seat bottom frame, a seat back interior material 130E2 surrounding the seat back frame, and a headrest interior material 130E3 surrounding the headrest frame. At least one or more of the seat bottom interior material 130E1, the seat back interior material 130E2, and the headrest interior material 130E3 can include an inner interior material and an outer interior material. For example, the inner interior material can include a foam layer. For example, as described above with reference to FIG. 2, the outer interior material can include a surface member including a fiber or leather. For example, the outer interior material can further include a base member including a plastic material which supports the surface member.

According to an embodiment of the present disclosure, the fifth sound generating module 31E can be disposed at at least one or more of a region between the seat back frame and the seat back interior material 130E2 and a region between the headrest frame and the headrest interior material 130E3, and thus, can vibrate at least one or more of the outer interior material of the seat back interior material 130E2 and the outer interior material of the headrest interior material 130E3.

According to an embodiment of the present disclosure, the fifth sound generating module 31E disposed at at least one or more of the driver seat DS and the passenger seat PS can be disposed at at least one or more of the region between the seat back frame and the seat back interior material 130E2 and the region between the headrest frame and the headrest interior material 130E3.

According to an embodiment of the present disclosure, the fifth sound generating module 31E disposed at at least one or more of the first to third rear seats BS1, BS2, and BS3 can be disposed between the headrest frame and the headrest interior material 130E3. For example, at least one or more of the first to third rear seats BS1, BS2, and BS3 can include one or more fifth sound generating modules 31E disposed between the headrest frame and the headrest interior material 130E3.

According to an embodiment of the present disclosure, the fifth sound generating module 31E vibrating the seat back interior materials 130E2 of at least one or more of the driver seat DS and the passenger seat PS can be configured to output a sound of about 150 Hz to about 20 kHz.

According to an embodiment of the present disclosure, the fifth sound generating module 31E vibrating the headrest interior materials 130E3 of at least one or more of the driver seat DS, the passenger seat PS, and the first to third rear seats BS1, BS2, and BS3 can be configured to output a sound of about 2 kHz to about 20 kHz, or can be configured to output a sound of about 150 Hz to about 20 kHz.

With reference to FIGS. 37 and 39, the sixth sound generating module 31F according to an embodiment of the present disclosure can be disposed between a handle frame and the handle interior material 130F and can vibrate the handle interior material 130F to output a sound based on a vibration of the handle interior material 130F. For example, the sixth sound generating module 31F can directly vibrate the handle interior material 130F to output a sound based on a vibration of the handle interior material 130F. According to an embodiment of the present disclosure, the sixth sound generating module 31F can include the sound apparatus 30 described above with reference to FIGS. 3 to 36, and thus, repeated descriptions are omitted. For example, the sixth sound generating module 31F can be a handle speaker or a steering speaker.

According to an embodiment of the present disclosure, the sixth sound generating module 31F can vibrate the handle interior material 130F to provide a driver with a sound based on a vibration of the handle interior material 130F. For example, the sixth sound generating module 31F can directly vibrate the handle interior material 130F to provide the driver with the sound based on the vibration of the handle interior material 130F. A sound output by the sixth sound generating module 31F can be a sound which is a same as or different from a sound output from each of the first to fifth sound generating modules 31A to 31E. For example, a sound output by the sixth sound generating module 31F can be a sound which is the same as or different from sounds output from at least one or more of the first to fifth sound generating modules 31A to 31E. As an embodiment of the present disclosure, the sixth sound generating module 31F can output a sound which is to be provided to only the driver. As another embodiment of the present disclosure, the sound output by the sixth sound generating module 31F and a sound output by each of the first to fifth sound generating modules 31A to 31E can be combined and output. For example, the sound output by the sixth sound generating module 31F and the sound output by at least one or more of the first to fifth sound generating modules 31A to 31E can be combined and output.

With reference to FIGS. 37 and 39, the seventh sound generating module 31G can be disposed between the floor panel and the floor interior material 130G and can vibrate the floor interior material 130G to output a sound based on a vibration of the floor interior material 130G. For example, the seventh sound generating module 31G can directly vibrate the floor interior material 130G to output the sound based on the vibration of the floor interior material 130G.

The seventh sound generating module 31G can be disposed between the floor panel and the floor interior material 130G disposed between the front seats DS and PS and the third rear seat BS3. For example, the seventh sound generating module 31G can include the sound apparatus 30 described above with reference to FIGS. 3 to 36, and thus, repeated descriptions are omitted. For example, the seventh sound generating module 31G can be configured to output a sound of about 150 Hz to about 20 kHz. For example, the seventh sound generating module 31G can be a floor speaker, a bottom speaker, or an under speaker.

With reference to FIGS. 37 to 39, the vehicular apparatus or the vehicle 10 according to an embodiment of the present disclosure can further include a second sound generating apparatus 30-2 which is disposed at the vehicle interior material 130 exposed at an interior space. For example, the vehicular apparatus or the vehicle 10 according to an embodiment of the present disclosure can include only the second sound generating apparatus 30-2 instead of the first sound generating apparatus 30-1, or can include all of the first sound generating apparatus 30-1 and the second sound generating apparatus 30-2.

According to an embodiment of the present disclosure, the vehicle interior material 130 can further include a rear view mirror 130H, an overhead console 130I, a rear package interior material 130J, a glove box 130K, and a sun visor 130L, or the like.

The second sound generating apparatus 30-2 can include one or more sound generating modules 31H to 31L which are disposed at at least one of the rear view mirror 130H, the overhead console 130I, the rear package interior material 130J, the glove box 130K, and the sun visor 130L. For example, the second sound generating apparatus 30-2 can include at least one or more of eighth to twelfth sound generating modules 31H to 31L, and thus, can output sounds of one or more channels.

With reference to FIGS. 37 to 39, the eighth sound generating module 31H can be disposed at the rear view mirror 130H and can vibrate the rear view mirror 130H to output a sound based on a vibration of the rear view mirror 130H. For example, the eighth sound generating module 31H can be configured to directly vibrate the rear view mirror 130H to output the sound based on the vibration of the rear view mirror 130H.

The eighth sound generating module 31H can be disposed between a mirror housing connected to a vehicle body structure and the rear view mirror 130H supported by the mirror housing. According to an embodiment of the present disclosure, the eighth sound generating module 31H can include the sound apparatus 30 described above with reference to FIGS. 3 to 36, and thus, repeated descriptions are omitted. For example, the eighth sound generating module 31H can be configured to output a sound of about 150 Hz to about 20 kHz. For example, the eighth sound generating module 31H can be a mirror speaker.

With reference to FIGS. 39 and 40, the ninth sound generating module 31I can be disposed at the overhead console 130I and can vibrate a console cover of the overhead console 130I to output a sound based on a vibration of an interior material of the overhead console 130I. For example, the ninth sound generating module 31I can be configured to directly vibrate the console cover of the overhead console 130I to output the sound based on the vibration of the interior material of the overhead console 130I.

According to an embodiment of the present disclosure, the overhead console 130I can include a console box embedded into the roof panel, a lighting device disposed at the console box, and the console cover covering the lighting device and the console box.

The ninth sound generating module 31I can be disposed between the console cover and the console box of the overhead console 130I and can vibrate the console cover. For example, the ninth sound generating module 31I can be disposed between the console cover and the console box of the overhead console 130I and can directly vibrate the console cover. According to an embodiment of the present disclosure, the ninth sound generating module 31I can include the sound apparatus 30 described above with reference to FIGS. 3 to 36, and thus, repeated descriptions are omitted. For example, the ninth sound generating module 31I can be configured to output a sound of about 150 Hz to about 20 kHz. For example, the ninth sound generating module 31I can be a console speaker or a lighting speaker.

According to an embodiment of the present disclosure, the vehicular apparatus or the vehicle 10 can further include a center lighting box disposed at a center region of the roof interior material 130C, a center lighting device disposed at the center lighting box, and a center lighting cover covering the center lighting device. In this case, the ninth sound generating module 31I can be further disposed between a center lighting cover and a center lighting box of the center lighting device and can additionally vibrate the center lighting cover.

With reference to FIGS. 37 and 39, the tenth sound generating module 31J can be disposed at the rear package interior material 130J and can vibrate the rear package interior material 130J to output a sound based on a vibration of the rear package interior material 130J. For example, the ninth sound generating module 31I can be configured to directly vibrate the rear package interior material 130J to output the sound based on the vibration of the rear package interior material 130J.

The rear package interior material 130J can be disposed behind the first to third rear seats BS1, BS2, and BS3. For example, a portion of the rear package interior material 130J can be disposed under a rear window 230C.

The tenth sound generating module 31J can be disposed at a rear surface of the rear package interior material 130J and can vibrate the rear package interior material 130J. For example, the tenth sound generating module 31J can directly vibrate the rear package interior material 130J. According to an embodiment of the present disclosure, the tenth sound generating module 31J can include the sound apparatus 30 described above with reference to FIGS. 3 to 36, and thus, repeated descriptions are omitted. For example, the tenth sound generating module 31J can be a rear speaker.

According to an embodiment of the present disclosure, the rear package interior material 130J can include a first region corresponding to a rear portion of the first rear seat BS1, a second region corresponding to a rear portion of the second rear seat BS2, and a third region corresponding to a rear portion of the third passenger seat BS3. According to an embodiment of the present disclosure, the tenth sound generating module 31J can be disposed to vibrate at least one or more of the first to third regions of the rear package interior material 130J. For example, the tenth sound generating module 31J can be disposed at each of the first and second regions of the rear package interior material 130J, or can be disposed at each of the first to third regions of the rear package interior material 130J. For example, the tenth sound generating module 31J can be disposed at at least one or more of the first and second regions of the rear package interior material 130J, or can be disposed at at least one or more of the first to third regions of the rear package interior material 130J. For example, the tenth sound generating module 31J can be configured to output a sound of about 150 Hz to about 20 kHz. For example, the tenth sound generating module 31J configured to vibrate each of the first to third regions of the rear package interior material 130J can have a same sound output characteristic or different sound output characteristics. For example, the tenth sound generating module 31J configured to vibrate at least one or more of the first to third regions of the rear package interior material 130J can have a same sound output characteristic or different sound output characteristics.

With reference to FIGS. 37 and 39, the eleventh sound generating module 31K can be disposed at a glove box 130K and can vibrate the glove box 130K to output a sound based on a vibration of the glove box 130K. For example, the eleventh sound generating module 31K can directly vibrate the glove box 130K to output the sound based on the vibration of the glove box 130K.

The glove box 130K can be disposed at a dashboard 130A corresponding to a front portion of the passenger seat PS.

The eleventh sound generating module 31K can be disposed at an inner surface of the glove box 130K and can vibrate the glove box 130K. For example, the eleventh sound generating module 31K can directly vibrate the glove box 130K. According to an embodiment of the present disclosure, the eleventh sound generating module 31K can include the sound apparatus 30 described above with reference to FIGS. 3 to 36, and thus, repeated descriptions are omitted. For example, the eleventh sound generating module 31K can be configured to output a sound of about 150 Hz to about 20 kHz, or can be one or more of a woofer, a mid-woofer, and a sub-woofer. For example, the eleventh sound generating module 31K can be a glove box speaker.

With reference to FIG. 39, the twelfth sound generating module 31L can be disposed at the sun visor 130L and can vibrate the sun visor 130L to output a sound based on a vibration of the sun visor 130L. For example, the twelfth sound generating module 31L can directly vibrate the sun visor 130L to output the sound based on the vibration of the sun visor 130L.

The sun visor 130L can include a first sun visor 130L1 corresponding to the driver seat DS and a second sun visor 130L2 corresponding to the passenger seat PS.

The twelfth sound generating module 31L can be disposed at at least one or more of the first sun visor 130L1 and the second sun visor 130L2 and can vibrate at least one or more of the first sun visor 130L1 and the second sun visor 130L2. For example, the twelfth sound generating module 31L can directly vibrate at least one or more of the first sun visor 130L1 and the second sun visor 130L2. According to an embodiment of the present disclosure, the twelfth sound generating module 31L can include the sound apparatus 30 described above with reference to FIGS. 3 to 36, and thus, repeated descriptions are omitted. For example, the twelfth sound generating module 31L can be configured to output a sound of about 150 Hz to about 20 kHz. For example, the twelfth sound generating module 31L can be a sun visor speaker.

According to an embodiment of the present disclosure, at least one or more of the first sun visor 130L1 and the second sun visor 130L2 can further include a sun visor mirror. In this case, the twelfth sound generating module 31L can be configured to vibrate a sun visor mirror of one or more of the first sun visor 130L1 and the second sun visor 130L2. The twelfth sound generating module 31L can directly vibrate the sun visor mirror of one or more of the first sun visor 130L1 and the second sun visor 130L2. The twelfth sound generating module 31L vibrating the sun visor mirror can include the sound apparatus 30 described above with reference to FIGS. 3 to 36, and thus, repeated descriptions are omitted.

With reference to FIGS. 37 and 38, the vehicular apparatus or the vehicle 10 according to an embodiment of the present disclosure can further include a woofer speaker WS which is disposed at at least one or more of the dashboard 130A, the door interior material 130D, and the rear package interior material 130J.

The woofer speaker WS according to an embodiment of the present disclosure can include at least one or more of a woofer, a mid-woofer, and a sub-woofer. For example, the woofer speaker WS can be a speaker which outputs a sound of about 60 Hz to about 150 Hz. Therefore, the woofer speaker WS can output a sound of about 60 Hz to about 150 Hz, and thus, can enhance a low-pitched sound band characteristic of a sound which is output to an interior space.

According to an embodiment of the present disclosure, the woofer speaker WS can be disposed at at least one or more of first and second regions of the dashboard 130A. According to an embodiment of the present disclosure, the woofer speaker WS can be disposed at each of first to fourth door frames of the door frame and can be exposed at a lower region of each of the first to fourth door interior materials 130D1 to 130D4 of the door interior material 130D. For example, the woofer speaker WS can be disposed at at least one or more of the first to fourth door frames of the door frame and can be exposed at the lower regions of at least one or more of the first to fourth door interior materials 130D1 to 130D4 of the door interior material 130D.

According to an embodiment of the present disclosure, the woofer speaker WS can be disposed at at least one or more of the first and second regions of the rear package interior material 130J. For example, the fourth sound generating module 31D disposed at the lower region of one or more of the first to fourth door interior materials 130D1 to 130D4 or at one or more of the first to fourth door frames of the door frame can be replaced by the woofer speaker WS. For example, the fourth sound generating module 31D disposed at the lower region of one or more of the first to fourth door interior materials 130D1 to 130D4 can be replaced by the woofer speaker WS.

The vehicular apparatus 10 according to an embodiment of the present disclosure can further include a garnish member 130P which covers a portion of the vehicle interior material 130 exposed at the interior space IS, and one or more third sound generating apparatuses 30-3 disposed at the vehicle interior material 130. For example, the one or more third sound generating apparatuses 30-3 can be disposed at the garnish member 130P and the vehicle interior material 130 to output a sound. For example, at least one or more of the garnish member 130P and the vehicle interior material 130 can output a sound based on a vibration of the one or more third sound generating apparatuses 30-3.

The garnish member 130P can be configured to cover a portion of the door interior material 130D exposed at the interior space, but embodiments of the present disclosure are not limited thereto. For example, the garnish member 130P can be configured to cover a portion of one or more of the dashboard 130A, the pillar interior material 130B, and the roof interior material 130C, which are exposed at the interior space IS.

The garnish member 130P according to an embodiment of the present disclosure can include a metal material or a nonmetal material (or a composite nonmetal material) having a material characteristic suitable for generating a sound based on a vibration. For example, a metal material of the garnish member 130P can include any one or more materials of stainless steel, aluminum (Al), an Al alloy, a magnesium (Mg), a Mg alloy, and a magnesium-lithium (Mg—Li) alloy, but embodiments of the present disclosure are not limited thereto. The nonmetal material (or the composite nonmetal material) of the garnish member 130P can include one or more of wood, plastic, glass, metal, cloth, fiber, rubber, paper, carbon, and leather, but embodiments of the present disclosure are not limited thereto. For example, the garnish member 130P can include a metal material having a material characteristic suitable for generating a sound of a high-pitched sound band, but embodiments of the present disclosure are not limited thereto. For example, the high-pitched sound band can have a frequency of 1 kHz or more or 3 kHz or more, but embodiments of the present disclosure are not limited thereto.

The one or more third sound generating apparatuses 30-3 can be disposed between the garnish member 130P and the vehicle interior material 130. For example, the one or more third sound generating apparatuses 30-3 can be a garnish speaker or the like, but embodiments of the present disclosure are not limited thereto.

The one or more third sound generating apparatuses 30-3 according to an embodiment of the present disclosure can include one or more of the sound apparatus 30 described above with reference to FIGS. 3 to 36. The one or more third sound generating apparatuses 30-3 can be disposed at a main interior material or the vehicle interior material 130 and the garnish member 130P and can be connected or coupled to the garnish member 130P.

The one or more third sound generating apparatuses 30-3 according to an embodiment of the present disclosure can be configured to indirectly or directly vibrate the garnish member 130P to output a sound into the interior space IS of the vehicular apparatus 10. For example, the one or more third sound generating apparatuses 30-3 can be configured to output a sound of a high-pitched sound band, but embodiments of the present disclosure are not limited thereto.

The vehicular apparatus or the vehicle 10 according to an embodiment of the present disclosure can output a sound to the interior space IS through at least one or more of the first sound generating apparatus 30-1 disposed at the vehicle interior material 130, the second sound generating apparatus 30-2 disposed at the vehicle interior material 130 exposed at the interior space, and the third sound generating apparatus 30-3 disposed at the garnish member 130P, and thus, can output the sound by a vehicle interior material 130 as a vibration plate or a sound vibration plate, thereby outputting a multichannel surround stereo sound.

Figure 41A:
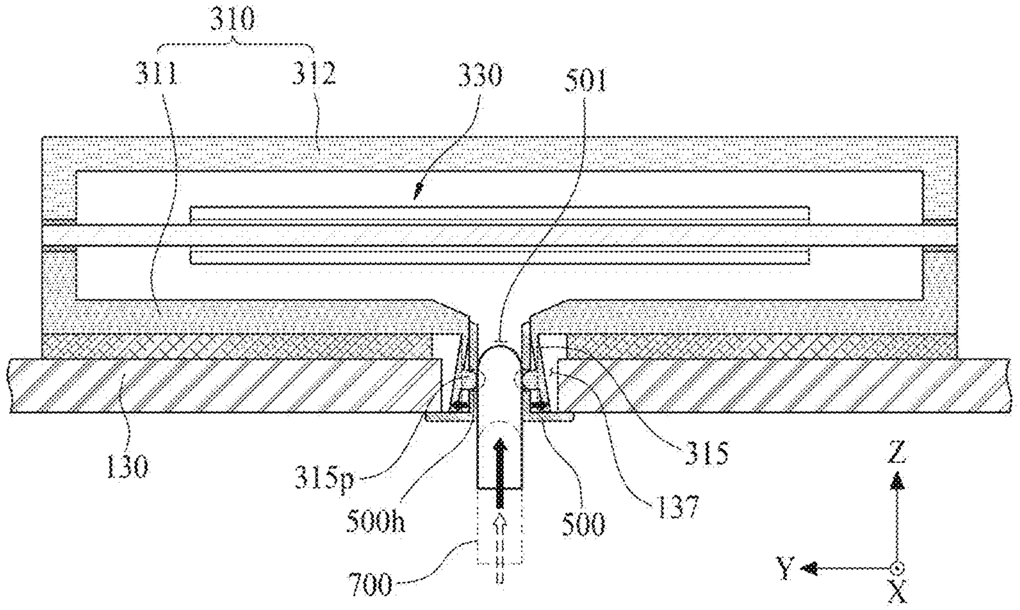
FIGS. 41A and 41B illustrate an attachment or detachment method of a coupling part fastened to a protrusion part of an enclosure, in a sound apparatus according to an embodiment of the present disclosure.
Figure 41B:
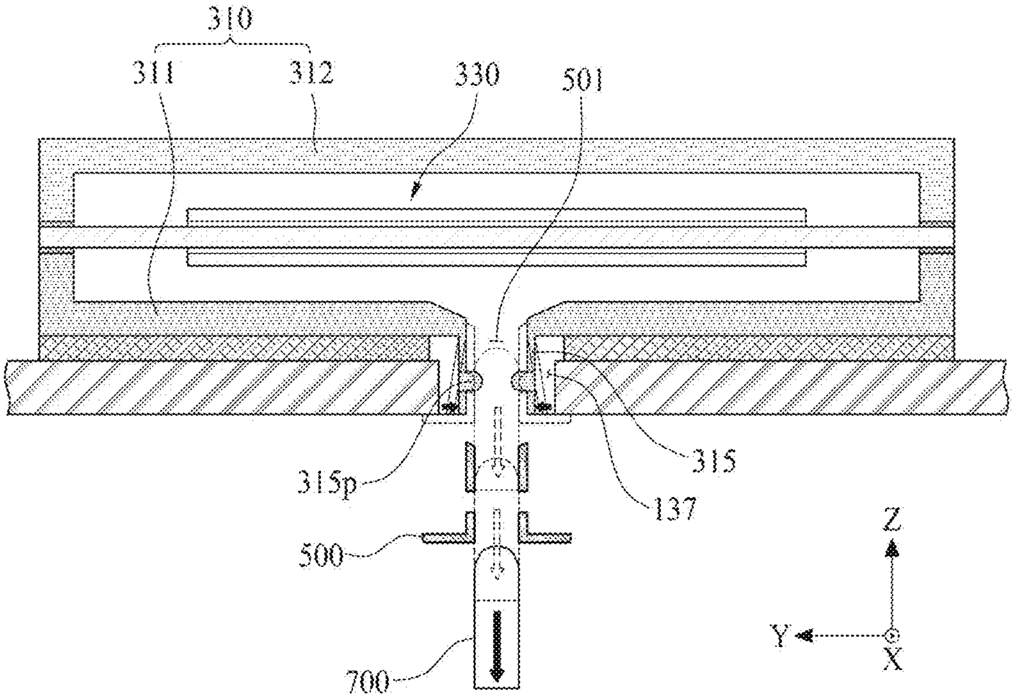

FIGS. 41A and 41B illustrate an attachment or detachment method of a coupling part fastened to a protrusion part of an enclosure, in a sound apparatus according to an embodiment of the present disclosure.

With reference to FIG. 41A, a pressing (or pushing) jig (or a separation bar) 700 can be inserted and pressed (or pushed) into a hollow part 501 of a coupling part 500 fastened to a protrusion part 315 of an enclosure 310. First and second projections 315*p*1 and 315*p*2 of the protrusion part 315 which respectively pass through and are accommodated (or inserted) into a first hole 500*h*1 and a second hole 500*h*2 of the coupling part 500 can be pushed in directions opposite to each other (or directions distancing from each other) (a horizontal arrow direction) by pressing (or pushing) of the jig 700, and thus, half or more of the first and second projections 315*p*1 and 315*p*2 of the protrusion part 315 can deviate from the first hole 500*h*1 and the second hole 500*h*2. Accordingly, only a portion of the first projection 315*p*1 and a portion of the second projection 315*p*2 of the protrusion part 315 can be respectively accommodated (or inserted) into the first hole 500*h*1 and the second hole 500*h*2, and thus, the coupling part 500 can be separated (or detached) from the protrusion part 315 of the enclosure 310.

With reference to FIG. 41B, the jig 700 and the coupling part 500 can be unloaded from the protrusion part 315 of the enclosure 310 through separate tongs or handwork, and thus, the coupling part 500 fastened to the protrusion part 315 of the enclosure 310 can be separated or detached from the protrusion part 315 by a relatively weak force.

According to an embodiment of the present disclosure, the coupling part 500 fastened to the protrusion part 315 of the enclosure 310 can be separated (or detached) from the protrusion part 315 through a simple separation (or detachment) method of inserting and pressing (or pushing) the jig 700 into an opening hole 315*o* of the coupling part 500 fastened to the protrusion part 315 of the enclosure 310, and thus, a process of separating and detaching (or rework) the coupling part 500 can be easily performed, and the damage of the enclosure 310 or a vehicular interior material 130 can be prevented.

Therefore, in the sound apparatus 30 according to one or more embodiments of the present disclosure, the coupling part 500 can be detachably coupled or fastened to the protrusion part 315 by a hook fastening scheme, and thus, can be easily equipped in the vehicular interior material 130 (or a mount object) and can be easily separated or detached (or rework) from the vehicular interior material 130 (or the mount object) without the damage of the enclosure 310 or the vehicular interior material 130.

A sound apparatus and a vehicular apparatus including the same according to various embodiments of the present disclosure are described below.

A sound apparatus according to various embodiments of the present disclosure can comprise an enclosure including an internal space and a protrusion part including an opening hole connected to the internal space, a sound generating module at the internal space of the enclosure, and a coupling part including a hollow part connected to the internal space, the coupling part being accommodated into the opening hole of the protrusion part. The coupling part can be detachably fastened to the protrusion part.

According to various embodiments of the present disclosure, the coupling part can be fastened to the protrusion part by a hook fastening scheme using a projection and a hole.

According to various embodiments of the present disclosure, the protrusion part can further comprise a projection at the opening hole. The coupling part can further comprise a hole accommodating the projection of the protrusion part.

According to various embodiments of the present disclosure, the protrusion part can protrude from a rear surface of the enclosure to include the opening hole.

According to various embodiments of the present disclosure, the protrusion part can comprise a first protrusion wall, a second protrusion wall parallel to the first protrusion wall, a first projection protruding from an inner surface of the first protrusion wall so as to be disposed in the opening hole, and a second projection protruding from an inner surface of the second protrusion wall so as to be disposed in the opening hole.

According to various embodiments of the present disclosure, the protrusion part can further comprise a third protrusion wall connected to one lateral surface of each of the first and second protrusion walls, and a fourth protrusion wall connected to the other lateral surface of each of the first and second protrusion walls. The opening hole can be surrounded by the first, second, third and fourth protrusion walls.

According to various embodiments of the present disclosure, the protrusion part can further comprise one or more first slits at the first protrusion wall, and one or more second slits at the second protrusion wall.

According to various embodiments of the present disclosure, each of the first protrusion wall and the second protrusion wall can be elastically deformed in a direction closer to a center portion of the opening hole or in a direction away from the center portion of the opening hole.

According to various embodiments of the present disclosure, the coupling part can comprise a hollow member accommodated into the opening hole of the protrusion part, the hollow member including the hollow part, a first hole configured at one side portion of the hollow member to accommodate the first projection, and a second hole configured at the other side portion of the hollow member facing the one side portion of the hollow member to accommodate the second projection.

According to various embodiments of the present disclosure, the coupling part can further comprise a latch member connected to one outer surface of the hollow member to have a certain width.

According to various embodiments of the present disclosure, the coupling part can further comprise a chamfer portion having a non-rectangular shape between the hollow member and the latch member.

According to various embodiments of the present disclosure, the sound generating module can comprise a vibration member at the enclosure, and a vibration apparatus connected to the enclosure to vibrate the vibration member.

According to various embodiments of the present disclosure, the vibration member can comprise a metal material, or can comprise a single nonmetal material or a composite nonmetal material of one or more of wood, rubber, plastic, carbon, glass, fiber, cloth, paper, mirror, and leather.

According to various embodiments of the present disclosure, the vibration apparatus can comprise one or more vibration generators. Each of the one or more vibration generators can comprise a vibration part including a piezoelectric material, a first electrode part at a first surface of the vibration part, and a second electrode part at a second surface different from the first surface of the vibration part.

According to various embodiments of the present disclosure, the vibration part can comprise a plurality of inorganic material portions having the piezoelectric material, and an organic material portion between the plurality of inorganic material portions.

According to various embodiments of the present disclosure, each of the one or more vibration generators can comprise a first cover member at the first electrode part, and a second cover member at the second electrode part.

According to various embodiments of the present disclosure, each of the one or more vibration generators can further comprise a signal supply member electrically connected to the first electrode part and the second electrode part. A portion of the signal supply member can be accommodated between the first cover member and the second cover member.

According to various embodiments of the present disclosure, the vibration apparatus can comprise a first vibration generator and a second vibration generator stacked on each other. Each of the first vibration generator and the second vibration generator can comprise a vibration part, a first electrode part at a first surface of the vibration part, and a second electrode part at a second surface different from the first surface of the vibration part.

According to various embodiments of the present disclosure, the vibration apparatus can further comprise an intermediate member connected between the first vibration generator and the second vibration generator. The first vibration generator and the second vibration generator can be displaced in a same direction.

According to various embodiments of the present disclosure, the vibration apparatus can comprise a first vibration apparatus configured at a first surface of the vibration member; and a second vibration apparatus configured at a second surface different from the first surface of the vibration member.

According to various embodiments of the present disclosure, each of the first vibration apparatus and the second vibration apparatus can be spaced apart from the enclosure. The opening hole of the protrusion part can be disposed to correspond to a center portion of the vibration apparatus.

According to various embodiments of the present disclosure, the enclosure can comprise a first enclosure connected to the first surface of the vibration member to cover the first vibration apparatus and including the protrusion part, and a second enclosure connected to the second surface of the vibration member to cover the second vibration apparatus.

According to various embodiments of the present disclosure, the internal space can comprise a first space between the first enclosure and the first surface of the vibration member, and a second space between the second enclosure and the second surface of the vibration member.

According to various embodiments of the present disclosure, the vibration member can comprise at least one or more holes at a periphery of the vibration apparatus. The first space and the second space can be connected to each other through the at least one or more holes.

According to various embodiments of the present disclosure, the vibration member can be configured to cover the internal space of the enclosure. The enclosure can be coupled to a periphery portion of the vibration member and can comprise the protrusion part.

According to various embodiments of the present disclosure, the vibration member can further comprise at least one or more holes at a periphery of the vibration apparatus.

According to various embodiments of the present disclosure, the sound apparatus can further comprise a protection member at the second vibration apparatus.

According to various embodiments of the present disclosure, the protection member can be configured to contact the second vibration apparatus and the second surface of the vibration member, or can be configured to cover the second vibration apparatus and the second surface of the vibration member.

According to various embodiments of the present disclosure, the vibration member can further comprise at least one or more holes at a periphery of the vibration apparatus. The protection member can comprise at least one or more connection holes connected to the at least one or more holes.

According to various embodiments of the present disclosure, the vibration apparatus can be a coil-type vibration apparatus.

According to various embodiments of the present disclosure, the vibration apparatus can be connected to the vibration member and the enclosure at the internal space of the enclosure. The vibration member can be spaced apart from the opening hole of the protrusion part.

According to various embodiments of the present disclosure, the sound apparatus can further comprise a heat dissipation plate disposed between the vibration apparatus and the vibration member.

According to various embodiments of the present disclosure, the vibration apparatus can comprise a base frame connected to the enclosure, a magnetic circuit part disposed at the base frame, the magnetic circuit part including a bobbin connected to the vibration member, and a damper connected between the base frame and the bobbin.

According to various embodiments of the present disclosure, the sound apparatus can further comprise a fixing member configured to fix the vibration apparatus to the second enclosure. The fixing member can comprise an adhesive member disposed between at least a portion of the base frame and the second enclosure, or can comprise a plurality of screws passing through at least a portion of the base frame and fastened to the second enclosure.

According to various embodiments of the present disclosure, the vibration apparatus can further comprise a protection member connected to a front surface of the bobbin.

According to various embodiments of the present disclosure, the vibration apparatus can further comprise a protection member connected to a front surface of the bobbin. The sound generating module can further comprise an adhesive member between the protection member and the vibration member.

According to various embodiments of the present disclosure, the enclosure can comprise a first enclosure and a second enclosure providing the internal space. The first enclosure can have the protrusion part. The vibration member can be between the first enclosure and the second enclosure. The vibration apparatus can be between the vibration member and the second enclosure.

According to various embodiments of the present disclosure, the first enclosure can cover a first surface of the vibration member and can be connected to an edge portion of the first surface of the vibration member. The second enclosure can cover the vibration apparatus and can be connected to a second surface of the vibration member opposite to the first surface of the vibration member.

According to various embodiments of the present disclosure, the internal space can comprise a first space between the vibration member and the first enclosure and connected to the opening hole of the protrusion part, and a second space between the vibration member and the second enclosure.

According to various embodiments of the present disclosure, the vibration member can comprise one or more holes at a periphery of the vibration apparatus. The first space and the second space can be connected to each other through the one or more holes.

According to various embodiments of the present disclosure, the sound apparatus can further comprise a fixing member configured to fix the vibration apparatus to the second enclosure.

According to various embodiments of the present disclosure, the sound apparatus can further comprise a coupling member between the enclosure and the vibration member, and a soft member connected to the enclosure. The protrusion part can pass through the soft member. The soft member can comprise a material different from a material of the coupling member.

According to various embodiments of the present disclosure, the sound apparatus can further comprise a coupling member between the enclosure and the vibration member, and a connection member connected to the enclosure. The protrusion part can pass through the connection member. The connection member can comprise a material different from a material of the coupling member.

According to various embodiments of the present disclosure, the connection member can comprise a rubber material, or can comprise ethylene propylene diene monomer, ethylene propylene rubber, or urethane rubber.

According to various embodiments of the present disclosure, the sound apparatus can further comprise a connection member connected to the enclosure. The protrusion part can pass through the connection member. The connection member can comprise a first portion and a second portion having different thicknesses.

According to various embodiments of the present disclosure, a thickness of the second portion can be greater than a thickness of the first portion.

According to various embodiments of the present disclosure, the second portion can be at a periphery portion of the first enclosure. The first portion can be at a remaining portion, other than the periphery portion, of the first enclosure.

According to various embodiments of the present disclosure, the enclosure can comprise a first region corresponding to a center portion, a second region corresponding to a periphery portion surrounding the center portion, and a third region between the first region and the second region. The first portion can be at the first region and the third region. The second portion can be at the second region.

According to various embodiments of the present disclosure, the connection member can comprise a first connection member connected to the enclosure, and a second connection member connected to a portion of the first connection member. The first portion can comprise only the first connection member of the first connection member and the second connection member. The second portion can comprise both the first connection member and the second connection member.

According to various embodiments of the present disclosure, the second connection member can be stacked on the first connection member at the second portion.

According to various embodiments of the present disclosure, at least one of the first connection member and the second connection member can comprise a rubber material, or can comprise ethylene propylene diene monomer, ethylene propylene rubber, or urethane rubber.

A vehicular apparatus according to various embodiments of the present disclosure can comprise an interior material exposed at an interior space, and one or more sound generating apparatuses disposed at the interior material to output a sound to the interior space. The one or more sound generating apparatuses can comprise a sound apparatus. The sound apparatus can comprise an enclosure including an internal space and a protrusion part including an opening hole connected to the internal space, a sound generating module at the internal space of the enclosure, and a coupling part including a hollow part connected to the internal space, the coupling part being accommodated into the opening hole of the protrusion part. The coupling part can be detachably fastened to the protrusion part.

According to various embodiments of the present disclosure, the interior material can comprise a hole accommodating the protrusion part of the enclosure. The protrusion part can pass through the hole of the interior material. The coupling part configured at the sound apparatus can be fastened to the protrusion part at the interior space.

According to various embodiments of the present disclosure, the vehicular apparatus can further comprise a soft member between the enclosure and the interior material. The interior material can comprise a hole accommodating the protrusion part of the enclosure. The soft member can comprise a hole accommodating the protrusion part. The protrusion part can pass through the hole of the interior material and the hole of the soft member. The coupling part configured at the sound apparatus can be fastened to the protrusion part at the interior space.

According to various embodiments of the present disclosure, the soft member can be configured as ethylene propylene rubber or urethane rubber.

According to various embodiments of the present disclosure, the vehicular apparatus can further comprise a connection member between the enclosure and the interior material. The connection member can comprise a hole accommodating the protrusion part of the enclosure. The protrusion part can pass through the hole of the connection member. The coupling part configured at the sound apparatus can be fastened to the protrusion part at the interior space.

According to various embodiments of the present disclosure, a thickness of the second portion can be greater than a thickness of the first portion.

According to various embodiments of the present disclosure, the second portion can be at a periphery portion of the enclosure. The first portion can be at a remaining portion, other than the periphery portion, of the enclosure.

According to various embodiments of the present disclosure, the enclosure can comprise a first region corresponding to a center portion, a second region corresponding to a periphery portion surrounding the center portion, and a third region between the first region and the second region. The first portion can be at the first region and the third region. The second portion can be at the second region.

According to various embodiments of the present disclosure, the connection member can comprise a first connection member connected to the enclosure, and a second connection member connected to a portion of the first connection member. The first portion can comprise only the first connection member of the first connection member and the second connection member. The second portion can comprise both the first connection member and the second connection member.

According to various embodiments of the present disclosure, the second connection member can be stacked on the first connection member at the second portion.

According to various embodiments of the present disclosure, at least one of the first connection member and the second connection member can comprise a rubber material, or can comprise ethylene propylene diene monomer, ethylene propylene rubber, or urethane rubber.

According to various embodiments of the present disclosure, the interior material can comprise one or more materials of metal, wood, rubber, plastic, carbon, glass, fiber, cloth, paper, a mirror, and leather.

According to various embodiments of the present disclosure, the interior material can comprise at least one or more of a dashboard, a pillar interior material, a roof interior material, a door interior material, a seat interior material, a handle interior material, a floor interior material, a rear package interior material, an overhead console, a rear view mirror, a glove box, a garnish member, and a sun visor. The one or more sound generating apparatuses can be configured to vibrate at least one or more of the dashboard, the pillar interior material, the roof interior material, the door interior material, the seat interior material, the handle interior material, the floor interior material, the rear package interior material, the overhead console, the rear view mirror, the glove box, the garnish member, and the sun visor, to generate a sound.

A vehicular apparatus according to various embodiments of the present disclosure can comprise an interior material exposed at an interior space, and one or more sound apparatuses as described above, disposed at the interior material to output a sound to the interior space.

A sound apparatus according to various embodiments of the present disclosure can be applied to or included in a sound apparatus disposed at an apparatus (or a display apparatus). The apparatus (or a display apparatus) according to an embodiment of the present disclosure can be applied to or included in mobile apparatuses, video phones, smart watches, watch phones, wearable apparatuses, foldable apparatuses, rollable apparatuses, bendable apparatuses, flexible apparatuses, curved apparatuses, sliding apparatuses, variable apparatuses, electronic organizers, electronic books, portable multimedia players (PMPs), personal digital assistants (PDAs), MP3 players, mobile medical devices, desktop personal computers (PCs), laptop PCs, netbook computers, workstations, navigation apparatuses, automotive navigation apparatuses, automotive display apparatuses, automotive apparatuses, theatre apparatuses, theatre display apparatuses, TVs, wall paper display apparatuses, signage apparatuses, game machines, notebook computers, monitors, cameras, camcorders, and home appliances, or the like. In addition, the sound apparatus according to one or more embodiments of the present disclosure can be applied to or included in an organic light-emitting lighting apparatus or an inorganic light-emitting lighting apparatus. When the sound apparatus is applied to or included in the lighting apparatuses, the lighting apparatuses can act as lighting and a speaker. In addition, when the sound apparatus according to one or more embodiments of the present disclosure is applied to or included in the mobile apparatuses, or the like, the sound apparatus can be one or more of a speaker, a receiver, and a haptic device, but embodiments of the present disclosure are not limited thereto.

It will be apparent to those skilled in the art that various modifications and variations can be made in the present disclosure without departing from the spirit or scope of the disclosures. Thus, it is intended that the present disclosure covers the modifications and variations of this disclosure provided that within the scope of the claims and their equivalents.

What is claimed is:

1. A sound apparatus comprising:

an enclosure including an internal space and a protrusion part including an opening hole connected to the internal space;

a sound generating module at the internal space of the enclosure; and a coupling part including a hollow part connected to the internal space, the coupling part being accommodated into the opening hole of the protrusion part, wherein the coupling part is detachably fastened to the protrusion part, wherein the sound generating module comprises:

a vibration member at the enclosure; and a vibration apparatus connected to the enclosure to vibrate the vibration member, wherein:

an interior material is exposed at an interior space of a vehicular apparatus, and one or more sound generating apparatuses are disposed at the interior material to output a sound to the interior space, and the one or more sound generating apparatuses include the sound apparatus, wherein the interior material comprises a hole accommodating the protrusion part of the enclosure, wherein the protrusion part passes through the hole of the interior material, and wherein the coupling part configured at the sound apparatus is fastened to the protrusion part at the interior space.

2. The sound apparatus of claim 1, wherein the coupling part is fastened to the protrusion part by a hook fastening scheme using a projection and a hole.

3. The sound apparatus of claim 1, wherein the protrusion part further comprises a projection at the opening hole, and wherein the coupling part further comprises a hole accommodating the projection of the protrusion part.

4. The sound apparatus of claim 1, wherein the protrusion part protrudes from a rear surface of the enclosure to include the opening hole.

5. The sound apparatus of claim 1, wherein the protrusion part comprises:

a first protrusion wall;

a second protrusion wall parallel to the first protrusion wall;

a first projection protruding from an inner surface of the first protrusion wall so as to be disposed in the opening hole; and a second projection protruding from an inner surface of the second protrusion wall so as to be disposed in the opening hole.

6. The sound apparatus of claim 5, wherein the protrusion part further comprises:

a third protrusion wall connected to one lateral surface of each of the first and second protrusion walls; and a fourth protrusion wall connected to another lateral surface of each of the first and second protrusion walls, and wherein the opening hole is surrounded by the first, second, third and fourth protrusion walls.

7. The sound apparatus of claim 6, wherein the protrusion part further comprises:

one or more first slits at the first protrusion wall; and one or more second slits at the second protrusion wall.

8. The sound apparatus of claim 5, wherein each of the first protrusion wall and the second protrusion wall is elastically deformed in a direction closer to a center portion of the opening hole or in a direction away from the center portion of the opening hole.

9. The sound apparatus of claim 5, wherein the coupling part comprises:

a hollow member accommodated into the opening hole of the protrusion part, the hollow member including the hollow part;

a first hole configured at one side portion of the hollow member to accommodate the first projection; and a second hole configured at another side portion of the hollow member facing the one side portion of the hollow member to accommodate the second projection.

10. The sound apparatus of claim 9, wherein the coupling part further comprises a latch member connected to one outer surface of the hollow member to have a certain width.

11. The sound apparatus of claim 10, wherein the coupling part further comprises a chamfer portion having a non-rectangular shape between the hollow member and the latch member.

12. The sound apparatus of claim 1, wherein the vibration apparatus comprises one or more vibration generators, and wherein each of the one or more vibration generators comprises:

a vibration part including a piezoelectric material;

a first electrode part at a first surface of the vibration part; and a second electrode part at a second surface different from the first surface of the vibration part.

13. The sound apparatus of claim 1, wherein the vibration apparatus is a coil-type vibration apparatus.

14. The sound apparatus of claim 1, wherein the vibration apparatus comprises:

a base frame connected to the enclosure;

a magnetic circuit part disposed at the base frame, the magnetic circuit part including a bobbin connected to the vibration member; and a damper connected between the base frame and the bobbin.

15. The vehicular apparatus comprising:

the sound apparatus of claim 1; and a soft member between the enclosure and the interior material, wherein the interior material comprises a hole accommodating the protrusion part of the enclosure, wherein the soft member comprises a hole accommodating the protrusion part, wherein the protrusion part passes through the hole of the interior material and the hole of the soft member, and wherein the coupling part configured at the sound apparatus is fastened to the protrusion part at the interior space.

16. The vehicular apparatus of claim 15, further comprising a connection member between the enclosure and the interior material, wherein the connection member comprises a hole accommodating the protrusion part of the enclosure, wherein the protrusion part passes through the hole of the connection member, and wherein the coupling part configured at the sound apparatus is fastened to the protrusion part at the interior space.

17. The vehicular apparatus of claim 15, wherein the interior material comprises at least one or more of a dashboard, a pillar interior material, a roof interior material, a door interior material, a seat interior material, a handle interior material, a floor interior material, a rear package interior material, an overhead console, a rear view mirror, a glove box, a garnish member, or a sun visor, and wherein the one or more sound generating apparatuses are configured to vibrate at least one or more of the dashboard, the pillar interior material, the roof interior material, the door interior material, the seat interior material, the handle interior material, the floor interior material, the rear package interior material, the overhead console, the rear view mirror, the glove box, the garnish member, or the sun visor, to generate a sound.

* * * * *